United States Patent [19]
Shibamiya et al.

[11] Patent Number: 5,926,174
[45] Date of Patent: Jul. 20, 1999

[54] DISPLAY APPARATUS CAPABLE OF IMAGE DISPLAY FOR VIDEO SIGNALS OF PLURAL KINDS

[75] Inventors: Yoshikazu Shibamiya; Kazumi Suga, both of Yokohama, Japan

[73] Assignee: Canon Kabushiki Kaisha, Tokyo, Japan

[21] Appl. No.: 08/652,153

[22] Filed: May 23, 1996

[30] Foreign Application Priority Data

| | | | |
|---|---|---|---|
| May 29, 1995 | [JP] | Japan | 7-130617 |
| May 29, 1995 | [JP] | Japan | 7-130618 |
| May 29, 1995 | [JP] | Japan | 7-130619 |
| Jan. 19, 1996 | [JP] | Japan | 8-007497 |

[51] Int. Cl.$^6$ ........................ G09G 5/00
[52] U.S. Cl. .......................... 345/213
[58] Field of Search ................... 345/213, 115; 348/516, 497, 536

[56] References Cited

U.S. PATENT DOCUMENTS

| | | | |
|---|---|---|---|
| 4,636,836 | 1/1987 | Stecker et al. | 358/19 |
| 4,713,691 | 12/1987 | Tanaka et al. | 358/264 |
| 4,943,857 | 7/1990 | Izuno et al. | 358/148 |
| 4,996,596 | 2/1991 | Hirao et al. | 358/158 |
| 5,528,307 | 6/1996 | Owada et al. | 348/497 |
| 5,589,801 | 12/1996 | Yamamura et al. | 331/14 |
| 5,627,596 | 5/1997 | Shiramizu | 348/536 |

*Primary Examiner*—Mark K. Zimmerman
*Assistant Examiner*—Ronald Laneau
*Attorney, Agent, or Firm*—Fitzpatrick, Cella, Harper & Scinto

[57] ABSTRACT

In an apparatus for displaying the image of an input video signal, utilizing a clock signal which is phase synchronized with the input video signal, change in the state of the input video signal is made easily detectable. For this purpose there is disclosed a display apparatus provided with a clock generating circuit including a PLL circuit and adapted to generate a clock signal which is phase synchronized with the input video signal, and a display circuit for displaying the image relating to the input video signal utilizing the clock signal generated by the clock generating circuit. A detection circuit detects the state of the input video signal according to whether the PLL circuit is in the locked state.

36 Claims, 42 Drawing Sheets

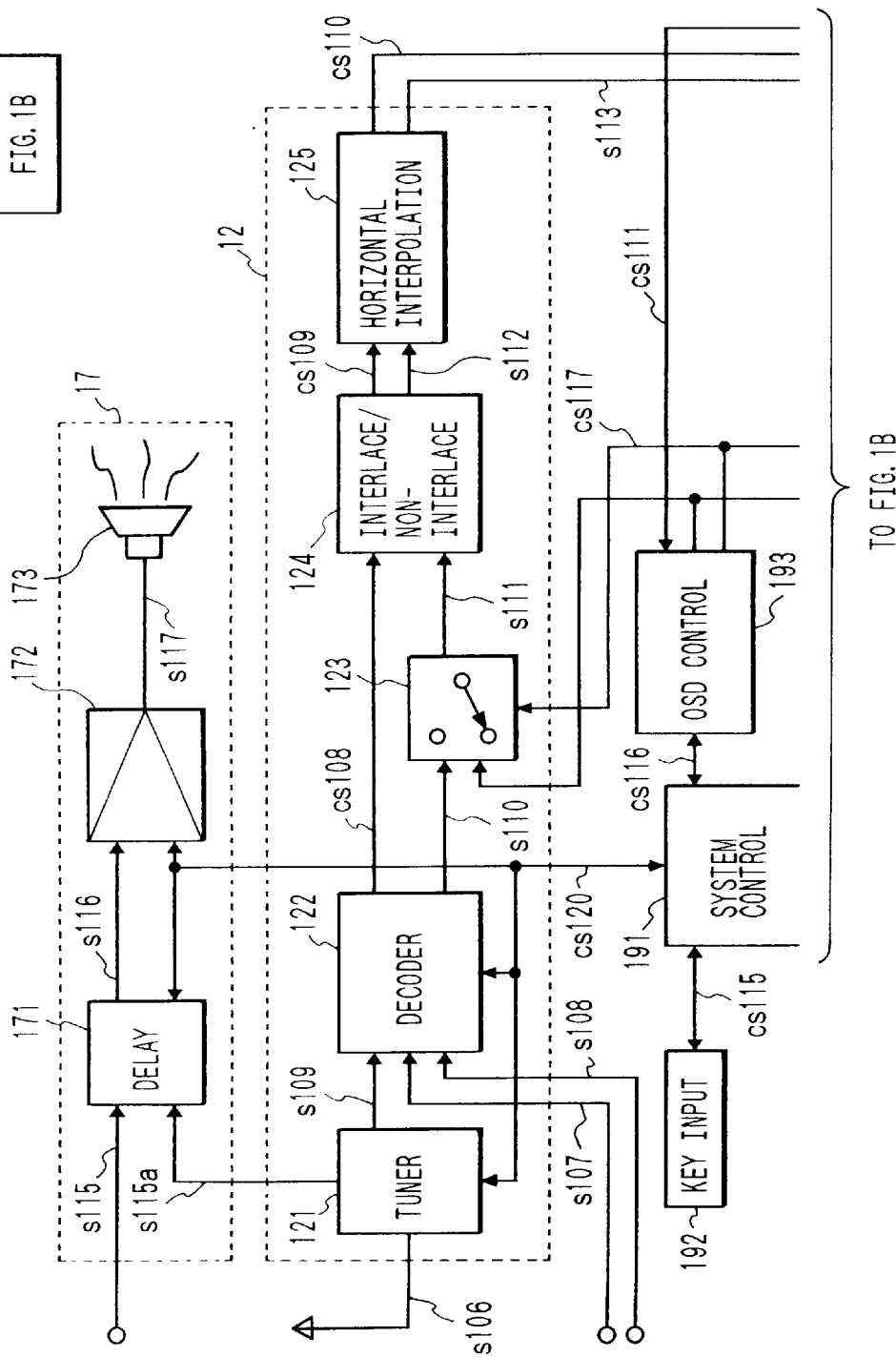

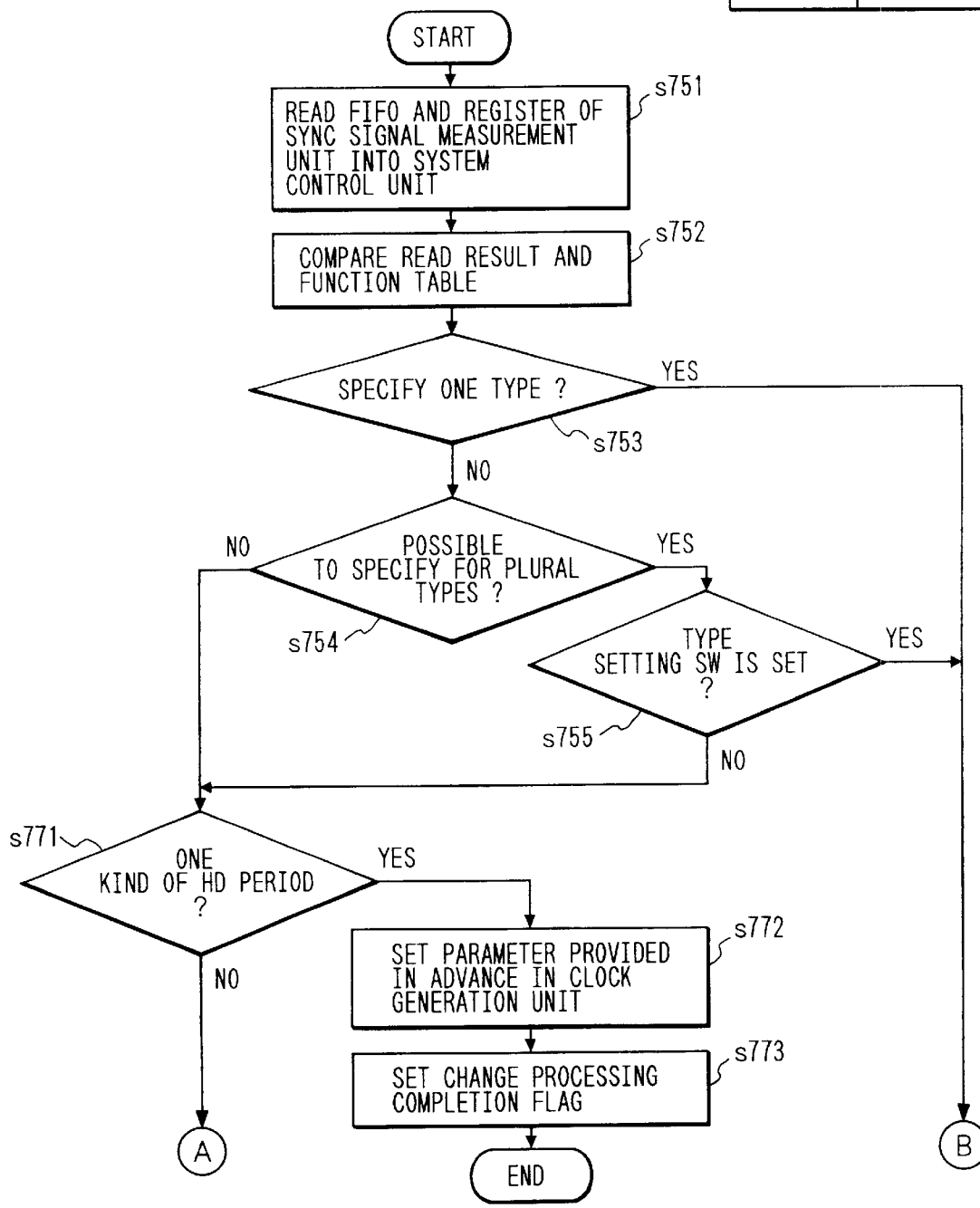

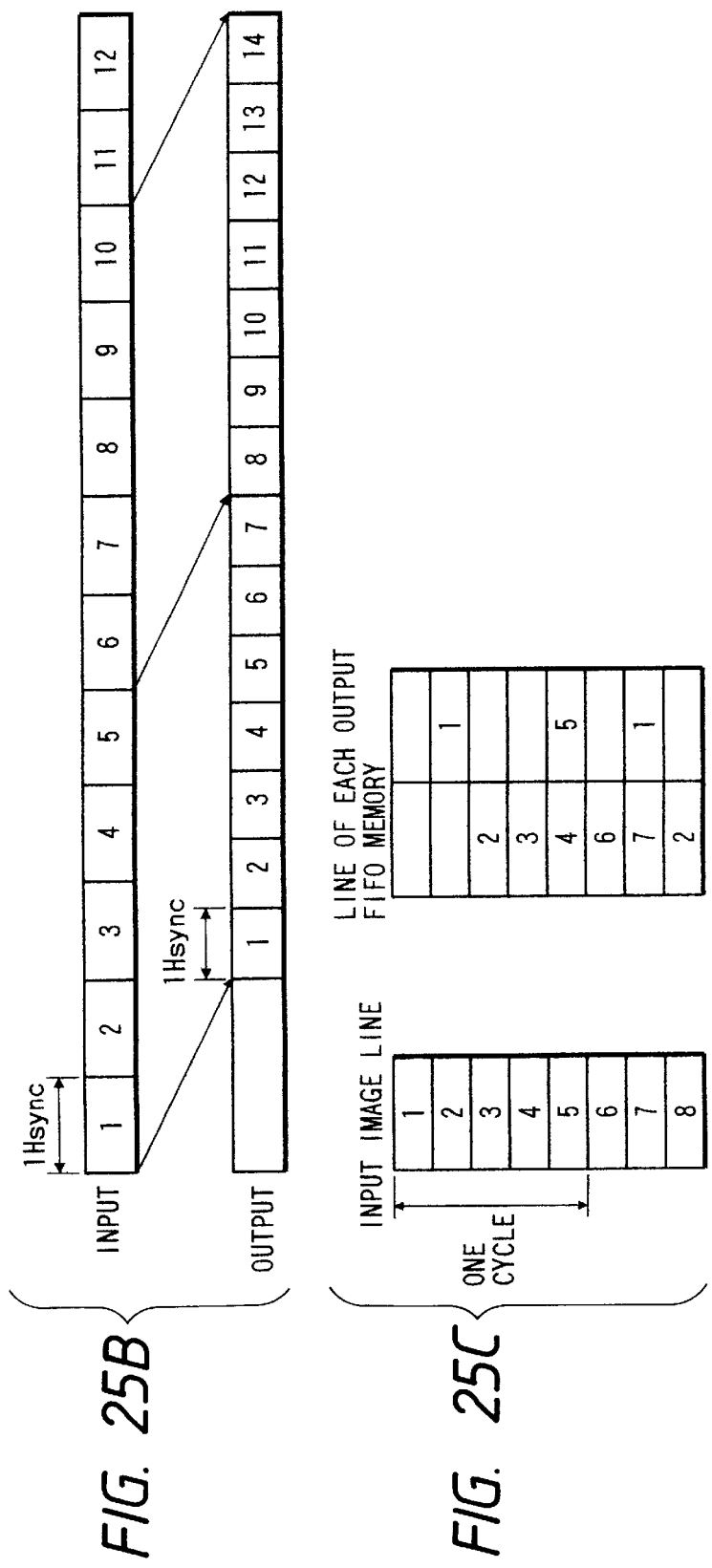

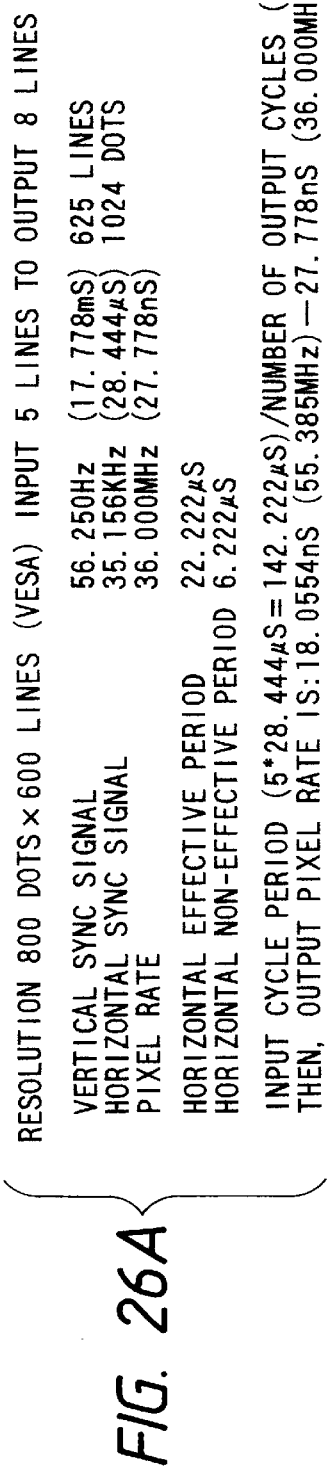
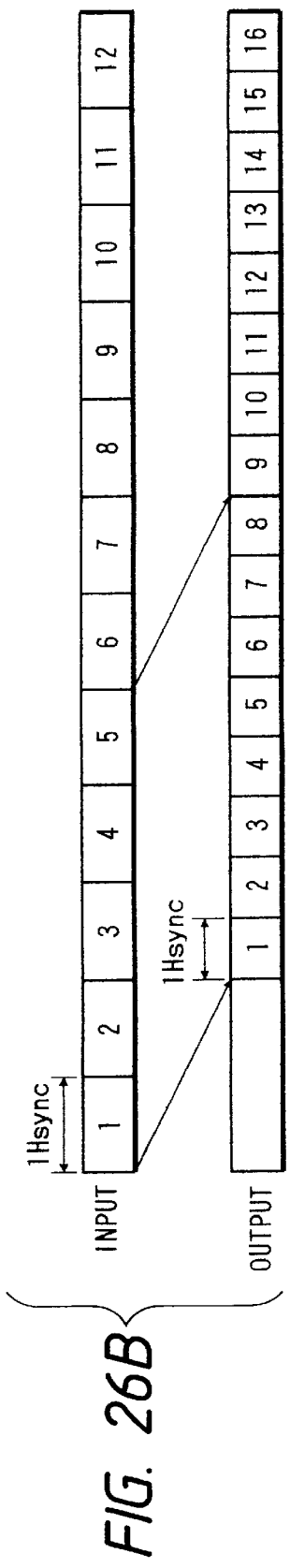
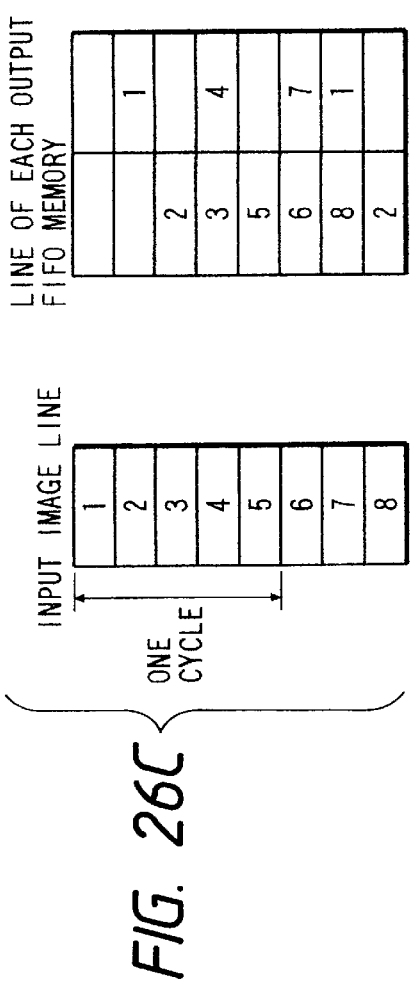
FIG. 26A
RESOLUTION 800 DOTS × 600 LINES (VESA) INPUT 5 LINES TO OUTPUT 8 LINES
VERTICAL SYNC SIGNAL   56.250Hz  (17.778mS)  625 LINES
HORIZONTAL SYNC SIGNAL  35.156KHz (28.444μS) 1024 DOTS
PIXEL RATE              36.000MHz (27.778nS)
HORIZONTAL EFFECTIVE PERIOD    22.222μS
HORIZONTAL NON-EFFECTIVE PERIOD 6.222μS
INPUT CYCLE PERIOD (5*28.444μS=142.222μS)/NUMBER OF OUTPUT CYCLES (8) = 17.778μS
THEN, OUTPUT PIXEL RATE IS:18.0554nS (55.385MHz)−27.778nS (36.000MHz)
FIG. 26B
FIG. 26C RESOLUTION 800 DOTS×600 LINES (VESA72Hz) INPUT 5 LINES TO OUTPUT 8 LINES VERTICAL SYNC SIGNAL         72.187Hz   (13.853mS)   666 LINES
HORIZONTAL SYNC SIGNAL       48.077KHz  (20.800μS)   1040 DOTS
PIXEL RATE                   50.000MHz  (20.000nS)

HORIZONTAL EFFECTIVE PERIOD      16.000μS
HORIZONTAL NON-EFFECTIVE PERIOD   4.800μS

INPUT CYCLE PERIOD (5*20.800μS=104.000μS)/NUMBER OF OUTPUT CYCLES (8)=13.000μS
THEN, OUTPUT PIXEL RATE IS:12.8125nS (78.048MHz)−20.3125nS (49.231MHz)

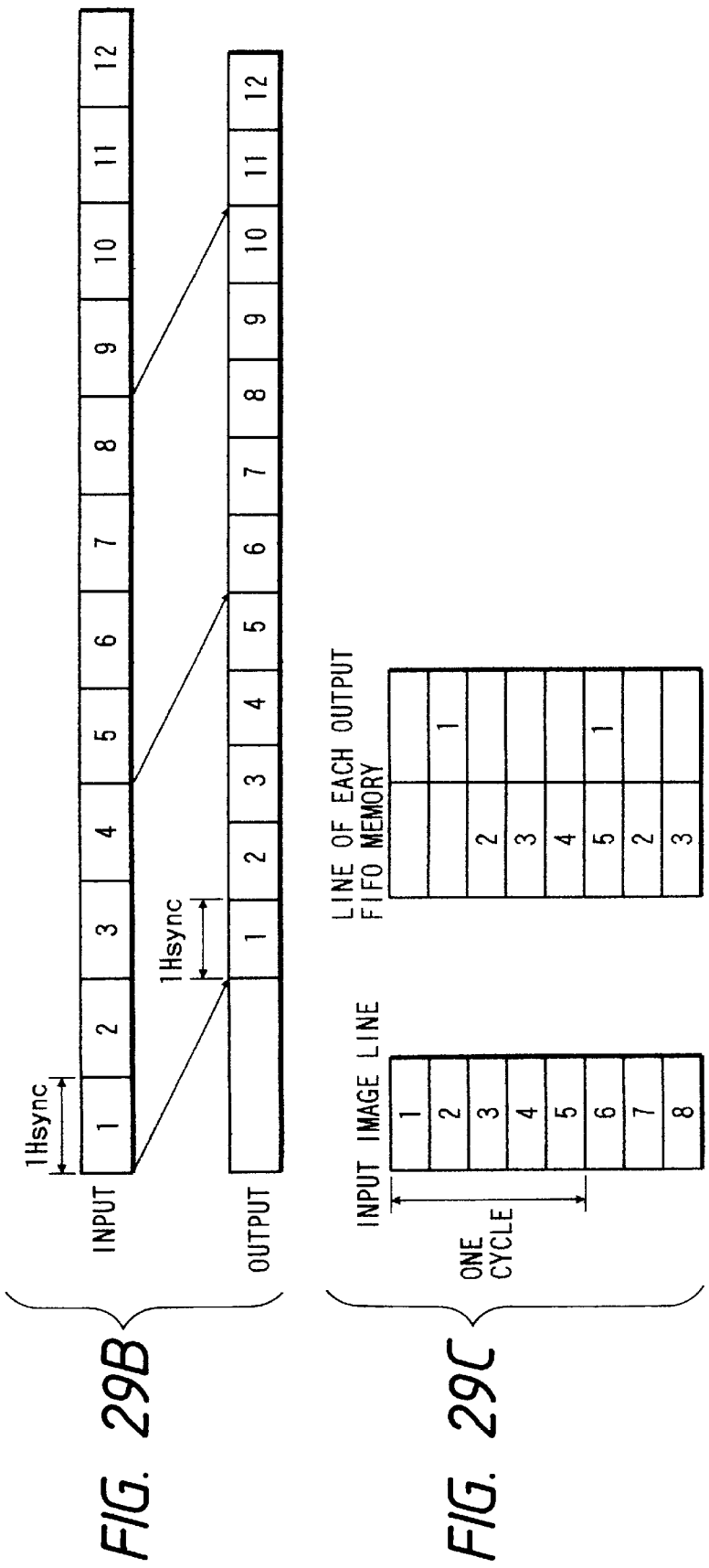

FIG. 30A
RESOLUTION 1024 DOTS × 768 LINES (MAC) INPUT 4 LINES TO OUTPUT 5 LINES
VERTICAL SYNC SIGNAL     75.10Hz   (13.3298mS) 803 LINES
HORIZONTAL SYNC SIGNAL   60.24KHz (16.6µS) 1328 DOTS
PIXEL RATE                 80.00MHz (12.5nS)
HORIZONTAL EFFECTIVE PERIOD     12.8µS
HORIZONTAL NON-EFFECTIVE PERIOD   3.8µS
INPUT CYCLE PERIOD (4*16.6µS = 66.4µS)/NUMBER OF OUTPUT CYCLES (5) = 13.28µS
THEN, OUTPUT PIXEL RATE IS:14.8125nS (67.5MHz)−20.75nS (48.2MHz)
FIG. 30B
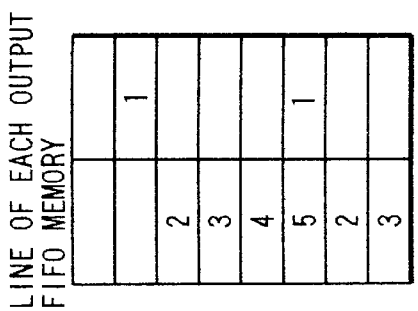
FIG. 30C
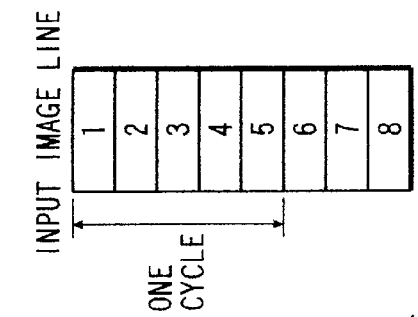

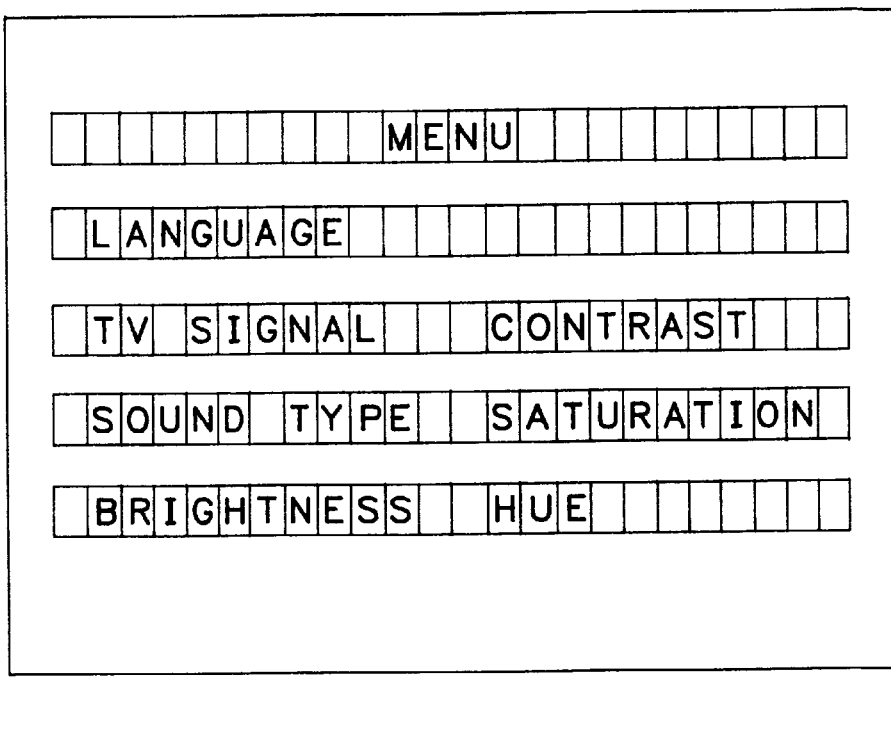
FIG. 34   DISPLAY DEVICE SIZE
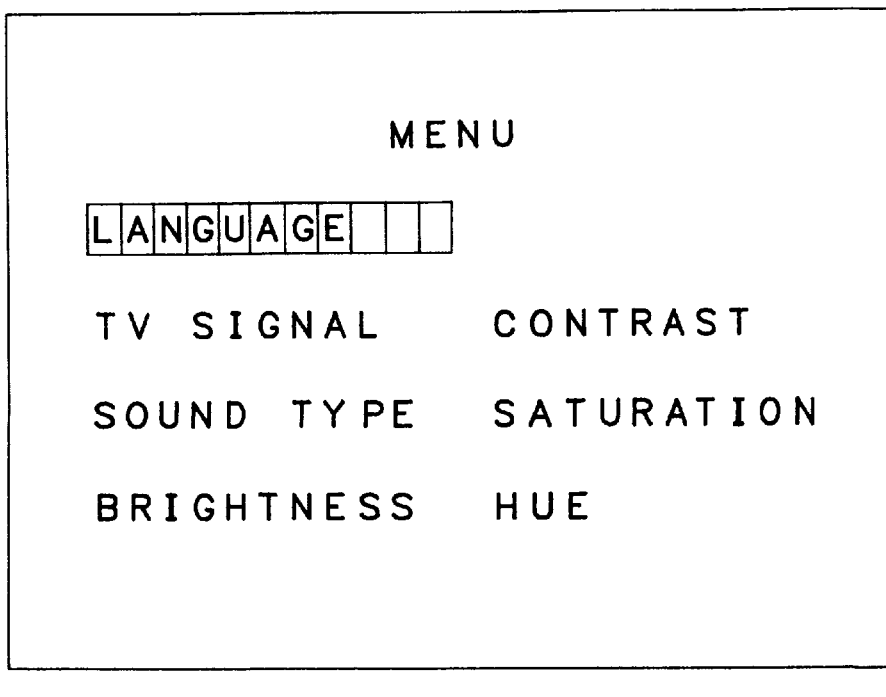
FIG. 35   DISPLAY DEVICE SIZE

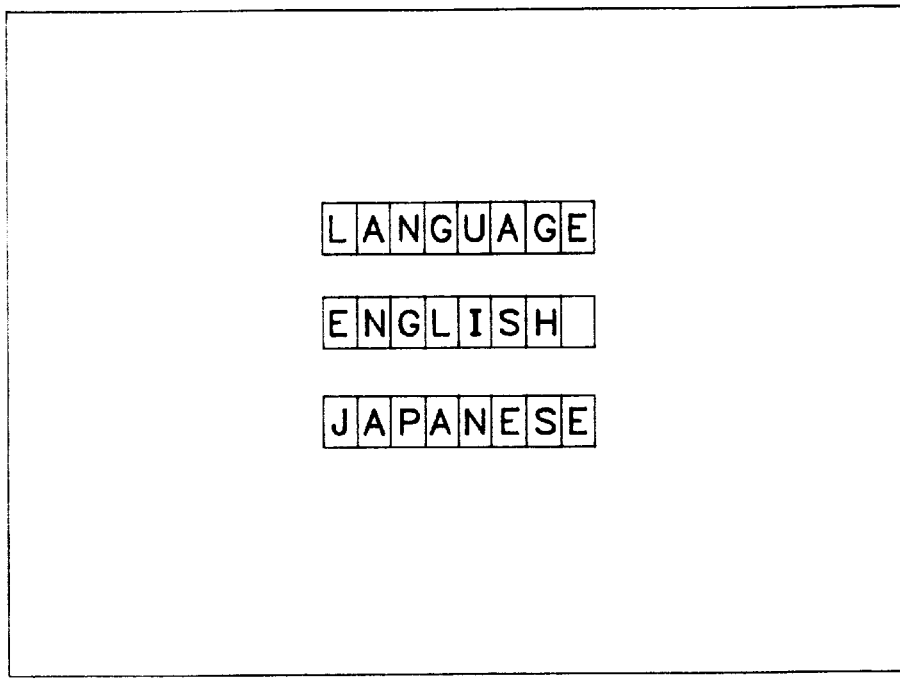
FIG. 36    DISPLAY DEVICE SIZE
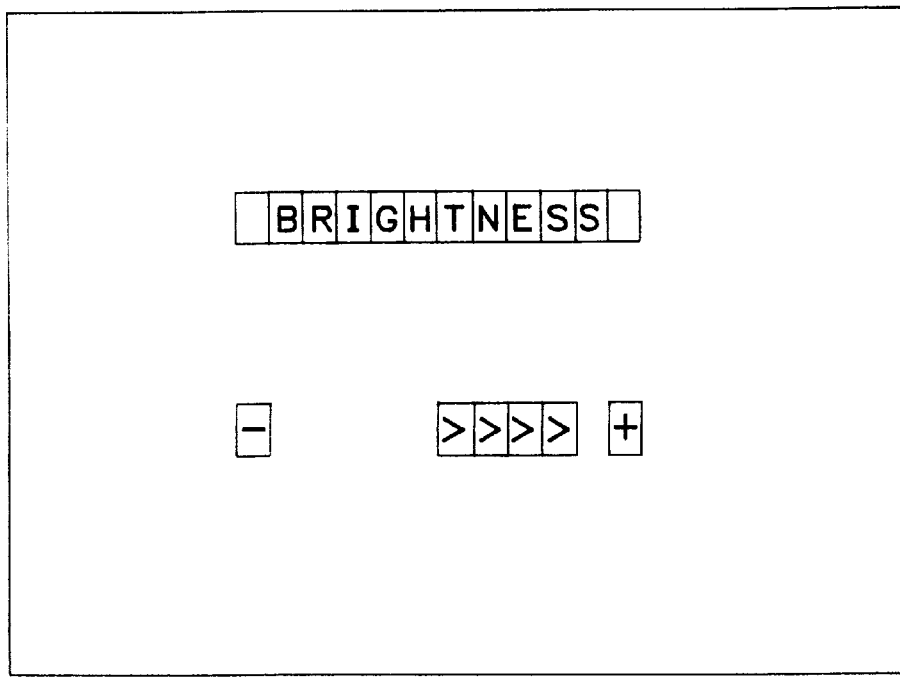
FIG. 37    DISPLAY DEVICE SIZE

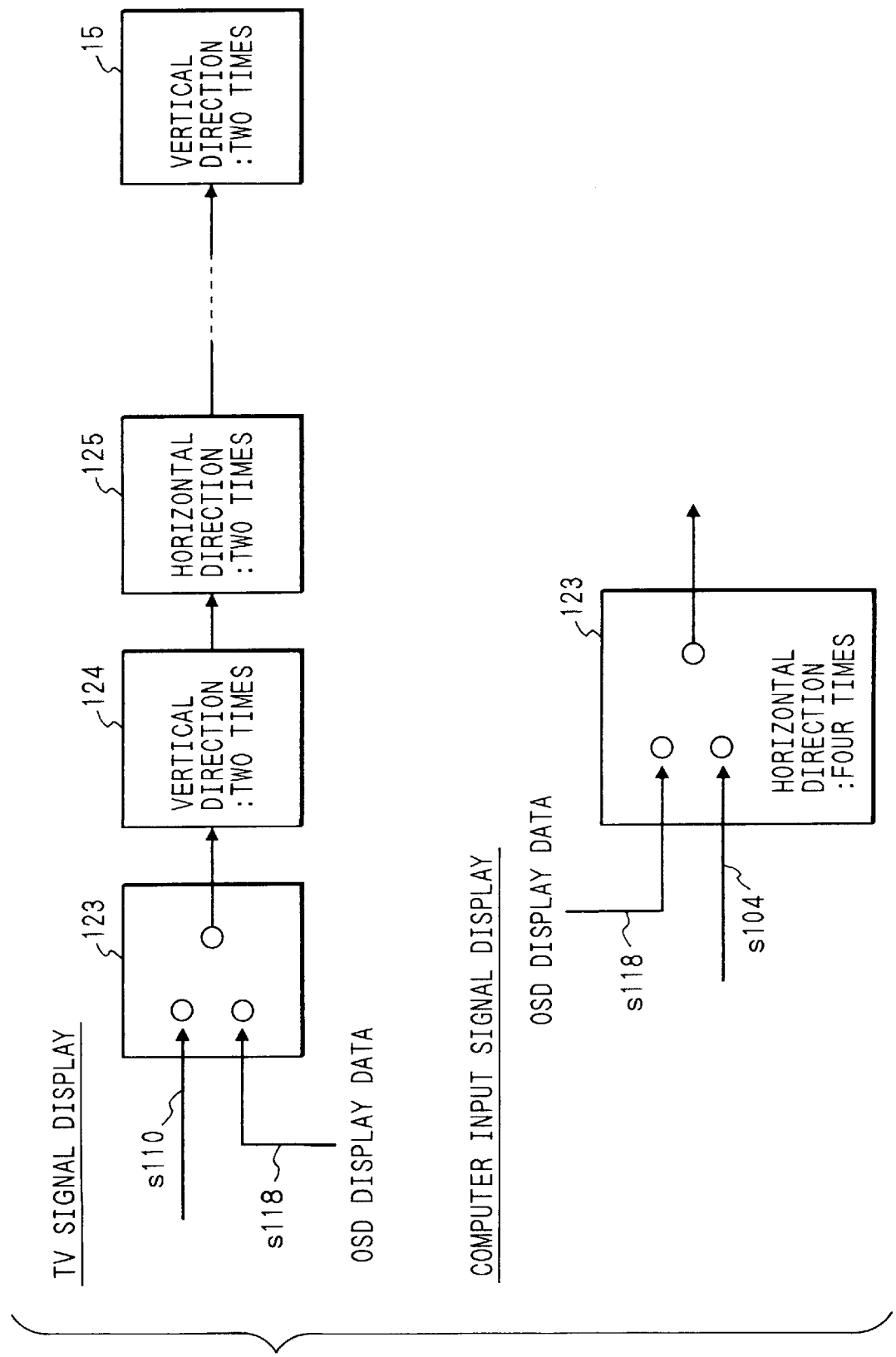

FIG. 39

| VIDEO SIGNAL INPUT | COMPUTER SIGNAL INPUT |
|---|---|
| 1: SWITCH TO TV | 1: SWITCH TO PC |
| 2: SOUND VOLUME ADJUSTMENT | 2: DISPLAY IMPOSSIBLE SIGNAL INPUT |
| 3: MODE SELECTION MENU | 3: SOUND VOLUME ADJUSTMENT |
| 4: LANGUAGE SELECTION | 4: MODE SELECTION MENU |
| 5: TV SIGNAL TYPE SELECTION (COMPOSIT SIGNAL/YC SEPARATION SIGNAL) | 5: LANGUAGE (ENGLISH/JAPANESE) SELECTION |
| 6: TONE (NORMAL/SIMULATE STEREO/SURROUND STEREO) | 6: TONE (NORMAL/SIMULATE STEREO/SURROUND STEREO) |
| 7: CONTRAST ADJUSTMENT | 7: γ VALUE SELECTION |
| 8: BRIGHTNESS ADJUSTMENT | 8: HALF TONE SELECTION |
| 9: CHROMATICNESS ADJUSTMENT | 9: PHASE ADJUSTMENT |
| 10: HUE ADJUSTMENT | 10: DISPLAY POSITION ADJUSTMENT (HORIZONTAL DISPLAY START, VERTICAL DISPLAY START, HORIZONTAL DISPLAY WIDTH) |
|  | 11: DPMS SELECTION (ON/OFF, OFF MODE TRANSITION TIME, SUSPEND MODE TRANSITION TIME) |
|  | 12: MANUAL TYPE SELECTION |

| FIG. 40A | |
|---|---|
| FIG. 40B | FIG. 40C |

KEY1: TV/PC SWITCHING KEY
KEY2: SOUND VOLUME UP KEY
KEY3: SOUND VOLUME DOWN KEY
KEY4: MENU KEY
KEY5: SET KEY
KEY6: UP KEY
KEY7: DOWN KEY
KEY8: CLEAR KEY
KEY9: RESET KEY

DISPLAY APPARATUS CAPABLE OF IMAGE DISPLAY FOR VIDEO SIGNALS OF PLURAL KINDS

BACKGROUND OF THE INVENTION

1. Field of the Invention

The present invention relates to a display apparatus, and more particularly to a display apparatus effecting display operation with a clock signal synchronized in phased with the input video signal.

2. Related Background Art

The so-called CRT display apparatus of raster scan type is being widely used as the display device for the host computers such as work stations (WS) and for the personal computers (PC), and the flat panel display apparatus such as the liquid crystal display panel and the plasma display are recently attracting attention, in consideration of the space saving, energy saving and ergonomics.

Between such host computer and the CRT display apparatus there is exchanged the video signal which is a combination of analog image data and vertical and horizontal synchronization signals or a composite synchronization signal containing such synchronization signals, but such video signal is available in numerous specifications, and the personal computer generally deals with plural video signals of different resolutions.

For example the IBM's PC compatible machine is capable of displaying the images of various video signals for example of 320 pixels×200 lines, 640×400, 720×400, 640×350, 640×480, 800×600, 1024×768, 1280×1024 etc.

On the other hand, in the field of the CRT display apparatus, there is already known so-called multi-sync CRT display apparatus which detects the state of the synchronization signals of the input video signal and displays the image corresponding to the respective video signal by matching the driving period and the width of the scanning lines with the synchronization signals of the video signal.

In such apparatus it is customary to measure the state of the synchronization signals in advance for certain video signals and to store the result of such measurement as the display parameters in a memory provided in the apparatus. Then, at the detection of the state of the synchronization signals of the input video signal, if the input video signal can be specified by the result of such detection, the display parameters stored in the memory are utilized for achieving satisfactory display.

In contrast to such CRT display apparatus, the dot matrix display apparatus such as the liquid crystal display panel or the plasma display panel is suitable for display control with digital signals, so that the display is usually executed after the input analog image signal is subjected to analog-to-digital conversion.

In such display operation, since the dot matrix display is significantly more difficult to control than the CRT, it is customary to effect the display, in the horizontal direction, by sampling a pixel of the video signal corresponding to each pixel of the display panel. Consequently such display panel is mostly employed in an equipment in which the resolution of the video signal is equal to that of the display panel.

More specifically, though the equipment capable of displaying the images of certain resolution is available, such equipment is combined with a display device and the image display is available only in such combination. Also, even if the image display is available in certain resolving powers, it is still not possible to display the images of widely different resolutions as mentioned above, because the dot matrix display is limited to the simple functions of providing display with a resolving power of the displayed data the same as that of the sampled image data, or with the skipping of the image data with a predetermined interval.

In such dot matrix display apparatus, in order to achieve the functions comparable to those of the multi-sync CRT display apparatus, it is necessary to specify the input video signal and to effect the control matching the resolution.

However, the video signal currently supplied to the CRT display apparatus does not contain the information on the dot clock frequency of the pixels in the horizontal direction, necessary for determining the optimum sampling frequency for A/D conversion.

Also the synchronization signals in the above-mentioned video signals can be widely different in the frequency and the wave form outside the effective image display period. In the conventional multi-sync CRT display apparatus, such differences are not critical, and the measurement of the synchronization signals may be limited to the simple measurement of the frequencies of the horizontal and vertical synchronization signals only in a part of the image display period.

On the other hand, the dot matrix display, relying on A/D conversion with a dot clock signal which is phase synchronized with the input synchronization signal, utilizes a so-called PLL circuit for generating such dot clock signal. Consequently, the above-mentioned variations in the input synchronization signals lead to an aberration in the phase synchronization or an increase in the jitter, thus detrimentally affecting the clock signal generation and eventually resulting in deterioration in the displayed image or instability in the control of the display apparatus.

SUMMARY OF THE INVENTION

An object of the present invention is to resolve the above-mentioned inconveniences.

Another object of the present invention is to generate a clock signal which is phase synchronized with the input video signal in a stable manner, for the input video signals of plural kinds.

The above-mentioned objects can be attained, according to the present invention, by an apparatus for displaying the image of an input video signal, utilizing a clock signal synchronized in phase with said input video signal, comprising:

a) clock generating means including a phase comparator for comparing the phase of a synchronization signal in said input video signal with that of said clock signal and adapted to generate a clock signal synchronized in phase with said input video signal;

b) display means for displaying an image of said input video signal, utilizing the clock signal generated by said clock generating means;

c) detection means for detecting the state of the synchronization signals in said input video signal; and d) control means for controlling the comparing operation of said phase comparator according to the output of said detection means.

Still another object of the present invention is to enable easy detection of a variation in the input video signal.

Still another object of the present invention is to enable satisfactory display of the image of the input video signal, even for the video signals of plural kinds.

Still other objects of the present invention, and the features thereof, will become fully apparent from the following detailed description of the embodiments, which is to be taken in conjunction with the attached drawings.

BRIEF DESCRIPTION OF THE DRAWINGS

FIGS. 25A, 25B, 25C, 26A, 26B, 26C, 27A, 27B, 27C, 28A, 28B, 28C, 29A, 29B, 29C, 30A, 30B and 30C are views showing the function of the interpolation unit in FIGS. 1A and 1B;

FIGS. 34 to 37 are views showing examples of OSD display in an embodiment of the present invention;

FIG. 38 is a view showing the image display operation in an embodiment of the present invention;

FIG. 39 is a table showing the items of OSD display in an embodiment of the present invention;

DETAILED DESCRIPTION OF THE PREFERRED EMBODIMENTS

Now the present invention will be clarified in detail by embodiments thereof, with reference to the attached drawings.

Figure 1B:
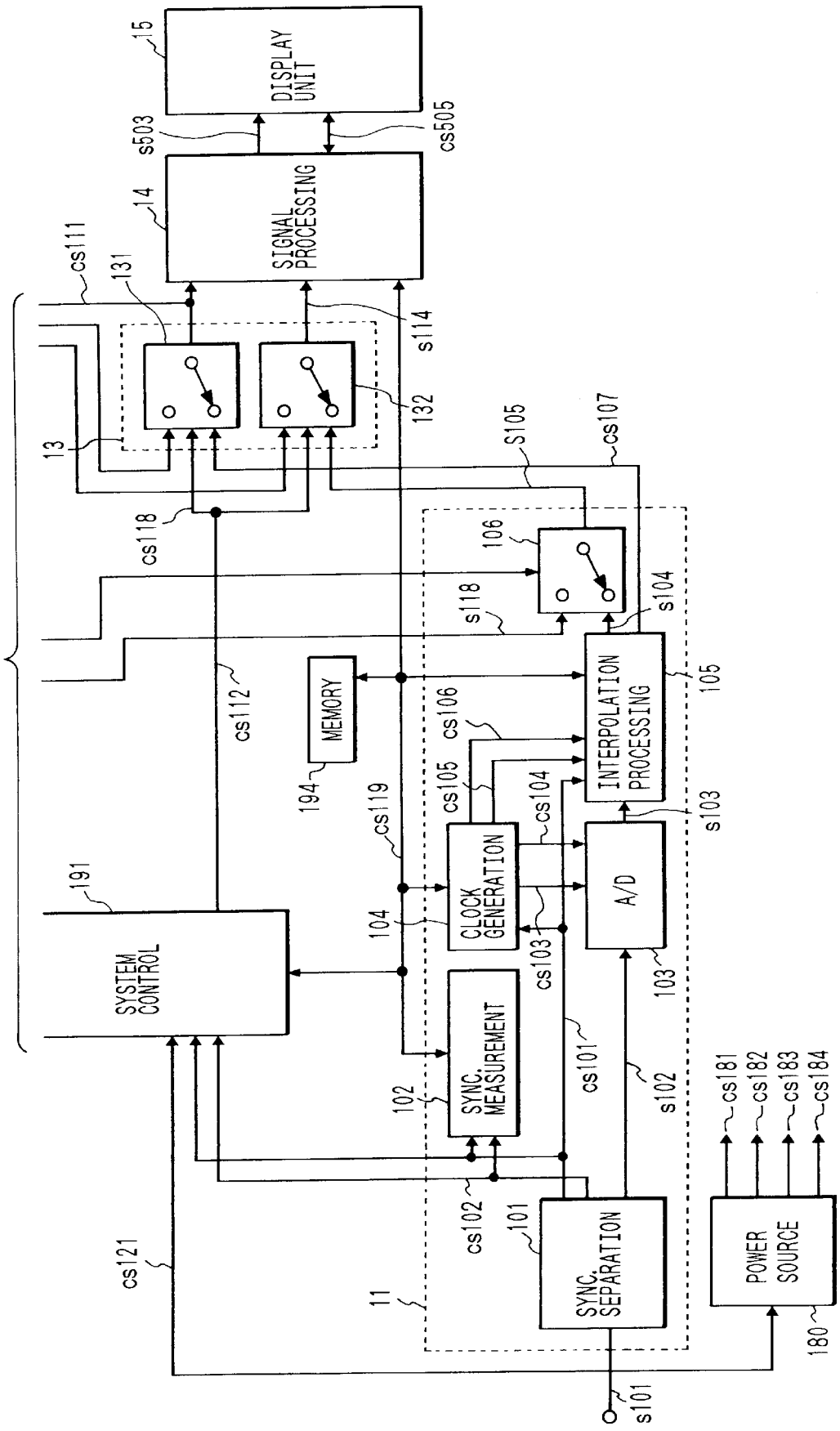
FIG. 1, composed of FIGS. 1A and 1B, is a block diagram showing a display apparatus embodying the present invention.

FIGS. 1A and 1B are block diagrams showing the configuration of an entire display apparatus including an embodiment of the present invention.

The display apparatus of the present embodiment is so designed as to accept the composite video signals such as NTSC, PAL, SECAM etc., the component video signals in which the luminance signal and the color difference signals are separated, and the analog video signals released from the computers such as personal computers and work stations.

Referring to FIGS. 1A and 1B, a processing unit 11 for the analog image signal from the host computer such as personal computer or work station is composed of a synchronization signal separation unit 101, a synchronization signal measurement unit 102, an A/D conversion unit 103, a clock generator 104, an interpolation unit 104 and an on-screen display (OSD) switching unit 106.

These blocks of the processing unit 11 will be explained in the following.

The synchronization signal separation unit 101 receives, from the host computer etc., a video signal s101 consisting of an RGB image signal and a synchronization signal such as the composite synchronization signal or the separate synchronization signals or the sync-on-green signal, and separates the video signal into an image signal s102 and a synchronization signal. It also generates, from thus separated synchronization signal, a negative horizontal/vertical synchronization signal cs101 and a sync signal polarity discrimination signal cs102.

The separated image signal s102 is supplied to the A/D conversion unit 103.

The synchronization signal cs101 is supplied to the synchronization signal measurement unit 102, the clock generator 104, the interpolation unit 105 and a system control circuit 191.

The sync signal polarity discrimination signal cs102 indicates the polarity of the entered synchronization signal s101, and is supplied to the synchronization signal measurement unit 102 and the system control circuit 191.

The synchronization signal measurement unit 102 receives the horizontal/vertical synchronization signal cs101 and the sync signal polarity discrimination signal cs102, and sends the result of measurement to the system control circuit 191 through a control bus cs119 as will be explained later.

The synchronization signal measurement unit 102 functions in the following manner.

Figure 2:
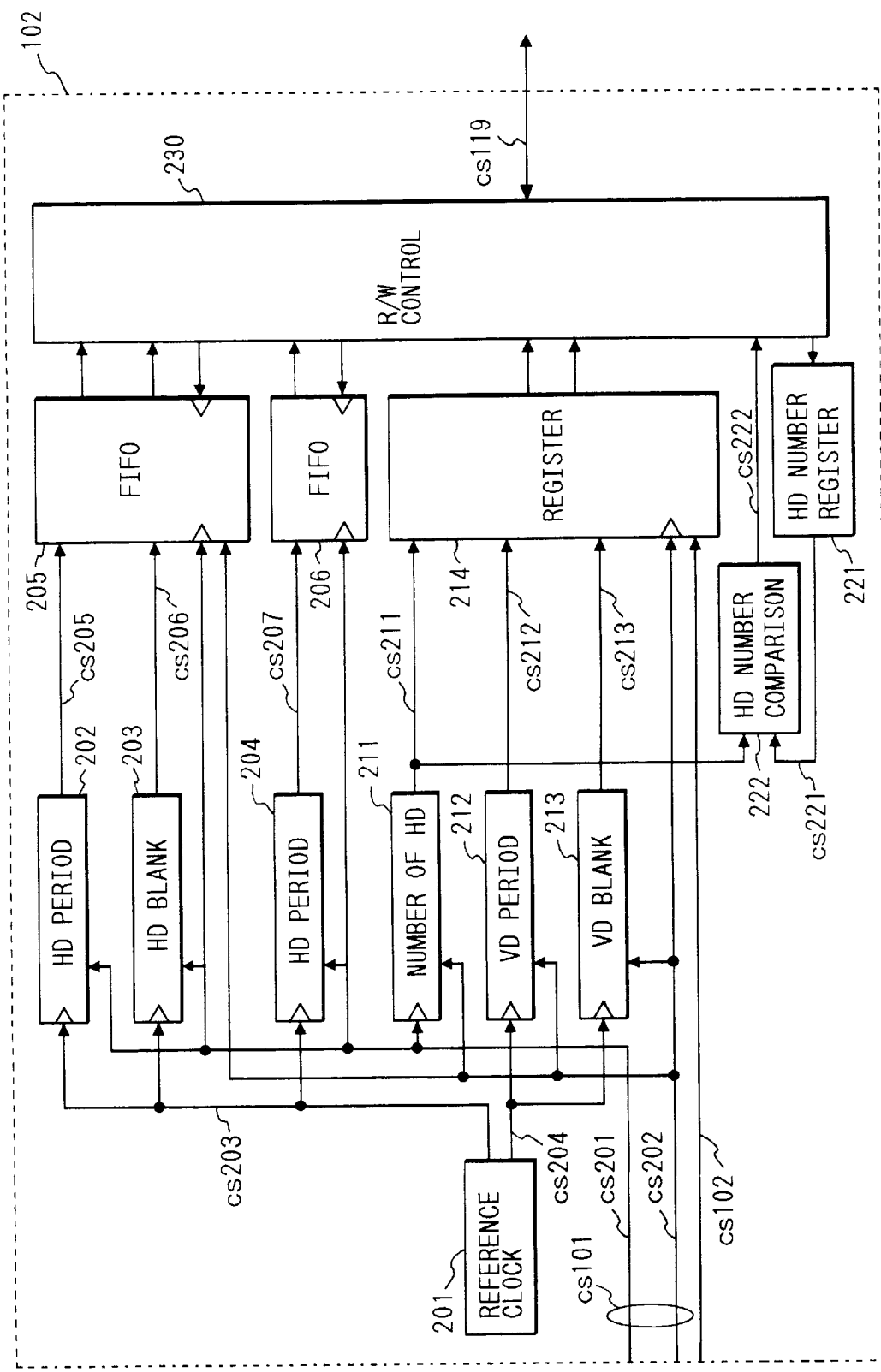
FIG. 2 is a view showing the configuration of the synchronization measurement unit in FIGS. 1A and 1B.

FIG. 2 is a block diagram showing the configuration of the synchronization signal measurement unit 102.

A clock generator 210 generates clock signals cs203, cs204 of sufficiently high frequencies, required for measuring the repeating period of the horizontal synchronization signal (HD signal) cs211 and the vertical synchronization signal (VD signal) cs202.

A counter 202 for measuring the period of the HD signal counts the clock signal cs203 from the clock generator 201 during a period from a downshift of the HD signal to the next downshift. The result cs205 of the counting is stored as PHD1, in an FIFO 205 in synchronization with the downshift of the HD signal, as will be explained later.

A counter 203, for measuring the blanking period THD of the HD signal (the negative HD signal remaining at level 0), counts the clock signal cs203 from the clock generator 201 during a period from a downshift of the HD signal to the next downshift. The result cs206 of the counting is stored as THD, in the FIFO 205 in synchronization with the downshift of the HD signal.

A counter 204, for measuring the period of the HD signal, counts the clock signal cs203 from the clock generator 201 during a period from an upshift of the HD signal to the next upshift, and the result cs205 of the counting is stored as PHD2, in an FIFP 206 in synchronization with the downshift of the HD signal.

An FIFP 205 stores the above-mentioned data PHD1, THD and VD at least for a VD period, and sends these data to a bus cs119 through a read/write control circuit (R/W control circuit) 230.

An FIFP 206 stores the above-mentioned data PHD2 at least for a VD period and sends the data to the bus cs119 through the R/W control circuit 230.

A counter 211 counts the number of the HD signal in a VD period from an upshift of the HD signal to the next upshift. The result cs211 of the counting is stored as NHD, in a register 214 in synchronization with the upshift of the VD signal, as will be explained later.

A counter 212, for measuring the period of the VD signals, counts the clock signal cs204 from the clock generator 210 during a period from an upshift of the VD signal to the next upshift, and the result cs212 of the counting is stored as PVD, in the register 214 in synchronization with the upshift of the VD signal.

A counter 213, for measuring the blanking period TVD of the VD signal (VD signal remaining at level 0), is reset at the downshift of the VD signal and counts the clock signal cs204 from the clock generator 201 during a period of the next upshift, and the result cs213 of the counting is stored as TVD in the register 214 in synchronization with the upshift of the VD signal as will be explained later.

A register 214 stores the above-mentioned data NHD, PVD and VTD and the polarity discrimination signal cs102 in synchronization with the VD signal, and, in response to the completion of the storage of these data, sends these data to the bus cs119 through the R/W control circuit 230.

An HD number comparing register 221 stores the number of the HD signal to be compared, through the bus cs119 and the R/W control circuit 230.

A comparator 222 compares the count of the counter 211 with the output of the register 221, and activates a line cs222 in case of coincidence, thereby sending a coincidence signal to the bus cs119 through the R/W control circuit 230.

An R/W control circuit 230 controls the data transmission between the FIFO's 205, 206, register 214, HD number comparing register 211, comparator 222 and the control bus cs119.

Figure 3:
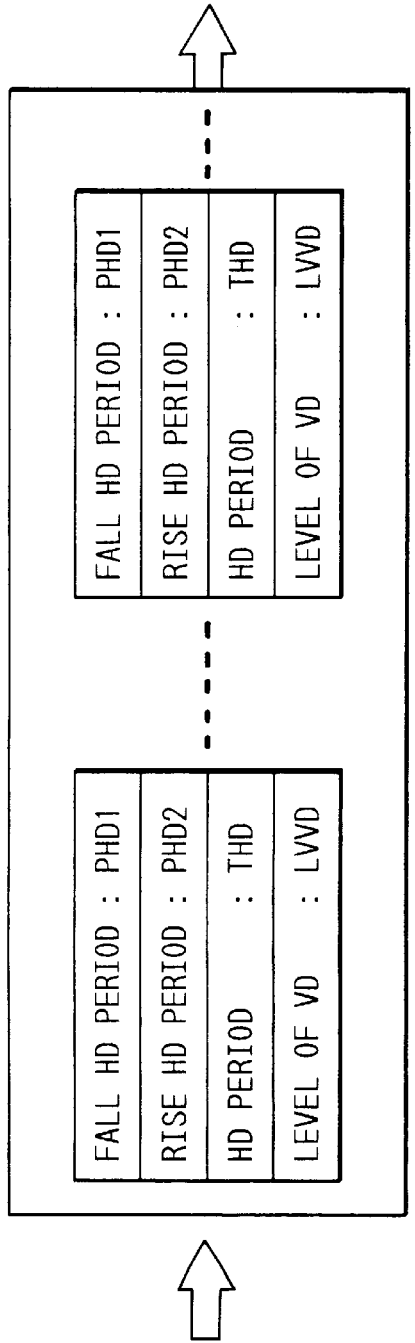
FIG. 3 is a view showing the content of the FIFO in FIG. 2.
Figure 4:
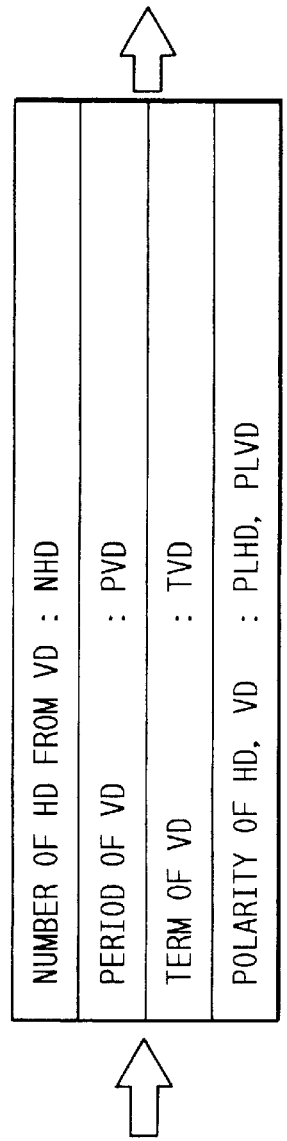
FIG. 4 is a view showing the stored content of the register in FIG. 2.

In the present embodiment of the above-explained configuration, the FIFO's 205, 206 and the register 214 respectively have the contents as shown in FIGS. 3 and 4.

Now reference is again made to FIGS. 1A and 1B.

Figure 5:
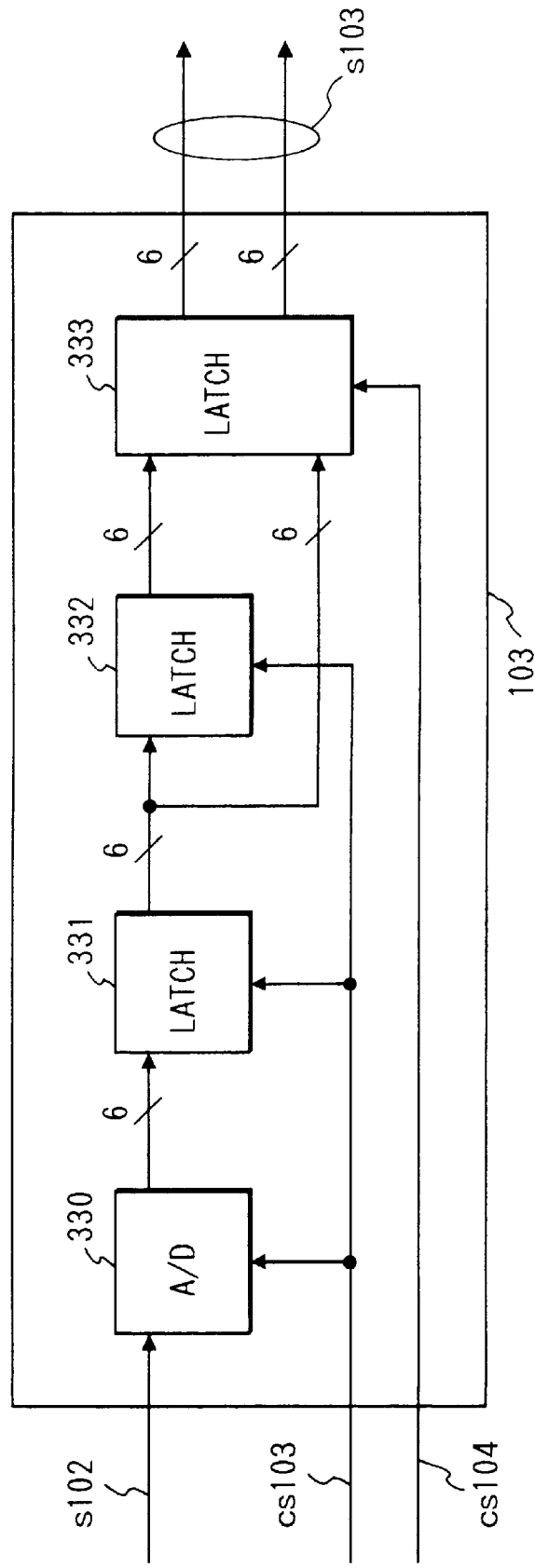
FIG. 5 is a view showing the configuration of the A/D conversion unit in FIGS. 1A and 1B.

An A/D conversion unit 103 has the configuration shown in FIG. 5.

An A/D conversion circuit 330 converts the analog RGB signal s102, after the separation of the synchronization signal, into a digital signal by sampling a dot clock signal cs103 from a clock generator 104.

Latches 331–333 output a digital RGB image signal s113 by reducing the transfer rate of the digital image data after A/D conversion into ½, according to the dot clock signal cs103 and a control signal cs104 from a clock generator 104.

A clock generator 104 generates the dot clock signal used for sampling the image data s102.

In the following the function of the clock generator 104 will be explained with reference to FIG. 6.

Figure 6:
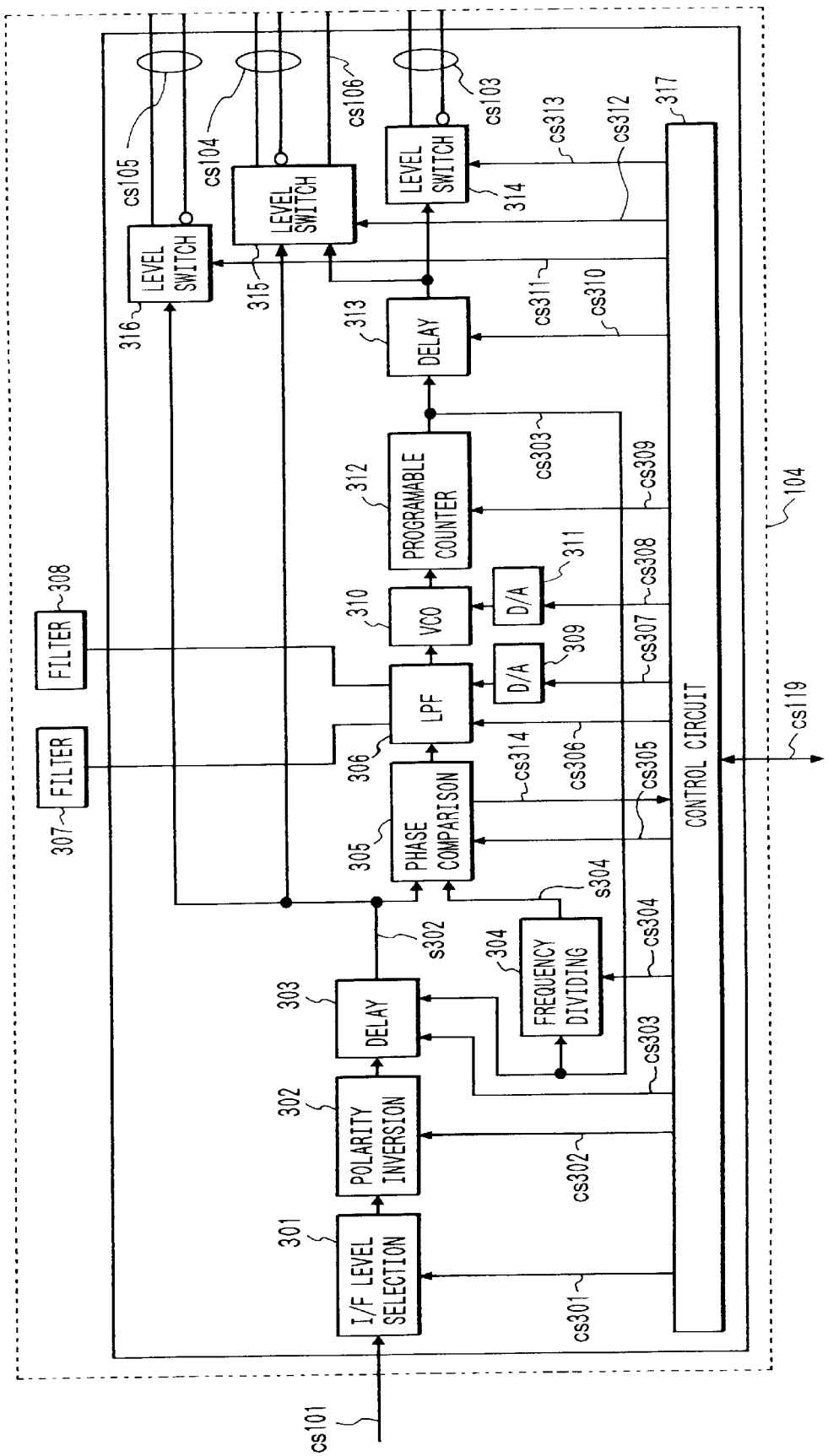
FIG. 6 is a view showing the configuration of the clock generator in FIGS. 1A and 1B.

FIG. 6 is a block diagram showing the configuration of the clock generator 104, which is composed of a PLL circuit basically including a phase comparator 305, a charge-pump type loop filters 306–308, a voltage-controlled oscillator (VCO) 310 and a frequency divider 304.

A control circuit 317 effects communication with the bus cs119 connected to the system control circuit and stores control data for controlling the function of the clock generator 104.

The HD signal of the video signal, entered as explained in the foregoing, is supplied to an A/F level control circuit 301, which converts, according to a control signal cs301, the level of the HD signal to a level suitable for the interface such as TTL or PECL supplying signals to a synchronization separation circuit 101, and sends the thus converted HD signal to a polarity inversion circuit 302.

The polarity inversion circuit 302, for controlling the polarity of the input synchronization signal so as to enable, in the phase comparison in a succeeding phase comparator 305, the phase comparison at both the upshift and downshift edges of the HD signal, switches the polarity of the input synchronization signal according to a control signal cs302, for supply to a delay circuit 303.

A delay circuit 303 receives the HD signal and the dot clock signal and programmably delays the HD signal for at least a period of the dot clock signal, and the delay time is variable according to a control signal cs303.

As explained in the foregoing, the input video signal is separated into the synchronization signal and the image signal. At these signals are respectively supplied to different processing systems, there is generated a phase difference between the image data supplied to the A/D conversion unit 103 and the A/D conversion sampling clock signal generated by the clock generator 104. The phases of the image data and the sampling clock signal are therefore adjusted by the delay circuit 303. The thus adjusted HD signal is supplied, as a reference HD signal s302, to a phase comparator 305 and an output level switching circuit 315.

A frequency divider 304 effects frequency division on a dot clock signal s303, released from a programmable counter 312 to be explained later, with a frequency division ratio set by the system control circuit 191, and the frequency division ratio is controlled by a control signal cs305.

Figure 7:
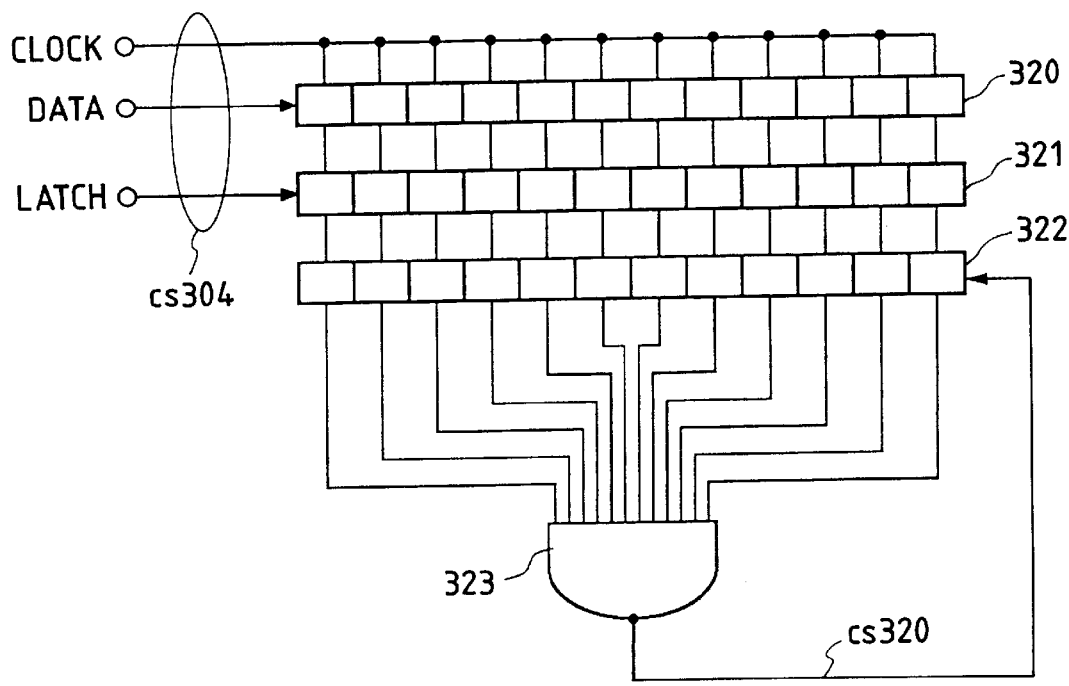
FIG. 7 is a view showing the configuration of the frequency divider in FIG. 6.

FIG. 7 shows the configuration of the frequency divider 304.

The frequency divider control signal cs304 contains three signals i.e. clock data and latch signals, and the data signal is transferred serially to a shift register 320, in synchronization with the clock signal. After the completion of the data transfer, the data of the shift register 320 are transferred to a register 321 of a main divider, by the latch signal.

An OR gate 323 discriminates whether the value of the main divider 322 becomes equal to 0, and, when a level 0 is reached, outputs a load signal cs320 to the main divider 322, which in response transfers the data of the register 321 to the main divider 322.

A phase comparator 305 receives the reference HD signal s302 subjected to the delay adjustment and the output signal s304 from the divider 304 and compares the phases thereof, and outputs a signal, having a voltage corresponding to the phase difference, to a filter 306.

Also the phase comparator 305 supplies a phase lock signal cs314, indicating whether the aforementioned PLL circuit is in the phase locked state, to the system control circuit 191 through a control circuit 317.

A filter 306 is composed of a charge pump 306 and low-pass filters 307, 308. It supplies the VCO 310 with a DC voltage by eliminating the high frequency components and the noises from the output signal of the phase comparator 305, and serves to control the response speed of the PLL by varying the charge pump current in the following manner.

The control circuit 317 controls the charge pump current by sending a value, set by the system control circuit 191, as a control signal cs307 to a D/A converter 309 and supplying the charge pump 306 with a current corresponding to the thus converted value.

The response characteristics of the PLL are determined by a filter 307 or 308, composed of a resistor and a capacitor and having a predetermined filter constant. In this embodiment the response speed of the PLL is thus rendered controllable by the adjustment of the gain and the filter constant.

A VCO 310 releases a signal having a frequency corresponding to the output voltage of the filter 306. It also has a free-run frequency, determined by the output signal of a D/A converter 311. More specifically, the control circuit 317 supplies the D/A converter 311 with a control signal cs308 corresponding to the frequency set by the system control circuit 191, and the VCO effects spontaneous oscillation with a frequency corresponding to the output voltage of the D/A converter 311.

A programmable counter 312 effects frequency division on the output signal of the VCO 310 with a frequency division ratio set by the system control circuit 191, and the frequency division ratio is set by a control signal cs309 from the control circuit 317.

The use of this counter 312 allows to obtain the signal of a frequency lower than the variable frequency range of the VCO 310, so that the locking range of the PLL circuit can be widened. Inversely the variable frequency range of the VCO 310 can be made narrower, so that the oscillation thereof can be made stabler. The output signal of the programmable counter 312 is supplied as a dot clock signal s303 to the frequency divider 304 and a delay circuit 313.

The delay circuit 313 effects the phase adjustment between the dot clock signal s303 and the reference HD signal s302 for the following reason.

The PLL circuit in the clock generator 104 locks the phase difference between the reference HD signal and the output signal of the frequency divider but does not adjust the phase difference. Consequently the reference HD signal and the dot clock signal mutually have a phase difference, which is adjusted by the delay circuit 313, by delaying the output signal of the programmable counter 312 according to the control signal cs310. The output signal of the delay circuit 313 is supplied to level switching circuits 314, 315.

The level switching circuits 314–316 switch the output level according to the destinations of the clock signals, such as TTL, ECL or PECL.

The level switching circuit 314 receives the dot clock signal s303 from the delay circuit 313 and converts it to a level suitable for ECL, for supply to the A/D conversion unit 103.

The level switching circuit 315 receives the dot clock signal s303 from the delay circuit 313 and the reference HD sinal as the resetting signal, converts them to a level suitable for ECL and TTL and releases a signal obtained by ½ frequency division of the dot clock signal s303.

Figure 8:
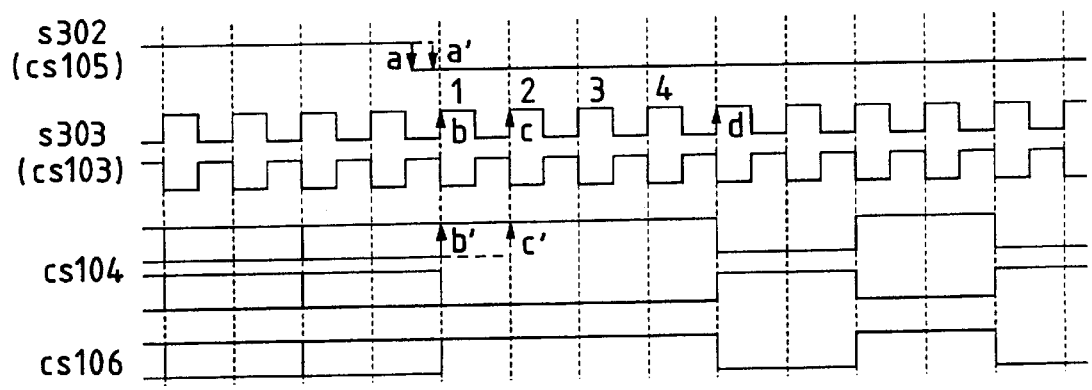
FIG. 8 is a timing chart showing the function of the level conversion circuit in FIG. 6.

FIG. 8 is a timing chart showing the function of the level switching circuit 315.

The low level state of the resetting signal s302 is detected at the upshift edge b of the clock signal s303, and the outputs s104 and s106 are reset during 4 cycles of the clock signal s303.

In order to securely latch the low level state at the upshift edge b, there has to be satisfied a set-up time for the edge b. This requirement is satisfied by the adjustment of the phase difference of the resetting signal s302 and the dot clock signal s303 by the delay circuit 313. Thereafter the signals cs104, cs106 are rendered active at the upshift edge of the clock signal s303.

An ECL complementary signal cs104 is released as a demultiplexing signal for the A/D conversion unit 103, and a TTL single end signal cs106 is released as a master clock signal of the interpolation circuit 105.

In the following there will be explained the method of measuring the input video signal, specifying the type of the apparatus and determining the display mode.

Figure 9:
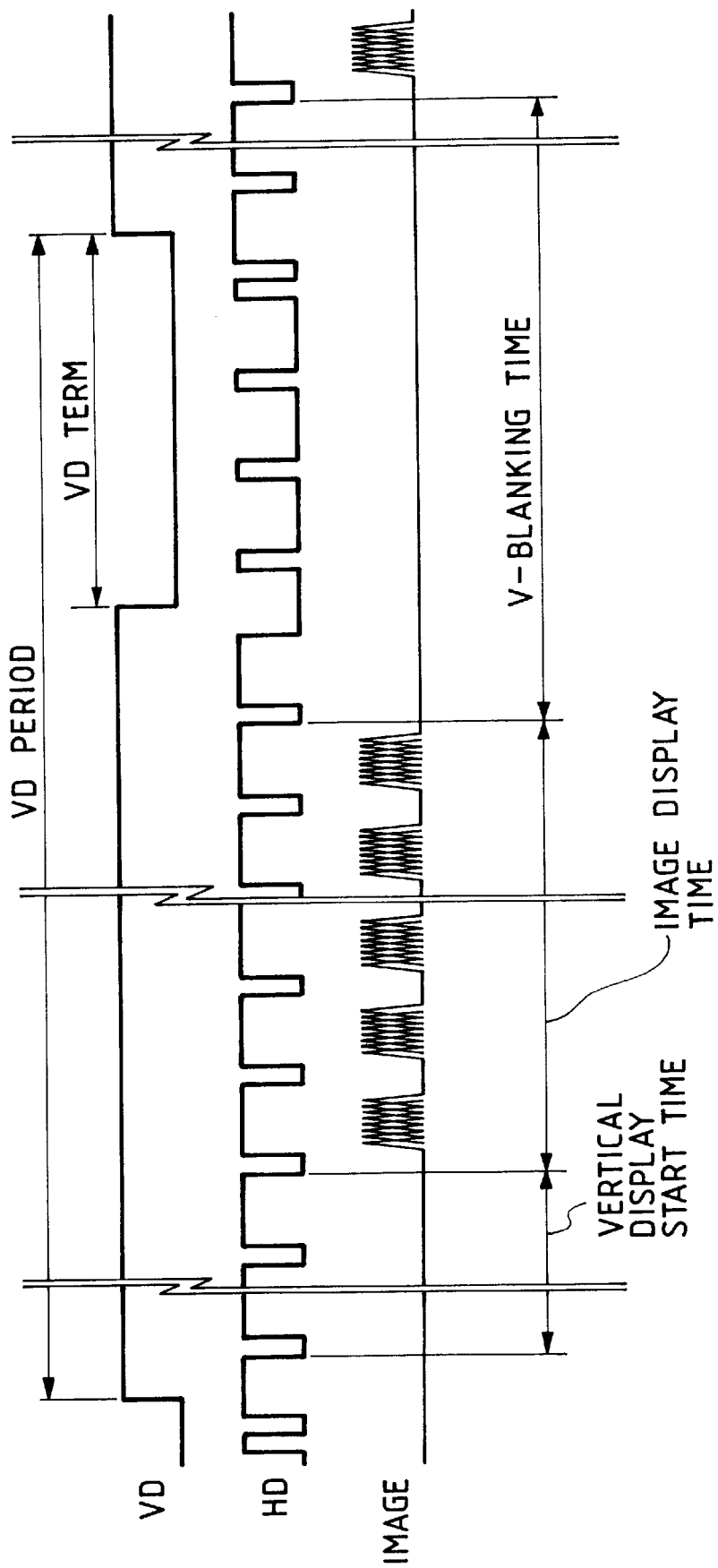
FIGS. 9 to 13 are timing charts showing examples of the video signals to be processed in the embodiments of the present invention.
Figure 10:
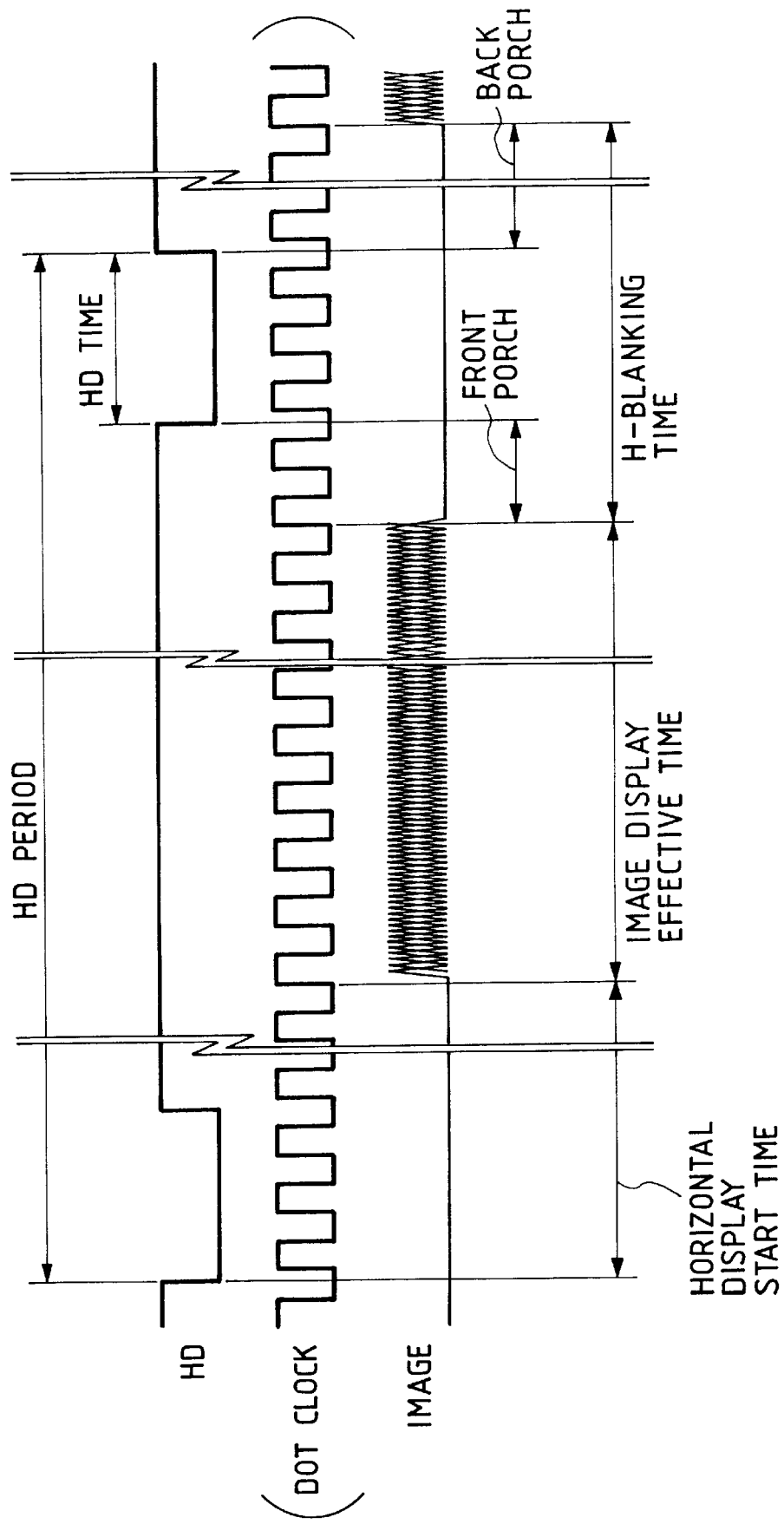

FIGS. 9 and 10 are timing charts showing wave forms of common video signals.

For satisfactorily displaying the image on the dot matrix panel employed in the present embodiment, it is necessary to obtain, in addition to the parameters directly obtainable from the actually supplied synchronization signals such as the PHD1, PHD2, PVD, VD, number of HD signals per VD, and synchronization pulse widths THD, VHD given by the aforementioned synchronization signal measuring units, other parameters such as horizontal/vertical display start times, front porch, back porch and dot clock signal of the image signal.

In the present embodiment, a memory 194 stores a display mode table containing the above-mentioned parameters, measured in advance, of the output video signals of the host computer which is anticipated to be connected. This display mode table also contains a set of default parameters to be used in case the display mode cannot be specified. Such default parameters are selected as assumedly optimum values, based on the resolving power of the display panel of the present embodiment and the common video signals.

Figure 11:
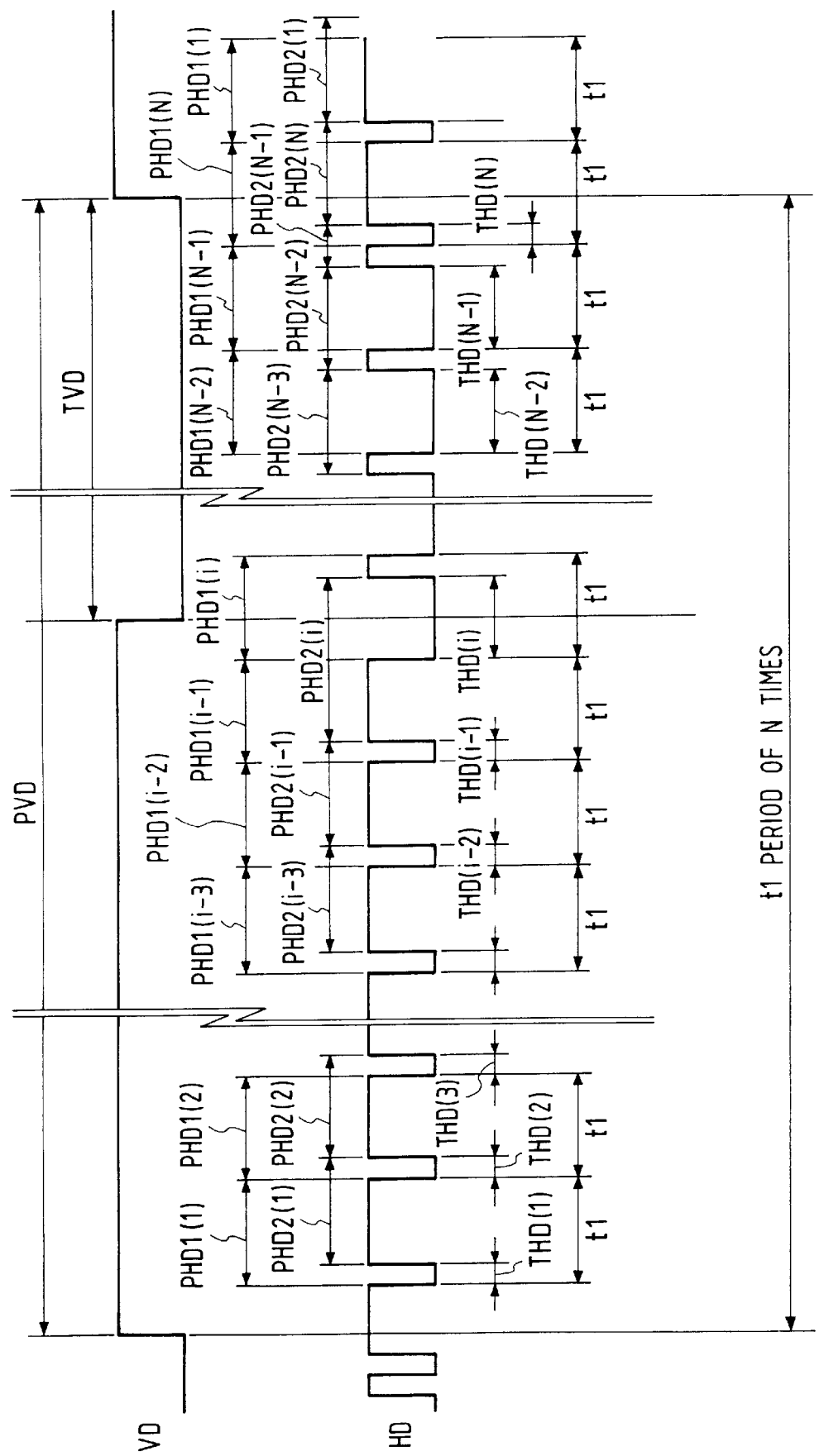
Figure 12:
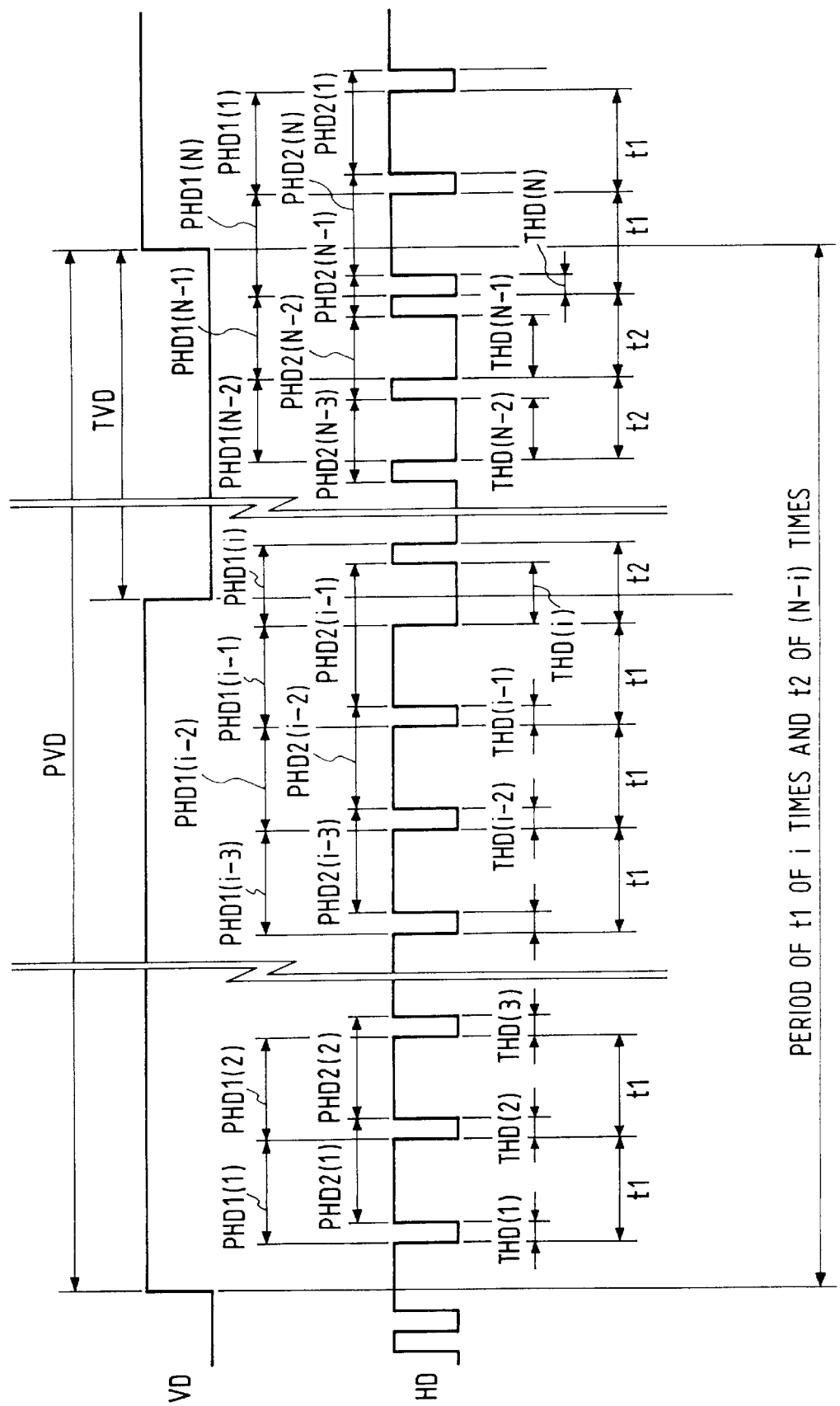
Figure 13:
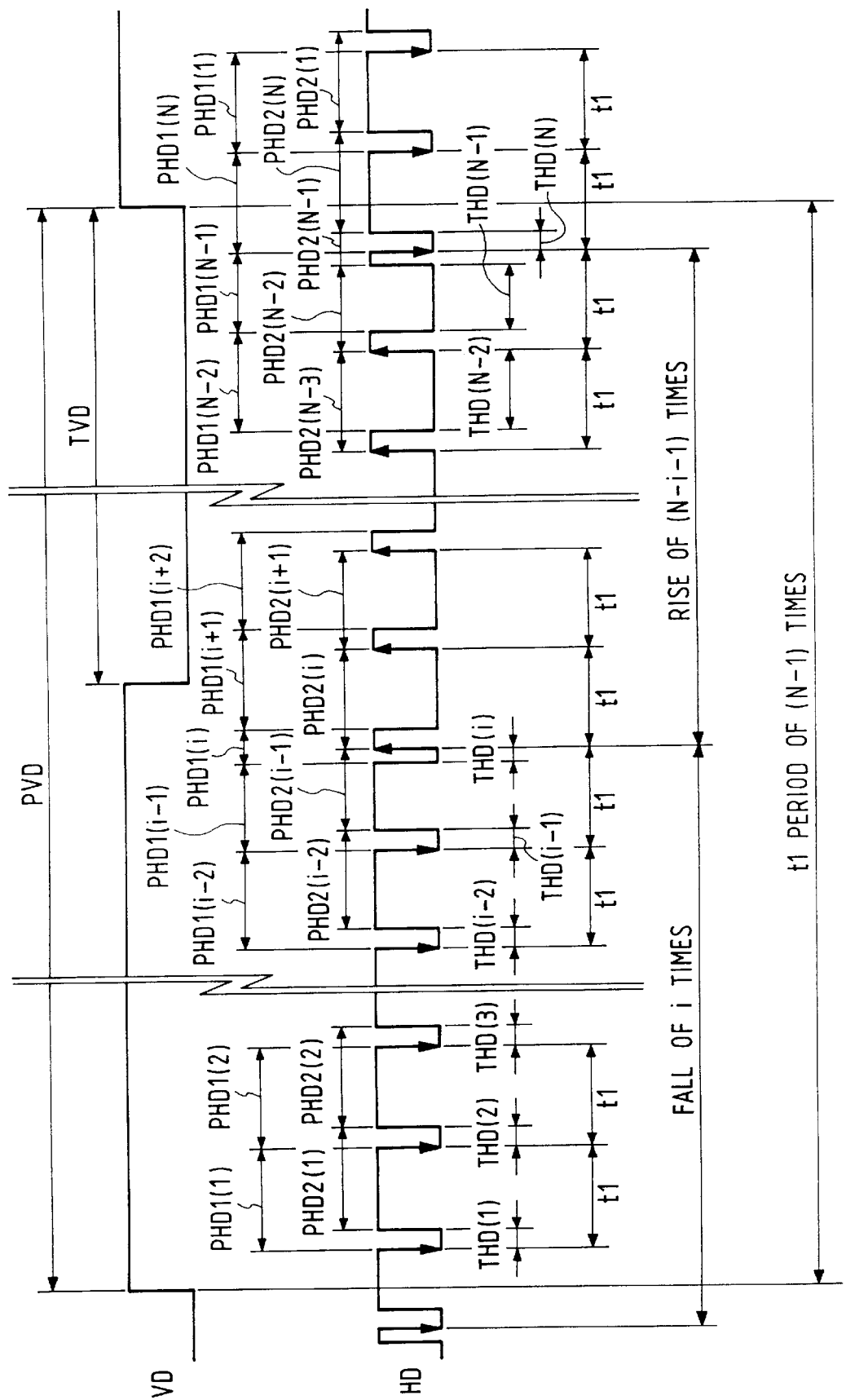

FIGS. 11 to 13 illustrate certain examples of the synchronization signals of the video signal.

FIG. 11 shows a most common example, in which the HD signal is inverted in polarity in synchronization with the VD signal TVD, but the HD signal has a constant period and the downshift edges are also constant.

FIG. 12 shows another example in which the HD signal varies in period in synchronization with the VD signal TVD, but the downshift edges are constant.

FIG. 13 shows still another example in which the period of the HD signal becomes constant by varying the detecting edge in synchronization with the VD signal TVD.

In the present embodiment, in order to convert the input image signal into the digital signal as explained in the foregoing, it is necessary to at first form a sampling clock signal for the image signal, synchronized with the HD signal. For this purpose, the system control circuit 191 provides the desired sampling clock signal by controlling the generation of the dot clock signal s303 and the clock signals cs103–cs105, by setting the various parameters in the control circuit 317 of the clock generator 104, after the discrimination of the display mode.

Figure 14:
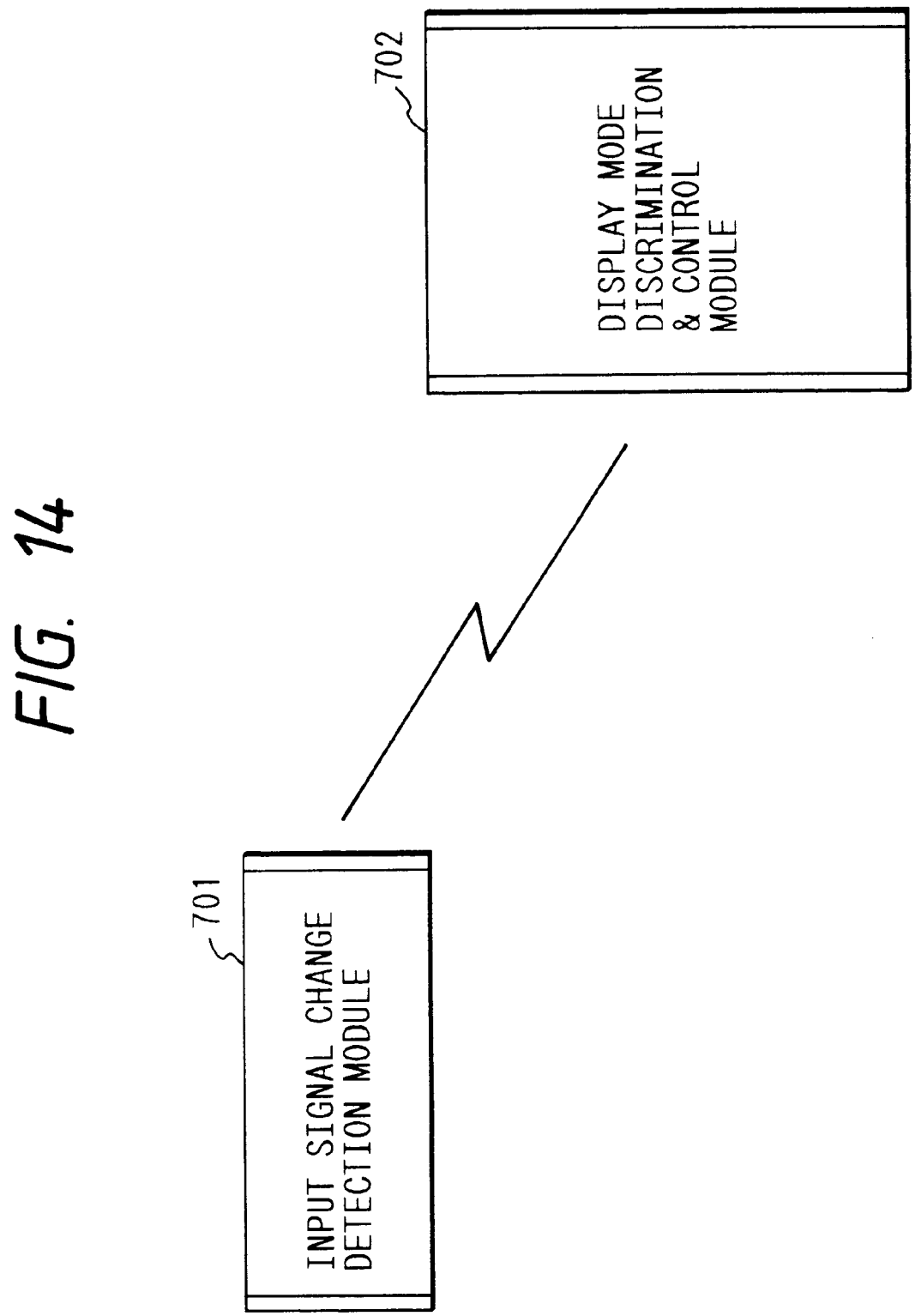
FIG. 14 is a view showing the control of the display operation according to the change in the synchronization signals, in the embodiment of the present invention.

FIG. 14 shows an example of schematic flow of the control of the measurement of the input video signal, identification of the apparatus and determination of the display mode.

As shown in FIG. 14, this control can be divided into a module 701 for measuring the variation in the input signal and a module 702 for discriminating and controlling the display mode, and these modules function in an independent manner.

The synchronization signal variation measuring module 701 detects any change such as a change in the host equipment, detachment of the connecting cable with the host equipment or a change in the frequency of the synchronization signal due to a change in the display mode, and sends a display mode changing request to the display mode discriminating and controlling module 702.

The module 702 effects discrimination of the display mode and control therefor, in response to the changing request from the detecting module 701.

Figure 15:
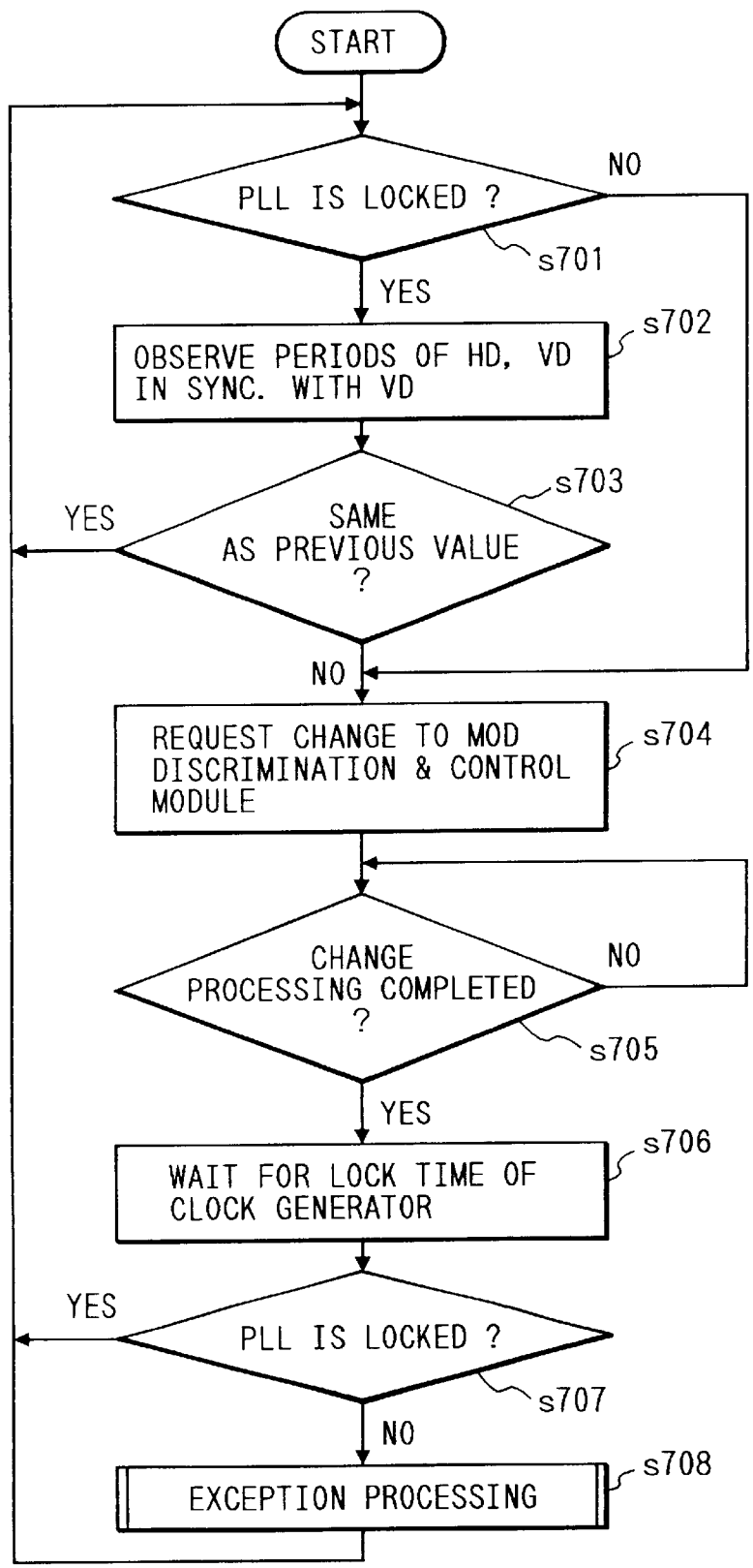
FIG. 15 is a flow chart showing the detecting sequence for a variation in the input signal in an embodiment of the present invention.

In the following there will be explained, with reference to FIG. 15, the function of the synchronization signal variation detecting module 701.

It is assumed that the operation is going on which any display mode. At first, in a step S701, the system control circuit 191 monitors the phase lock signal cs314 released from the clock generator 104, and, if the phase becomes unlocked, a change in the inut video signal is identified and the sequence proceeds to a step S704.

The step S704 clears a change end flag in the system control unit 191 and sends a display mode change request to the display mode discriminating and controlling module.

On the other hand, if the phase is in the locked state, the sequence proceeds to a step S702 to read the periods of the HD and VD signals from the synchronization signal measuring unit 102, and a step S703 compares these periods with the previously read values. If these values are same, the input video signal is identified as remaining same and the sequence returns to the step S701.

If the comparison indicates a change from the previous values, the sequence proceeds to the step S704 to sends a display mode change request to the display mode discriminating and controlling module.

Then a step S705 sets a change process flag in the system control circuit 191 and awaits the completion of the change process. After the completion, a step S706 monitors the phase locking signal cs314, after a waiting time required by the clock generator 104 for phase synchronization with the input image signal.

If the phase is in the locked state, the sequence returns to the step S701, but, if it is unlocked, the situation is identified as unprocessable by the present module and the sequence proceeds to a step S708 for an exceptional process. The exceptional process controls, for example, the clock generator 104 so as to obtain the maximum number of pixels displayable with the display unit 15 of the present embodiment.

Figure 16B:
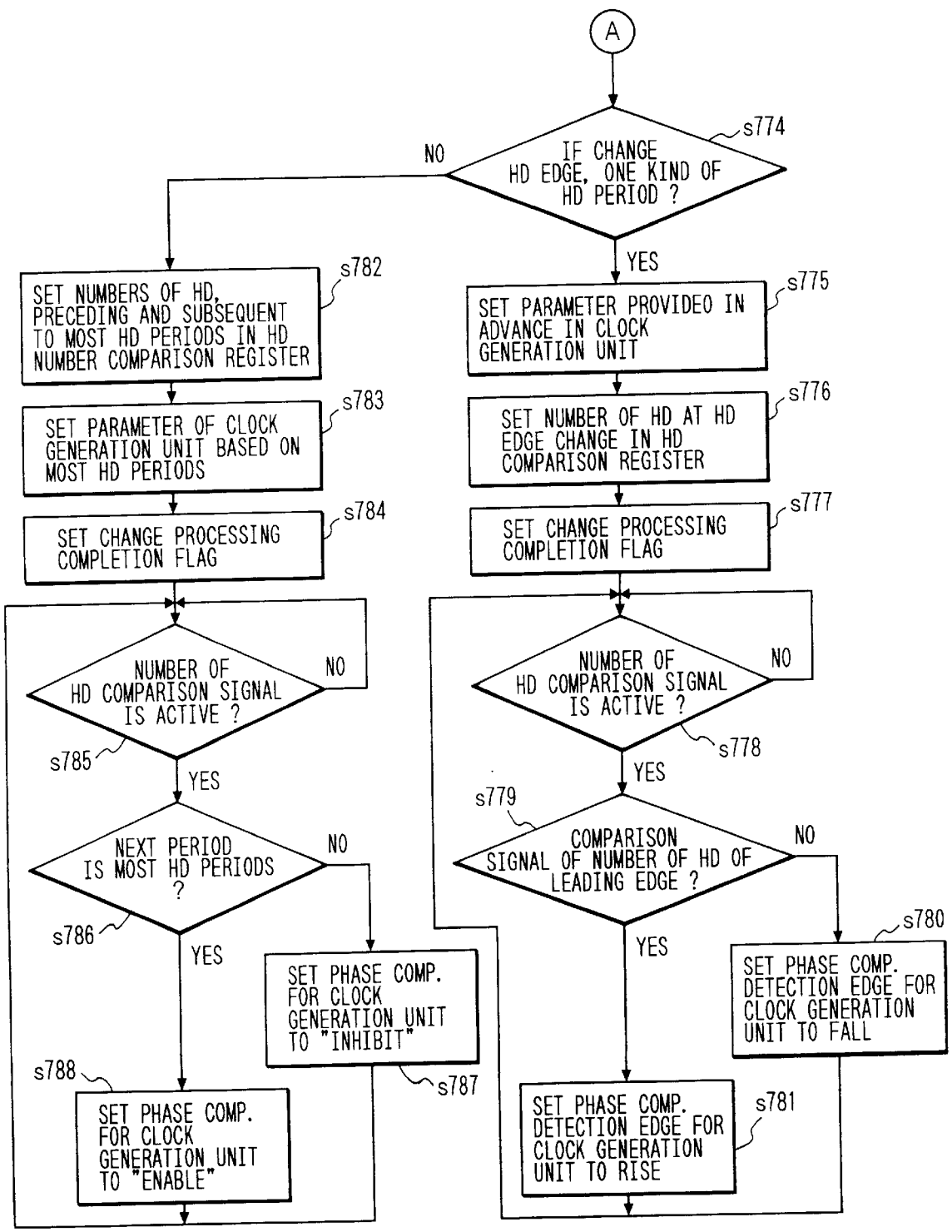
FIG. 16, composed of FIGS. 16A, 16B and 16C, is a flow chart showing the discriminating sequence for the display mode in an embodiment of the present invention.
Figure 16C:
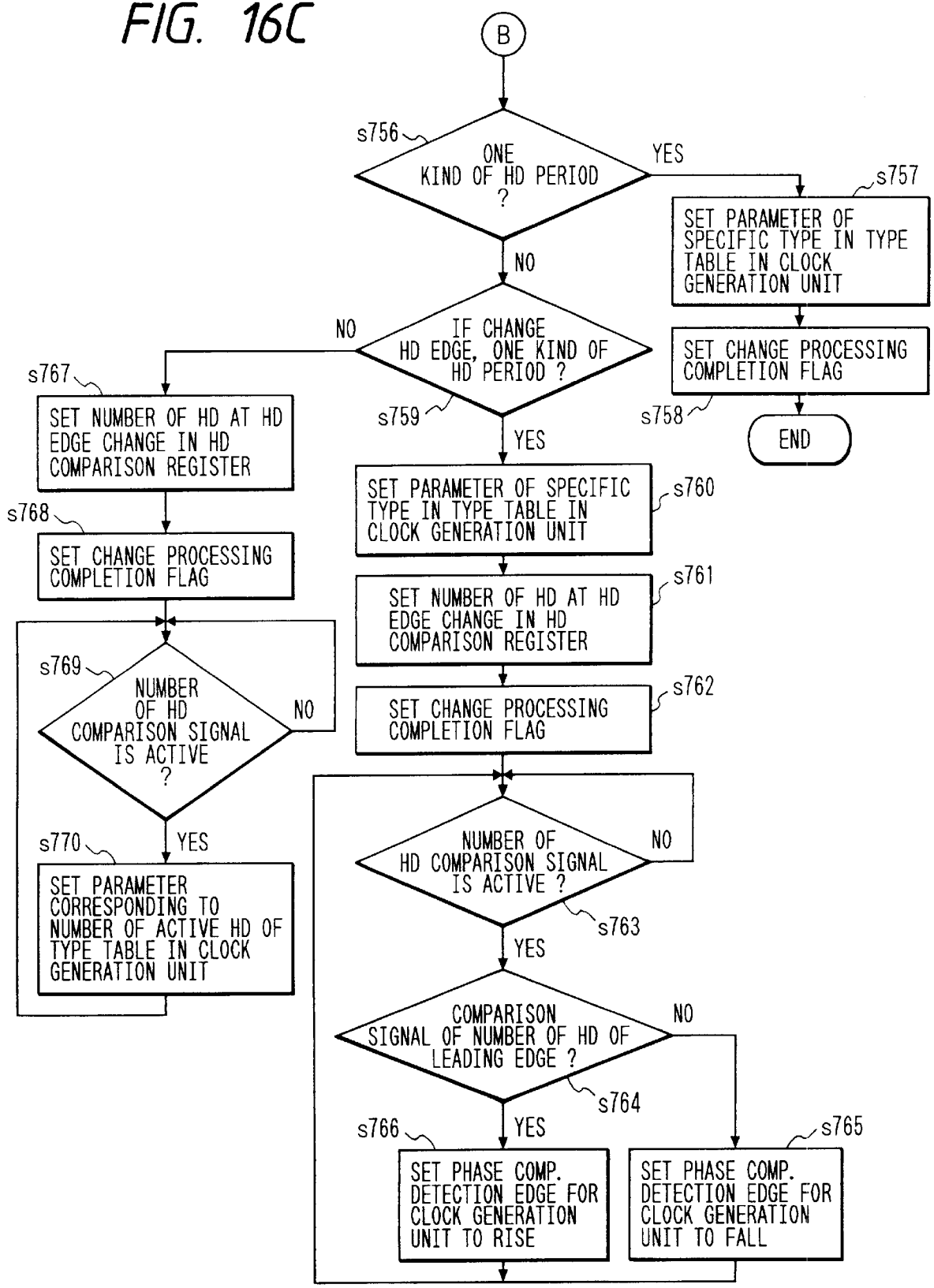

In the following there will be explained, with reference to FIGS. 16A to 16C, the function of the display mode discriminating and controlling module.

In this module, at first in a step S751, the system control circuit 191 controls the R/W control circuit 230 of the synchronization signal measuring unit 102 to read the parameters PHD1, PHD2, PVD, VD, number of HD signals per VD period, THD and VHD in a VD period from the FIFO's 205, 206 and the register 214 in synchronization with the upshift of the VD signal.

Then a step S752 compares thus read parameters with the content of the aforementioned display parameter table in the memory 194, representing various host apparatus, and discriminates whether a single host apparatus can be specified.

If completely matching data are found in the table, there can be specified a single host apparatus and the sequence proceeds to a step S756. If a single apparatus cannot be specified, a step S754 discriminates whether plural apparatus can be specified, and, if specifiable, a step S755 checks whether an apparatus type setting switch in a key matrix 192 is set.

Then there is discriminated whether the display mode set by the apparatus type setting switch is included in the modes of the plural apparatus specified in the step S754. If included, the mode set by the apparatus type setting switch is specified and the sequence proceeds to the step S756.

The step S756 discriminates whether the HD signal has only one downshift period PHD1, and, if so, a step S757 reads the parameters from the display mode table of the memory 194. These parameters are then supplied to the control circuit 317 in the clock generator 194 to control the frequency divider 304, the D/A converters 309, 311 etc. to generate the desired clock signal.

Then a step S758 sets the change process end flag, and informs the synchronization signal measuring module of the completion of the change process.

On the other hand, if the HD signal has plural down shift periods PHD1, the sequence proceeds to a step S759. If the downshift period of the HD signal is not one but can be unified by a change in the period detecting edge, for example if, as shown in FIG. 13, the HD signal has a downshift period PHD1 of t1 in the initial i cycles including the upshift of the VD signal and then a period PHD2 of t1 in the subsequent (N-i-1) cycles, the sequence proceeds to a step S760. Then, among the parameters of display mode specified from the display mode table in the memory 194, those for controlling the frequency divider 304, the D/A converters 309, 311 etc. are supplied to the control circuit 317.

Then a step S761 reads the numbers PHD(i-1), PHD(N−1) of the HD signals at the changing point of the HD period detecting edge from the specified mode table, and stores these numbers in a HD number comparing register 221 in the synchronization signal measuring unit 102.

Then a step S762 sets the change process end flag, and a step S763 detects whether the value of the HD number comparing register in the synchronization signal measuring unit 102 has coincided with the number of the HD signals in the input video signal to activate the control signal cs222 from the comparator 222. If activated, the sequence proceeds to a step S764 for discriminating whether the detection of the next HD period is to be effected at the downshift or upshift edge. In the example shown in FIG. 13, the detection is effected at the downshift edge or upshift edge respectively if the count of the HD signals is PHD(i-1) or PHD(N−1). In case of the downshift edge, a step S765 controls the polarity inversion circuit 302 in such a manner that the phase comparator 304 effects the phase comparison at the downshift edge. In case of the upshift edge, a step S766 causes the phase comparator 305 to effect the phase comparison at the upshift edge.

Then the sequence returns to the step S763 to repeat the above-explained sequence, thereby varying the edge for phase comparison.

On the other hand, if the step S759 can specify a single apparatus (display mode) but finds plural HD signals, for example the HD signal has PHD1 of t1 for the initial i cycles including the upshift of the VD signal and PHD1 of t2 for the subsequent (N−1) cycles as shown in FIG. 12, a step S767 reads the numbers PHD(i-1), PHD(N−1) of the HD signals at the changing points in the HD period in the specified mode, from the display mode table of the memory 194 and stores these numbers in the HD number comparing register 221 in the synchronization signal measuring unit 102.

Then a step S768 sets the change process end flag and a step 769 detects whether the value of the HD number comparing register 221 has coincided with the number of the HD signals to activate the control signal cs222 from the comparator 222. If activated, a step S770 reads the corresponding parameters from the display mode table to control the clock signal generating operation of the clock generator 104 as explained in the foregoing. Subsequently the sequence returns to the step S769.

As explained in the foregoing, even in the presence of a change in the HD period, the dot clock signal s303 and the clock signals cs103–cs105 can be so controlled as to assume desired frequencies and phases.

In case the display mode of the input video signal cannot be specified in the step S754 or S755, a step S721 discriminates, as in the step S756 or S759, whether the HD period of the input video signal is only one or can be unified by a change in the HD detecting edge.

If the HD period is only one, a step S772 effects a process similar to that in the steps S757 to S758. More specifically, the parameters of the default mode are read from the display mode table of the memory 194 and the function of the clock generator 104 is controlled as explained in the foregoing. Then a step S773 sets the change process and flag and informs the synchronization signal measuring module of the completion of the change process.

On the other hand, if the downshift period PHD1 is not one kind, the sequence proceeds to a step S774. If the downshift period of the HD signal is not one but can be unified by a change in the period detecting edge, for example if, as shown in FIG. 13, the HD signal has a downshift period PHD1 of t1 in the initial i cycles including the upshift of the VD signal and then a period PHD2 of t1 in the subsequent (N-i-1) cycles, as in the step S759, there is executed a process similar to that in the steps S760 to S766.

More specifically, a step S775 reads the parameters of the default mode from the display mode table of the memory 194 for supply to the clock generator 104. Then a step S776 reads the numbers PHD(i-1), PHD(N−1) of the HD signal at the changing points of the HD period detecting edge, and stores these numbers in the HD number comparing register 221 of the synchronization signal measuring unit 102.

Then a step S777 sets the change process end flag, and a step S778 detects whether the value of the HD number comparing register 221 has coincided with the count of the HD signals to activate the control signal cs222 from the comparator 222. If activated, a step S779 judges whether the detection of the next HD period is to be effected at the downshift or upshift edge, and accordingly controls the polarity inversion circuit 302 of the clock generator 104. In a period around the inversion of polarity, a phase comparison enable signal cs305 is temporarily put into the inhibited state, in order to avoid disturbance in the phase difference detecting operation.

After the control of the detecting edge for the HD signal, the sequence returns to the step S778 to repeat the above-explained process. In this manner the phase comparing edge is controlled according to the input video signal.

On the other hand, if the step S774 cannot specify a single display mode and plural HD periods are present in a VD period, for example as shown in FIG. 12, the sequence proceeds to a step S782.

The example shown in FIG. 12 contains two HD periods, namely PHD1 of t1 in the initial i cycles including the upshift of the VD signal and PHD1 of t2 in the subsequent (N-i) cycles. If i>N-i, the most frequently appearing HD period in case of FIG. 12 is t1, and the number of the HD signals is i-1 immediately before the shift from such most frequently appearing period to the other period, while the number of the HD signals is N-1 immediately before the shift from the other period to the most frequently appearing period.

In such case, a step S782 detects the most frequently appearing HD period, among the plural HD periods, and the number of such most frequently appearing HD period, and sets the number NHD1 of HD signals immediately before the shift from the most frequently appearing HD period to the other HD period and the number NHD2 of the HD signals immediately before the shift from the other HD period to the most frequently appearing HD period, in the HD number comparing register 221 of the synchronization signal measuring unit 102.

Then a step S783 reads the parameters of the default display mode from the display mode table of the memory 194, and sends these parameters to the clock generator 104, thereby controlling the clock signal generating operation as explained in the foregoing.

Then a step S784 sets the change process end flag, and a step S785 detects whether the value of the HD signal comparing register 221 has coincided with the count of the HD signals to activate the control signal cs222 of the comparator 222. If activated, a step S786 discriminates whether the above-mentioned control signal indicates the HD signal immediately before the shift from the aforementioned most frequently appearing HD period to another HD period, or that from another HD period to the most frequently appearing period (namely discriminating whether the next HD period is the most frequently appearing one or the other one).

If the discrimination identifies other than the most frequently appearing one, the sequence proceeds to a step S787 to so control the clock generator 104 as to inhibit the function of the phase comparator 305.

If the most frequently appearing HD period is identified, the sequence proceeds to a step S788 to so control the clock generator 104 as to enable the function of the phase comparator 305. Then the sequence returns to the step S785 to repeat the above-explained process.

In this manner it is rendered possible to lock the PLL circuit to the most frequently appearing HD signal within a single VD signal cycle, thereby generating the clock signal which is phase synchronized with such most frequently appearing HD signal and minimizing the unlocked period of the PLL circuit. Thus the satisfactory display operation is made possible, as the disturbance on the PLL circuit resulting from the change in the synchronization signals can be minimized and the clock signals can be generated in stable manner.

In the embodiment shown in FIGS. 14 to 16A to 16C, in case of a change in the input video signal, the function of the clock generator 104 is controlled according to the data measured by the synchronization signal measuring unit 102, so that there can be stably generated the clock signals which are phase synchronized with any input video signal.

More specifically, satisfactory clock signals can be generated by a change in the compared edge of the HD signal in the phase comparator or by selection of the phase comparing operation therein, according to the measured data.

In the following there will be explained another example of the detecting operation for the change in the input signal and the discriminating operation for the display mode in the present embodiment.

Figure 17A:
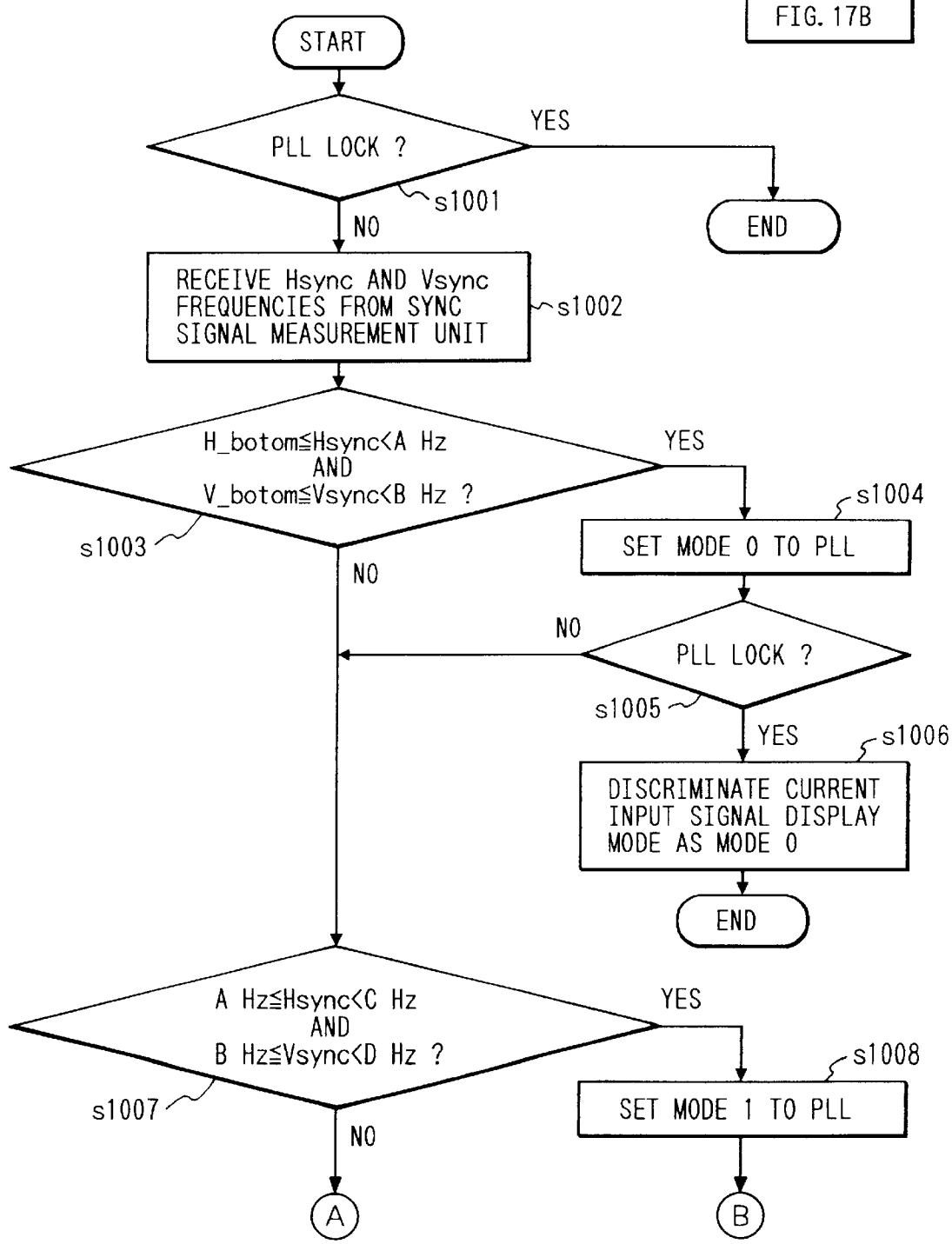
FIG. 17, composed of FIGS. 17A and 17B, is a flow chart showing another example of the input signal detection and the display mode discrimination in an embodiment of the present invention.
Figure 17B:
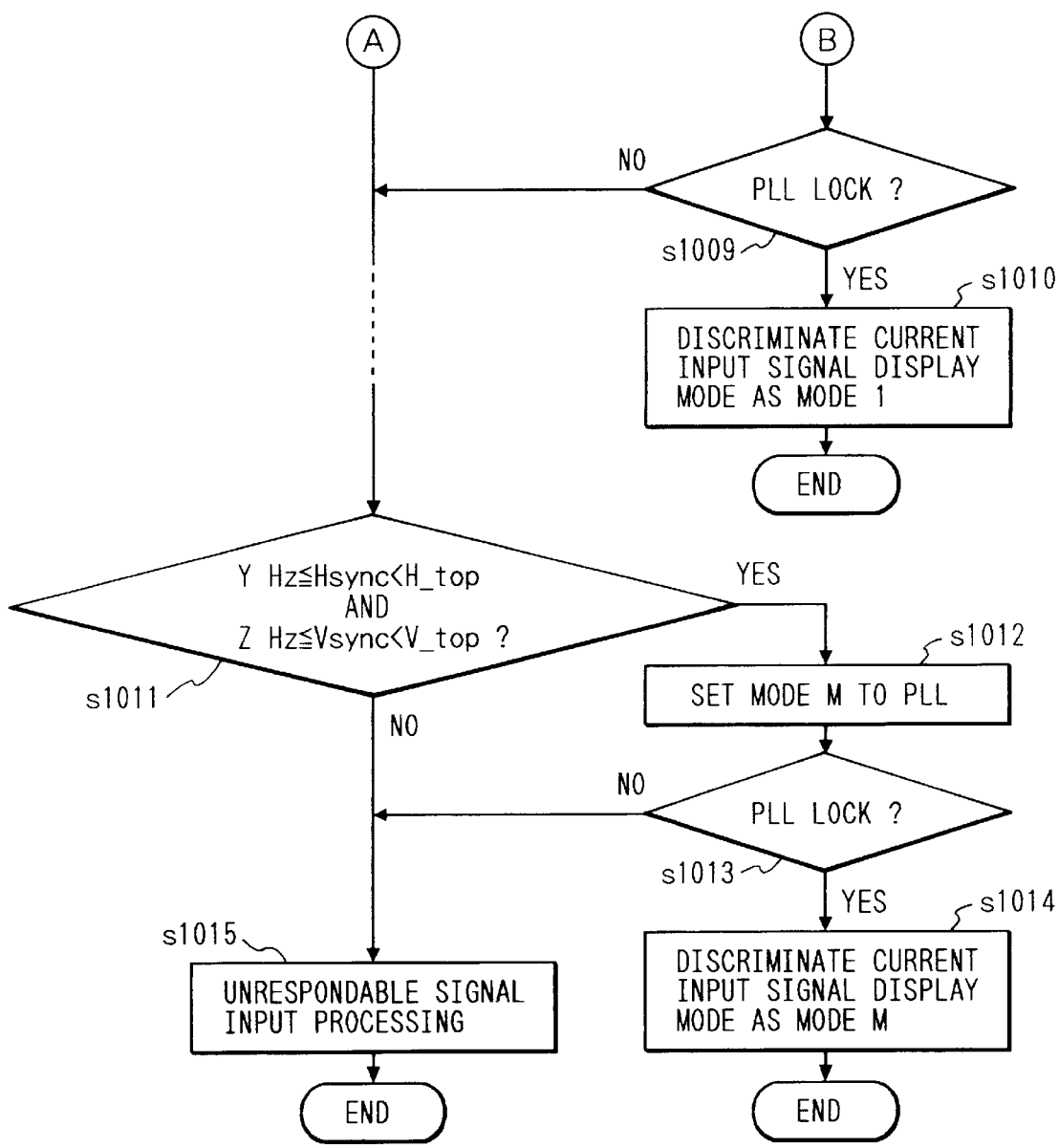

FIGS. 17A and 17B are flow charts showing such detecting process for the change in the input signal and discriminating process for the display mode.

In the example shown in FIGS. 14 to 16A to 16C, the discrimination of the display mode is confirmed by the control signal cs314, indicating the lock/unlock state of the phase comparator 305 in the clock generator 104.

Also in the example shown in FIGS. 17A and 17B, this lock/unlock control signal is used for detecting the change in the state of the input video signal, thereby discriminating the display mode.

Referring to FIGS. 17A and 17B, when the apparatus is functioning in any display mode, the system control circuit 191 confirms, in a step S1001, the state of the control signal cs314 from the clock generator 104. If the PLL circuit is in the unlocked state, there is identified a change in the display mode of the input video signal and in the output signal from the host computer, and the sequence proceeds to a step S1002. If the PLL circuit is in the locked state, the confirmation process is terminated.

The step S1002 receives anew the frequencies of the HD and VD signals from the synchronization signal measuring unit 102, and a step S1003 discriminates whether the frequency of the HD signal is within a range from a processable minimum frequency Hbottom (Hb) to a predetermined frequency A Hz and the frequency of the VD signal is within a range from a processable minimum frequency Vbottom (Vb) to a predetermined frequency B Hz.

If the frequencies of the synchronization signals are within these ranges, a step S1004 selects a mode 0, among the modes 0–M stored in the memory 194 and effects the control of the clock generator 104 and the display operation, according to this mode 0. Then a step S1005 discriminates whether the PLL circuit is again locked, and, if locked, a step S1006 identifies the current mode as the mode 0 and the process is terminated. On the other hand, if the step S1005 identifies the unlocked state again, the current mode is identified as not the mode 0, and the discrimination process is continued.

Then the above-explained steps S1003–S1005 are repeated to the mode M. If the input image signal cannot be identified within the modes 0 to M, the current input image signal is identified as unprocessable and a step S1015 effects a process for the unprocessable state, such as the display of a corresponding message on the display unit 15, whereupon the sequence is terminated.

Also in this example, as explained in the foregoing, it is rendered possible to easily detect the change in the state of the input video signal and to stably generate the clock signals corresponding to the input video signals.

Again referring to FIGS. 1A and 1B, an interpolation unit 105 applies a vertical interpolation process to the digitized RGB image signal s103 obtained from the A/D conversion unit 103, thereby converting the resolution matching that of the display panel 15.

At first there will be explained the algorithm employed in this interpolation unit.

Figure 18:
FIGS. 18 to 20 are views showing the function of the interpolation unit in FIGS. 1A and 1B.
Figure 19:
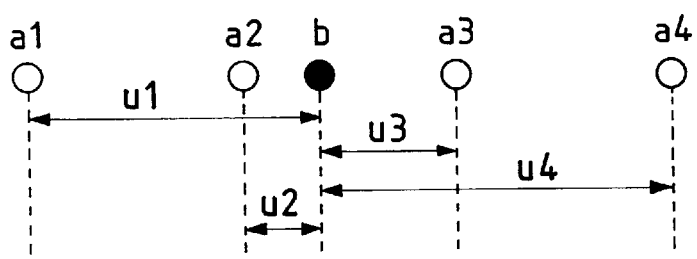
Figure 20:
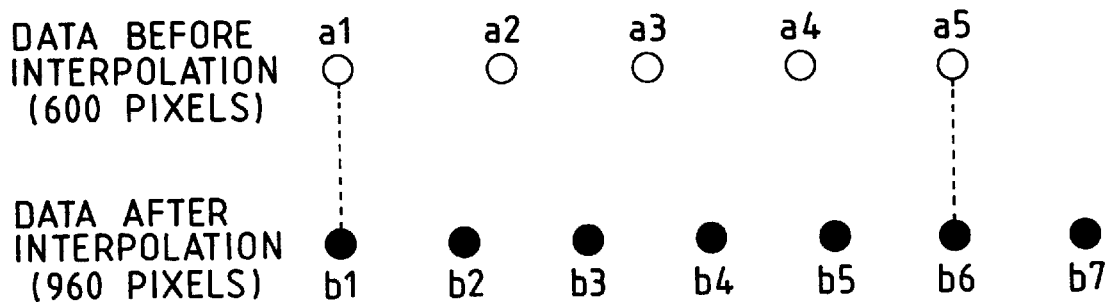

Now reference is made to FIGS. 18 to 20 for explaining the interpolation executed in the interpolation unit 105. Among the commonly utilized interpolating methods, there are known, for example, the nearest neighborhood interpolation, the linear interpolation (1st-order interpolation) and the 3rd-order convolution interpolation.

In the nearest neighborhood interpolation, a pixel before the interpolation, closest to the pixel to be interpolated, is taken as the interpolated pixel.

In the linear interpolation, the image data of the interpolated pixel is determined from the image data of the pixels on both sides of the interpolated pixel. In an example shown in FIG. 18, in case of interpolating a pixel b between pixels a1, a2 of a mutual distance 1, with respective distances u, v therefrom, the image data of the pixel b can be determined by the equation (1):

$$b = a1 \times u/(u+v) + a2 \times V/(u+v) \tag{1}$$

In the 3rd-order convolution interpolation, the image data of the interpolated pixel is determined by the image data of two pixels on each side of the interpolated pixel and a 3rd-order convolution function f, which is given by the following equation (2):

$$f(t) = \sin(\pi t)/(\pi t) \tag{2}$$

wherein t is the distance between the interpolated pixel and the two pixels at each side, having a mutual distance 1.

The equation (2) can be developed into the equation (3), (4) or (5), depending on the range of t:

$$f(t) = 1 - 2|t|^2 + |t|^3 \ (0 \leq |t| < 1) \tag{3}$$

$$f(t) = 4 - 8|t| + 5|t|^2 - |t|^3 \ (1 \leq |t| < 2) \tag{4}$$

$$f(t) = 0 \ (2 \leq |t|) \tag{5}$$

In an example shown in FIG. 19, in case of interpolating a pixel b between pixels a2 and a3, with respective distances u1, u2, u3 and u4 from the pixels a1, a2, a3 and a4 aligned with mutual distances 1, the image data of the pixel b can be determined from the following equation (6), utilizing the above-mentioned 3rd-order convolution function f:

$$b = a1(4 - 8 \times u1 + 5 \times u1^2 - u1^3) + a2(1 - 2 \times \\ u2^2 + u2^3) + a3(1 - 2 \times u3^2 + u3^3) + \\ a4(4 - 8 \times u4 + 5 \times 4u^2 - u4^3) \tag{6}$$

In the following there will be explained, with reference to FIG. 20, an example of interpolation from 768 pixels into 960 pixels by the linear (1st-order) interpolation and the 3rd-order convolution interpolation, utilizing the equations (1) and (6). In this example, the interpolated data of 8 pixels are prepared from the original data of 5 pixels. In this case, the image data bn after linear interpolation and after 3rd-order convolution interpolation are respectively given by the equations (7) and (8), based on the image data before the interpolation:

$$b5n + 1 = a4n + 1 \quad (n = 0, 1, 2, \ldots) \quad (7)$$
$$b5n + 2 = (4/5) \times a4n + 1 + (1/5) \times a4n + 2$$
$$b5n + 3 = (3/5) \times a4n + 2 + (2/5) \times a4n + 3$$
$$b5n + 4 = (2/5) \times a4n + 3 + (3/5) \times a4(n + 1)$$
$$b5n + 5 = (1/5) \times a4(n + 1) + (4/5) \times a4(n + 1) + 1$$

$$b5n + 1 = a4n + 1 \quad (n = 0, 1, 2, \ldots) \quad (8)$$
$$b5n + 2 = (-4/125) \times a4n + (29/125) \times a4n + 1 +$$
$$\quad (116/125) \times a4n + 2 + (-16/125) \times$$
$$\quad a4n + 3$$
$$b5n + 3 = (-12/125) \times a4n + 1 + (62/125) \times a4n + 2 +$$
$$\quad (93/125) \times a4n + 3 + (-18/125) \times$$
$$\quad a4(n + 1)$$
$$b5n + 4 = (-18/125) \times a4n + 2 + (93/125) \times a4n + 3 +$$
$$\quad (62/125) \times a4(n + 1) + (-12/125) \times$$
$$\quad a4(n + 1) + 1$$
$$b5(n + 1) = (-16/125) \times a4n + 3 + (116/125) \times$$
$$\quad a4(n + 1) + (29/125) \times a4(n + 1) + 1 +$$
$$\quad (-4/125) \times a4(n + 1) + 2$$

However the linear interpolation or the 3rd-order convolution interpolation utilizing the equations (7) or (8), if executed with a hardware (ASIC), requires an unrealistically large circuitry, because it involves complex divisional calculations.

In the present embodiment, therefore, in order to achieve the linear interpolation or the 3rd-order convolution interpolation with a limited magnitude of hardware, the coefficients in the equations (7) and (8) are approximated with the sum of exponents of 2, as shown in the following equations (9) and (10):

$$b5n + 1 = a4n + 1 \quad (n = 0, 1, 2, \ldots) \quad (9)$$
$$b5n + 2 = (1/2 + 1/4) \times a4n + 1 + (1/4) \times a4n + 2$$
$$b5n + 3 = (1/2 + 1/8) \times a4n + 2 + (1/4 + 1/8) \times$$
$$\quad a4n + 3$$
$$b5n + 4 = (1/4 + 1/8) \times a4n + 3 + (1/2 + 1/8) \times$$
$$\quad a4(n + 1)$$
$$b5n + 5 = (1/4) \times a4(n + 1) + (1/2 + 1/4) \times$$
$$\quad a4(n + 1) + 1$$

-continued
$$b5n + 1 = a4n + 1 \quad (n = 0, 1, 2, \ldots) \quad (10)$$
$$b5n + 2 = (-1/16) \times a4n + (1/4) \times a4n + 1 +$$
$$\quad (1/2 + 1/4 + 1/8 + 1/16) \times a4n + 2 +$$
$$\quad (-1/8) \times a4n + 3$$
$$b5n + 3 = (-1/8) \times a4n + 1 + (1/2) \times a4n + 2 +$$
$$\quad (1/2 + 1/4) \times a4n + 3 + (-1/8) \times$$
$$\quad a4(n + 1)$$
$$b5n + 4 = (-1/8) \times a4n + 2 + (1/2 + 1/4) \times$$
$$\quad a4n + 3 + (1/2) \times a4(n + 1) +$$
$$\quad (-1/8) \times a4(n + 1) + 1$$
$$b5(n + 1) = (-1/8) \times a4n + 3 + (1/2 + 1/4 + 1/8 +$$
$$\quad 1/16) \times a4(n + 1) + (1/4) \times a4(n + 1) +$$
$$\quad 1 + (-1/16) \times a4(n + 1) + 2$$

The approximation from the equations (7) to (9) is so made that the number of terms is as small as possible and that the maximum error of approximation does not exceed 1/20. Also the approximation from the equations (8) to (10) is so made that the number of terms is as small as possible and that the maximum error of approximation does not exceed 1/32.

If the deterioration of the image quality by the interpolation is to be reduced, the maximum error of approximation is reduced by the addition of the terms smaller than 1/64. On the other hand, if the magnitude of the hardware (ASIC) is to be reduced, the smaller terms such as 1/64 or 1/32 may be omitted though the error of approximation increases in such case.

Also the result of approximation in case of interpolation from 480 pixels to 960 pixels is represented by the equations (11) in case of linear interpolation and (12) in case of 3rd-order convolution interpolation:

$$b2n + 1 = an + 1 \quad (n = 0, 1, 2, \ldots) \quad (11)$$
$$b2(n + 1) = (1/2) \times an + 1 + (1/2) \times an + 2$$

$$b2n + 1 = an + 1 \quad (n = 0, 1, 2, \ldots) \quad (12)$$
$$b2(n + 1) = (-1/8) \times an + (1/2 + 1/8) \times an + 1 +$$
$$\quad (1/2 + 1/8) \times an + 2 + (-1/8) \times$$
$$\quad an + 3$$

Also the result of approximation in case of interpolation from 600 pixels to 960 pixels is represented by the equations (13) in case of linear interpolation and (14) in case of 3rd-order convolution interpolation.

$$b8n + 1 = a5n + 1 \quad (n = 0, 1, 2, \ldots) \quad (13)$$
$$b8n + 2 = (1/2 + 1/8) \times a5n + 1 + (1/4 + 1/8) \times a5n + 2$$
$$b8n + 3 = (1/4) \times a5n + 2(1/2 + 1/4) \times a5n + 3$$
$$b8n + 4 = (1/2 + 1/4 + 1/8) \times a5n + 2 + (1/8) \times a5n + 3$$
$$b8n + 5 = (1/2) \times a5n + 3 + (1/2) \times a5n + 4$$
$$b8n + 6 = (1/8) \times a5n + 4 + (1/2 + 1/4 + 1/8) \times a5(n + 1)$$
$$b8n + 7 = (1/2) + 1/4) \times a5n + 4 + (1/4) \times a5(n + 1)$$
$$b8(n + 1) = (1/4 + 1/8) \times a5(n + 1) + (1/2 + 1/8) \times a5(n + 1) + 1$$

-continued $$b8n + 1 = a5n + 1 \quad (n = 0, 1, 2, \ldots) \quad (14)$$
$$b8n + 2 = (-1/16 + -1/32) \times a5n + (1/4 + 1/8 + 1/16 + 1/32) \times$$
$$\quad a5n + 1 + (1/2 + 1/4) \times a5n + 2 + (-1/8) \times a5n + 3$$
$$b8n + 3 = (-1/8) \times a5n + 1 + (1/2 + 1/4 + 1/8) \times a5n + 2 +$$
$$\quad (1/4 + 1/32) \times a5n + 3 + (-1/32) \times a5n + 4$$
$$b8n + 4 = (-1/64) \times a5n + 1 + (1/8 + 1/64) \times a5n + 2 + (1/2 +$$
$$\quad 1/4 + 1/8 + 1/16 + 1/32) \times a5n + 3 +$$
$$\quad (-1/16 + -1/32) \times a5n + 4$$
$$b8n + 5 = (-1/8) \times a5n + 2 + (1/2 + 1/8) \times a5n + 3 + (1/2 +$$
$$\quad 1/8) \times a5n + 4 + (-1/8) \times a5(n + 1)$$
$$b8n + 6 = (-1/16 + -1/32) \times a5n + 3 + (1/2 + 1/4 + 1/8 +$$
$$\quad 1/16 + 1/32) \times a5n + 4 + (1/8 + 1/64) \times a5(n + 1) +$$
$$\quad (-1/64) \times a5(n + 1) + 1$$
$$b8n + 7 = (-1/32) \times a5n + 3 + (1/4 + 1/32) \times a5n + 4 + (1/2 +$$
$$\quad 1/4 + 1/8) \times a5(n + 1) + (-1/8) \times a5(n + 1) + 1$$
$$b8(n + 1) = (-1/8) \times a5n + 4 + (1/2 + 1/4) \times a5(n + 1) + (1/4 +$$
$$\quad 1/8 + 1/16 + 1/32) \times a5(n + 1) + 1 +$$
$$\quad (-1/16 + -1/32) \times a5(n + 1) + 2$$

In the following there will be explained, with reference to FIG. 21, an example of the configuration of the interpolation unit 105.

Figure 21:
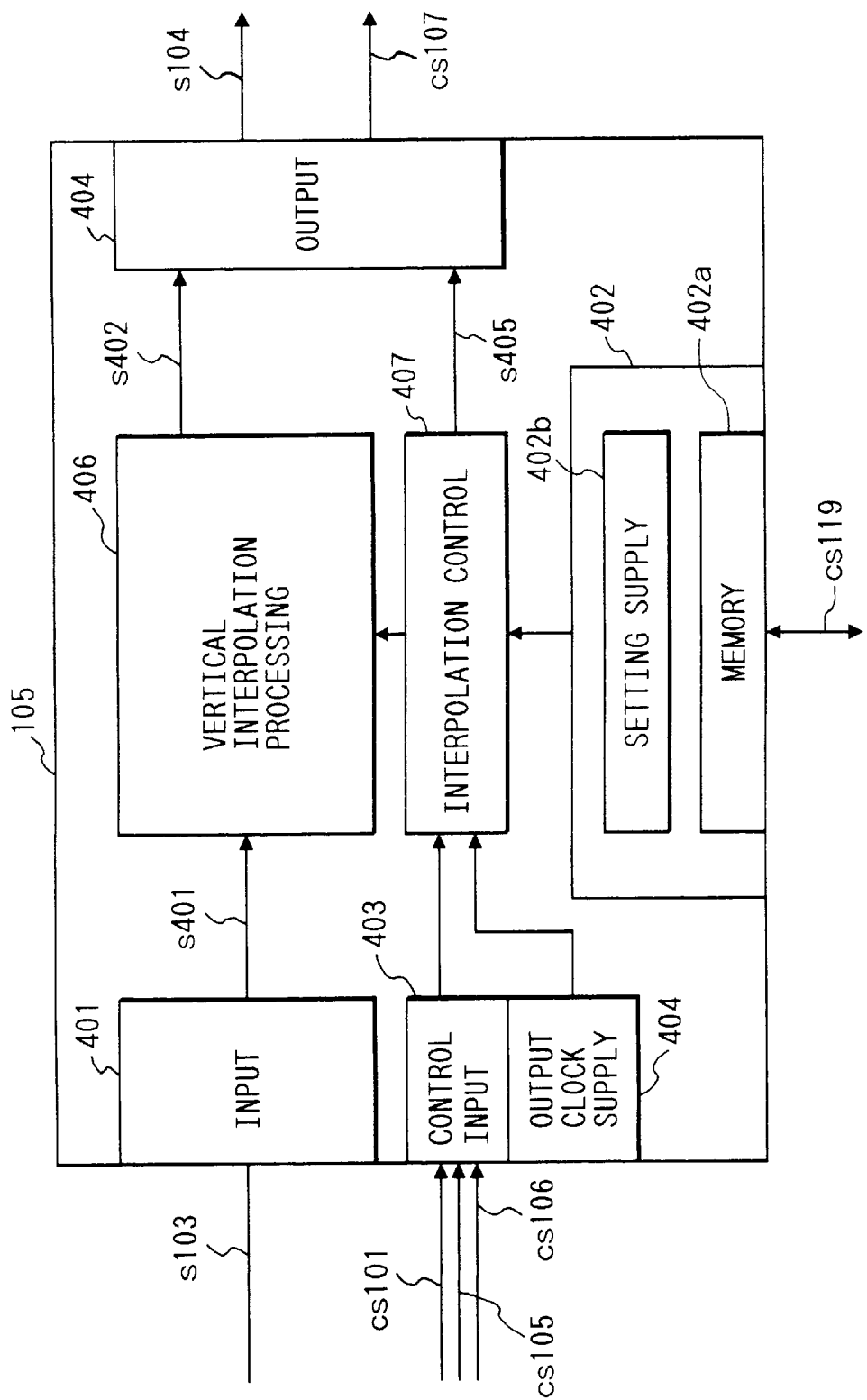
FIG. 21 is a view showing the configuration of the interpolation unit in FIGS. 1A and 1B.

FIG. 21 is a detailed block diagram of a vertical interpolating device for effecting vertical interpolation on the entered effective display image data, thereby achieving enlarged display on the dot matrix display device.

In FIG. 21, there are shown an input circuit 401 for entering the digital image data released from the A/D converter; a control input circuit 402 for controlling the vertical interpolation; a memory 402a for storing data set by the system control circuit; a setting supply circuit 402b for supplying the stored set data to other processing devices; a synchronization input circuit 403 for entering a clock signal and a synchronization signal; an output circuit 404 for sending the image data and the synchronization signal to a succeeding digital processing circuit; an output clock supply circuit 405 for determining the transfer rate in the output of the image data from the output circuit; a vertical interpolation process circuit 406 for effecting a digital process on the entered image data to increase the horizontal lines; and an interpolation control circuit 407 for controlling the vertical interpolation process circuit 406.

In the above-explained configuration, the input circuit 401 synchronizes the image data, released from the A/D conversion unit 103 and entered through a data signal line S103, with the signals entered into the synchronization input circuit 403, for supply to the vertical interpolation process circuit 406. The vertical interpolation process circuit 406 effects processing based on the set data, stored in the memory 402a of the control input circuit 402 and supplied by the setting supply circuit 402b, and sends the image data through the output circuit 404 to a switch 106 in synchronization with the clock signal supplied from the output clock supply circuit 405.

Figure 22:
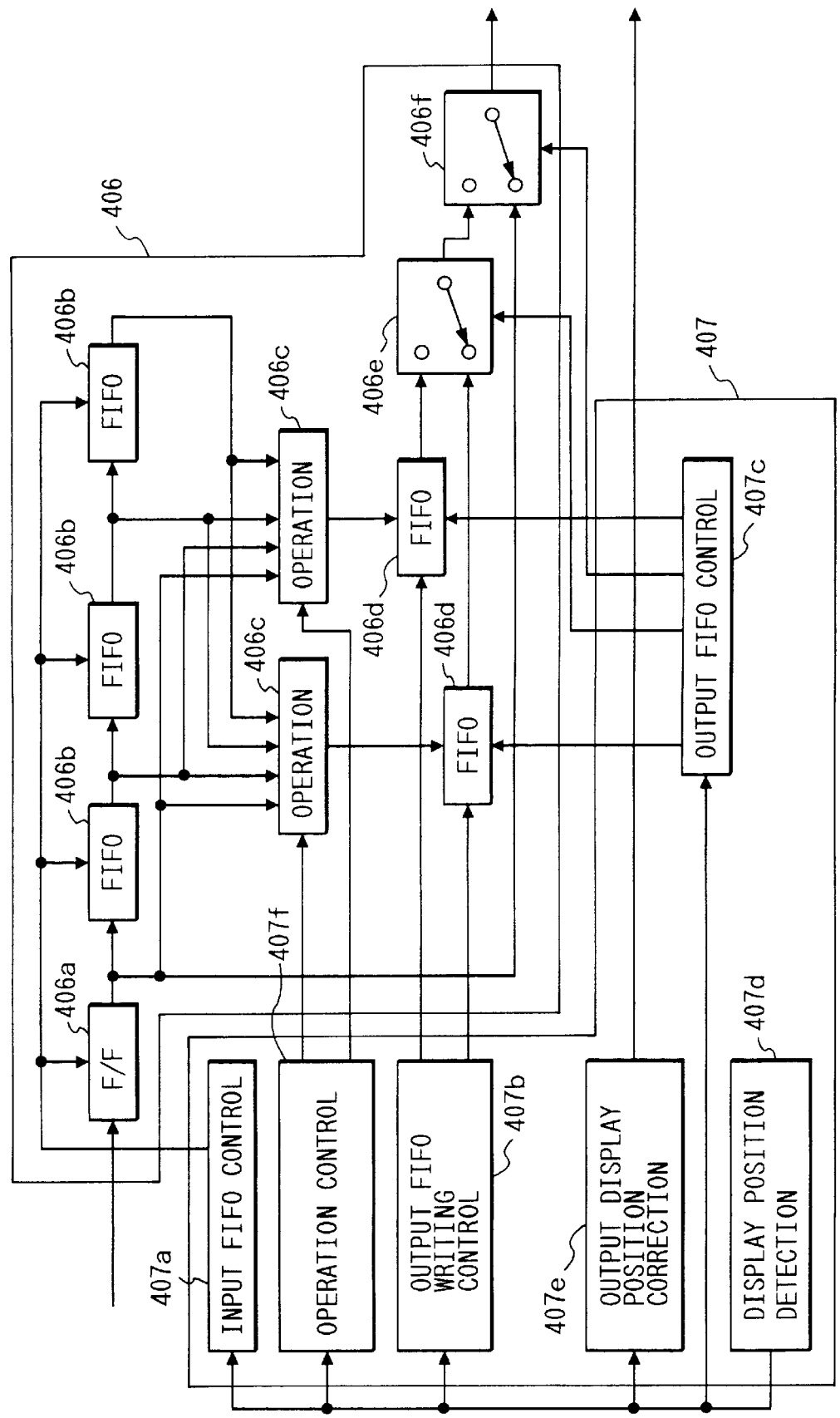
FIG. 22 is a view showing the configuration of the principal part of FIG. 21.

FIG. 22 is a detailed view of the vertical interpolation process circuit 406 and the interpolation control circuit 407 shown in FIG. 21.

There are shown a flip-flop (F/F) circuit 406a for synchronizing the image data with the synchronization signal; input FIFO memories 406b for storing data of a horizontal line; an operation circuit 406c for processing the entered image data with the interpolating coefficients; output FIFO memories 406d for storing the image data after interpolation; a switch 406e for selecting the output of the output FIFO memory 406d for supply to a subsequent switch 406f; a switch 406f for selecting a through path in case the interpolating coefficients are 1, namely in case the interpolation is not executed; an input FIFO control circuit 407a for controlling the input timing of the image data and the write/read timing of the FIFO memories 406b; an output FIFO write control circuit 407b for controlling the timing of the operation circuit and the write timing of the output FIFO memories 406b; an output FIFO control circuit 407c for controlling the read timing of the FIFO; a display position detection circuit 407d for detecting the display start position; an output display position correcting circuit 407e for adjusting the timing of the synchronization signal and the image data released from the vertical interpolation process circuit 406; and an operation control circuit 407f for controlling the coefficients for each line.

In the above-explained configuration, the image data entered from the input circuit 401 are synchronized in the F/F circuit 406a, by the control signal from the input FIFO control circuit 407a, and are transferred to the input FIFO memories 406b. The input FIFO memories 406b are so controlled by the input FIFO control circuit 407a that the image data are transferred in succession with a respective delay of a horizontal line.

The operation circuit 406c receives the image data of a same column under the control signal from the operation control circuit 407f to generate a vertical interpolating line, which is stored in the output FIFO memories 406d under the control of the output FIFO control circuit 407c. The stored image data are read according to the signal therefrom and transferred to the switch 106 through the switches 406e and 406f. At this transfer, there is generated and transferred a signal, synchronized with the image data, by the output display position correcting circuit 407e.

Figure 23:
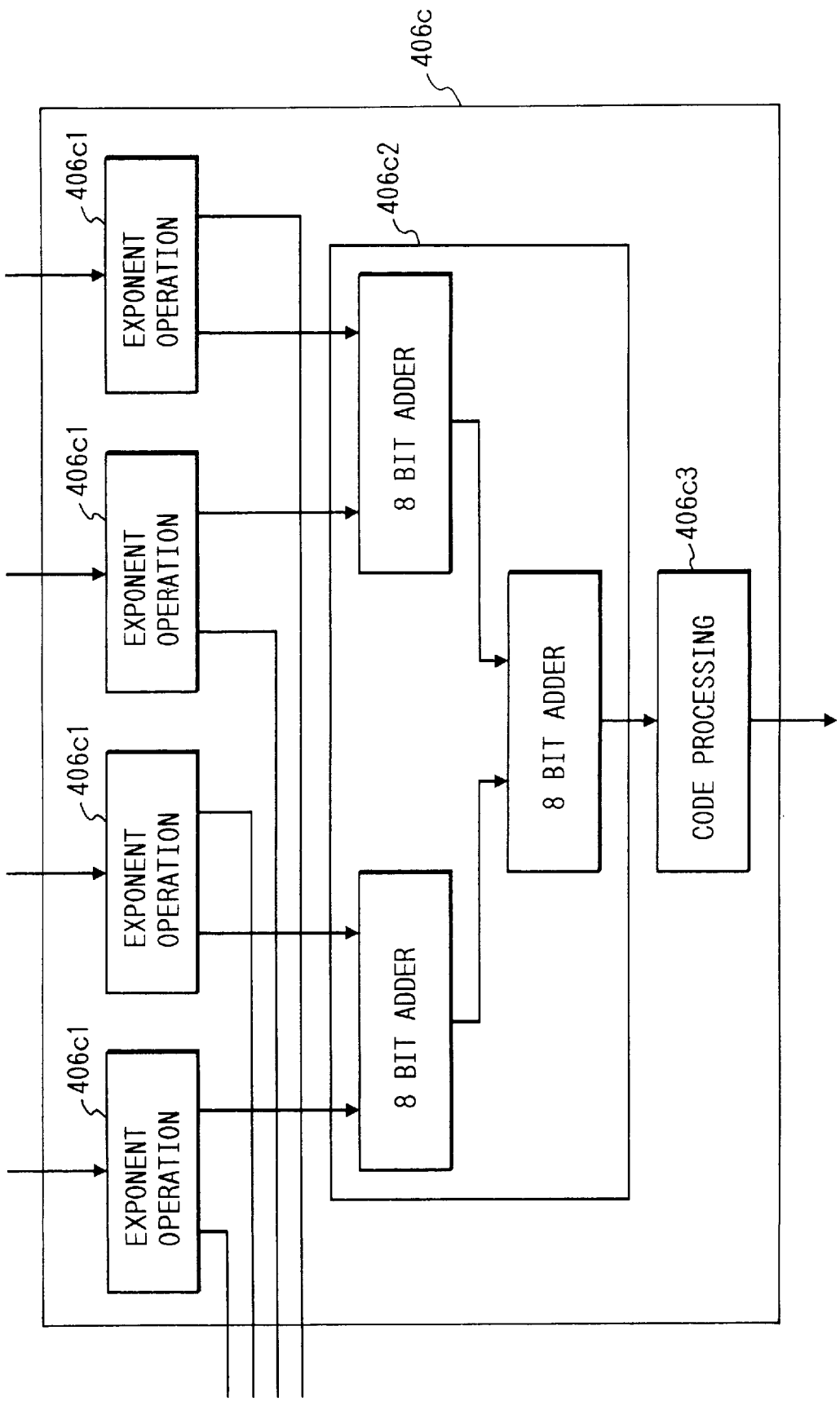
FIG. 23 is a view showing the configuration of the principal part of FIG. 22.

FIG. 23 is a block diagram showing the configuration of the operation circuit 406c for the entered image data.

In FIG. 23, each of exponential operation circuits 406c1 multiplies the image data of each line, received from the F/F circuit 406a or from the input FIFO memories 406c, with an exponent determined in advance for each of the exponential operation circuits, and transfers the product to a 4-input adder 406c2 for addition. The image data after the addition is sent to a code process circuit 406c3, and is converted into a minimum value "00" (6-bit in hexadecimal) if it is negative, or into a maximum value "3F" (6-bit in hexadecimal) if it exceeds the maximum value.

Figure 24:
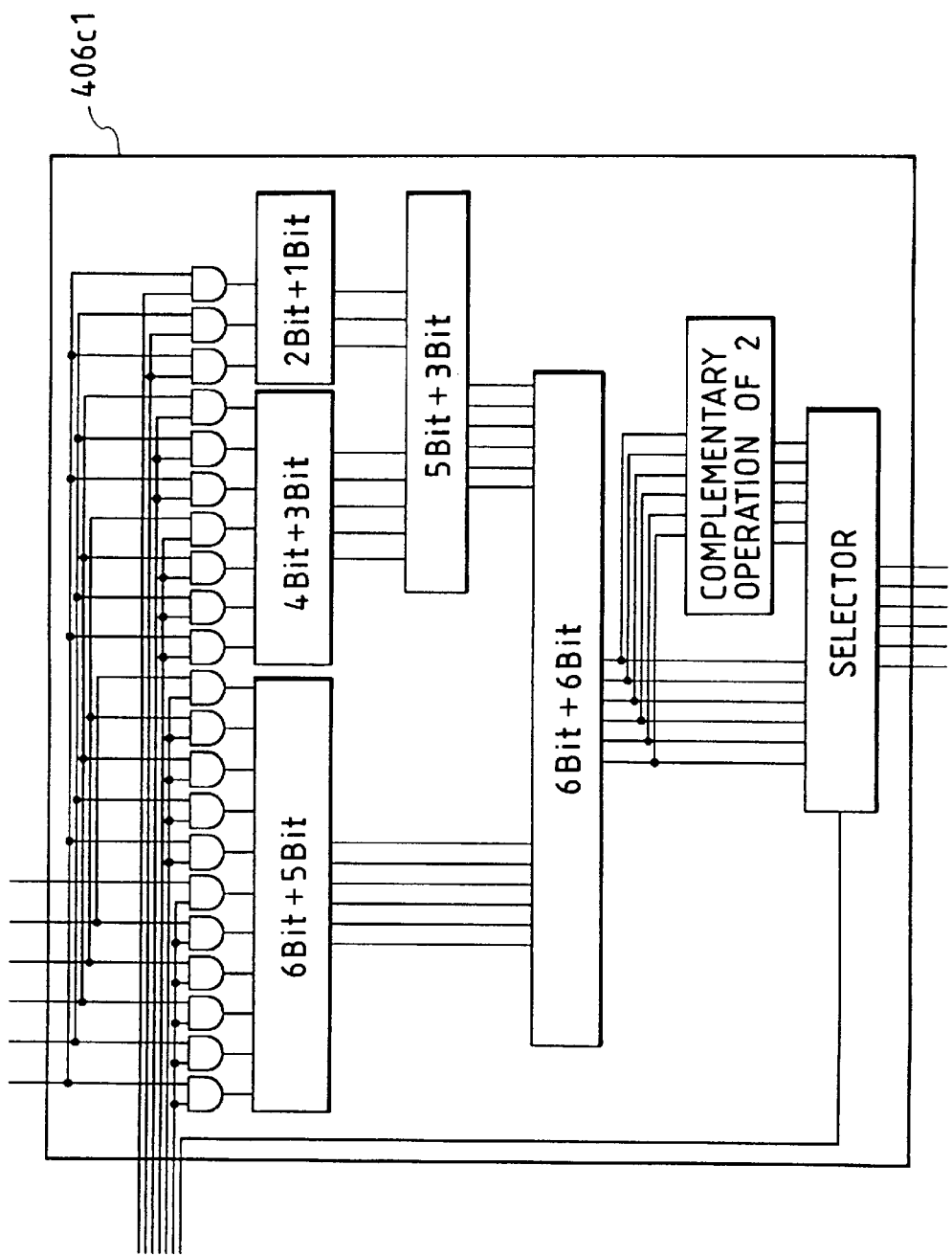
FIG. 24 is a view showing the configuration of the exponential operation unit in FIG. 23.

FIG. 24 shows the detailed structure of the exponential operation circuit 406c1.

This circuit prepares values corresponding to $1/32$ to $32/32$ of the entered image data and controls the AND gates according to these values. As the interpolating coefficients are approximated in the present embodiment by the exponents of 2, the operation can be realized by the bit shifting and the addition or subtraction of the data. Consequently the operation control circuit 407f is only required to select one of the AND gates to be opened. A 2-complementary operation unit converts the image data of the preceding stage to a negative number. A selector selects the image data transmitted through the complementary process unit or the image data without transmission, for supply to a 4-input adder 406c2.

FIGS. 25A to 25C schematically show the vertical interpolation for 640 dots in the horizontal direction and 350 lines in the vertical direction, included in the VGA display modes in the IBM graphic card.

In this case the input image signal is sampled twice for each dot to expand the 640 dots in the horizontal direction to 1280 dots. Also in the vertical direction, 350 lines are increased to 490 lines by the vertical interpolation in the interpolation unit 105, and is further doubled in the dot matrix display 15 to 980 lines for attaining a similar aspect ratio. Consequently, in the dot matrix display 15, the display is executed with an effective display area with 1280 dots in the horizontal direction and 980 lines in the vertical direction.

In the interpolation, the image data are entered with the timing shown in FIG. 25B. In this case a horizontal line has a duration of 31.778 $\mu S$, in which effective image data are contained within 25.422 $\mu S$. Also in this vertical interpolation, there have to be prepared 7 output lines from 5 input lines. Consequently, according to the equation in FIG. 25A, the output period is determined as 22.699 $\mu S$. Also the output cycle is determined from the relationship of the duration of the effective data. In this example, 28.196 MHz is determined from 39.16 MHz. The relationship between the input timing and the output timing is such that the output is started after the input of 2 lines, and that 7 output lines have to be output during the input of 5 lines.

FIG. 25C shows the relationship between the input lines and the output FIFO memories 406d. When the input line of a cycle number at the left is entered, the lines of the cycle line numbers shown at the right are entered in the output FIFO memories.

FIGS. 26A to 26C schematically show the vertical interpolation for the VESA standard with 800 dots in the horizontal direction and 600 lines in the vertical direction. In this case the input image signal is sampled with 1280 points in the effective display period of 800 dots for expansion to 1280 dots in the horizontal direction. In the vertical direction, 600 lines are increased to 960 lines for attaining a similar aspect ratio, by the vertical interpolation in the interpolating unit 105. Consequently, in the dot matrix display 15, the display is executed with an effective display area of 1280 dots in the horizontal direction and 960 lines in the vertical direction.

In the interpolation, the image data are entered with the timing shown in FIG. 26B. In this case, a horizontal line has a duration of 28.444 $\mu S$, in which effective data are contained within 22.222 $\mu S$. In this vertical interpolation, there have to be prepared 8 output lines from 5 input lines. Consequently, according to the equation in FIG. 26A, the output period is determined as 17.778 $\mu S$. Also the output cycle is determined from the relationship of the duration of the effective data. In this example, 36.000 MHz is determined from 55.385 MHz. The relationship between the input timing and the output timing is such that the output is started after the input of 2 lines and that 8 output lines have to be output during the input of 5 lines.

FIG. 26C shows the relationship between the input lines and the output FIFO memories 406d. When the input line of a cycle number at the left is entered, the lines of the cycle line numbers shown at the right are entered in the output FIFO memories.

Figure 27A:
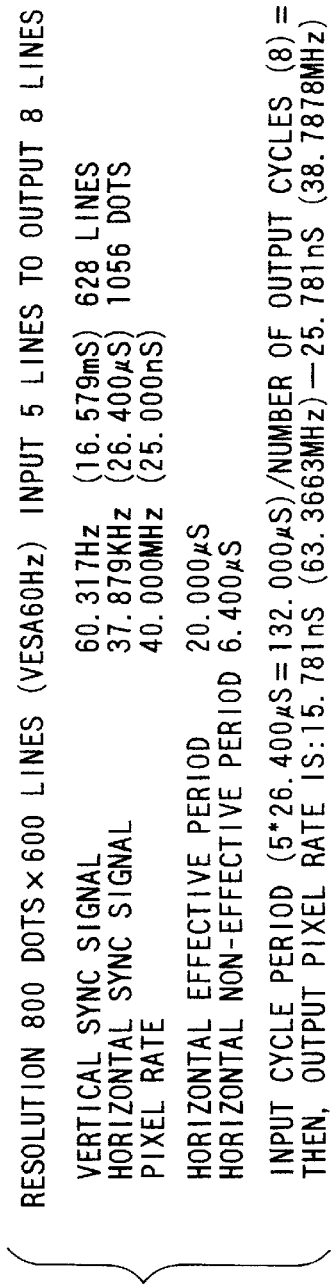
Figure 27B:
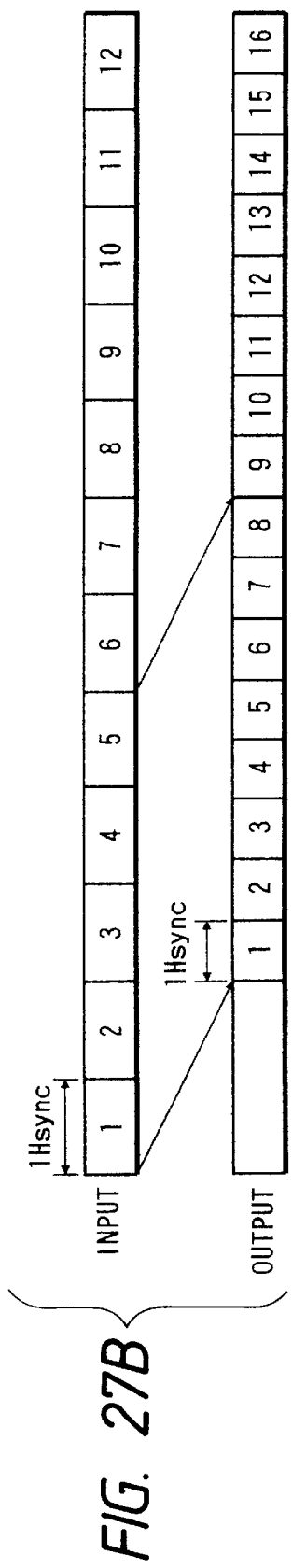
Figure 27C:
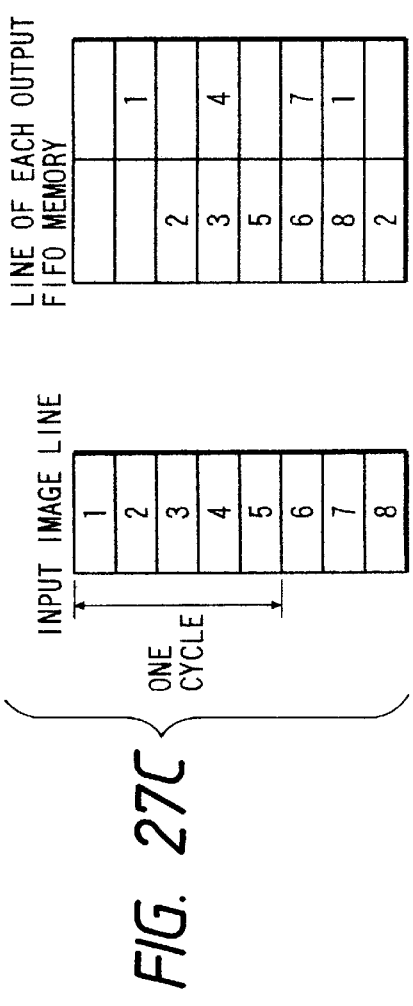

FIGS. 27A to 27C schematically show the vertical interpolation for the VESA standard with 800 dots in the horizontal direction and 600 lines in the vertical direction. In this case the input image signal is sampled with 1280 points in the effective display period of 800 dots for expansion to 1280 dots in the horizontal direction. In the vertical direction, 600 lines are increased to 960 lines for attaining a similar aspect ratio, by the vertical interpolation in the interpolating unit 105. Consequently, in the dot matrix display 15, the display is executed with an effective display area of 1280 dots in the horizontal direction and 960 lines in the vertical direction.

In the interpolation, the image data are entered with the timing shown in FIG. 27B. In this case a horizontal line has a duration of 26.400 $\mu S$, in which effective data are contained within 20.000 $\mu S$. In this vertical interpolation, there have to be prepared 8 output lines from 5 input lines. Consequently, according to the equation in FIG. 27A, the output period is determined as 16.500 $\mu S$. Also the output cycle is determined from the relationship of the duration of the effective data. In this example, 38.7878 MHz is determined from 63.3663 MHz. The relationship between the input timing and the output timing is such that the output is started after the input of 2 lines and that 8 output lines have to be output during the input of 5 lines.

FIG. 27C shows the relationship between the input lines and the output FIFO memories 406d. When the input line of a cycle number at the left is entered, the lines of the cycle line numbers shown at the right are entered in the output FIFO memories.

Figures 28A, 28B, 28C:
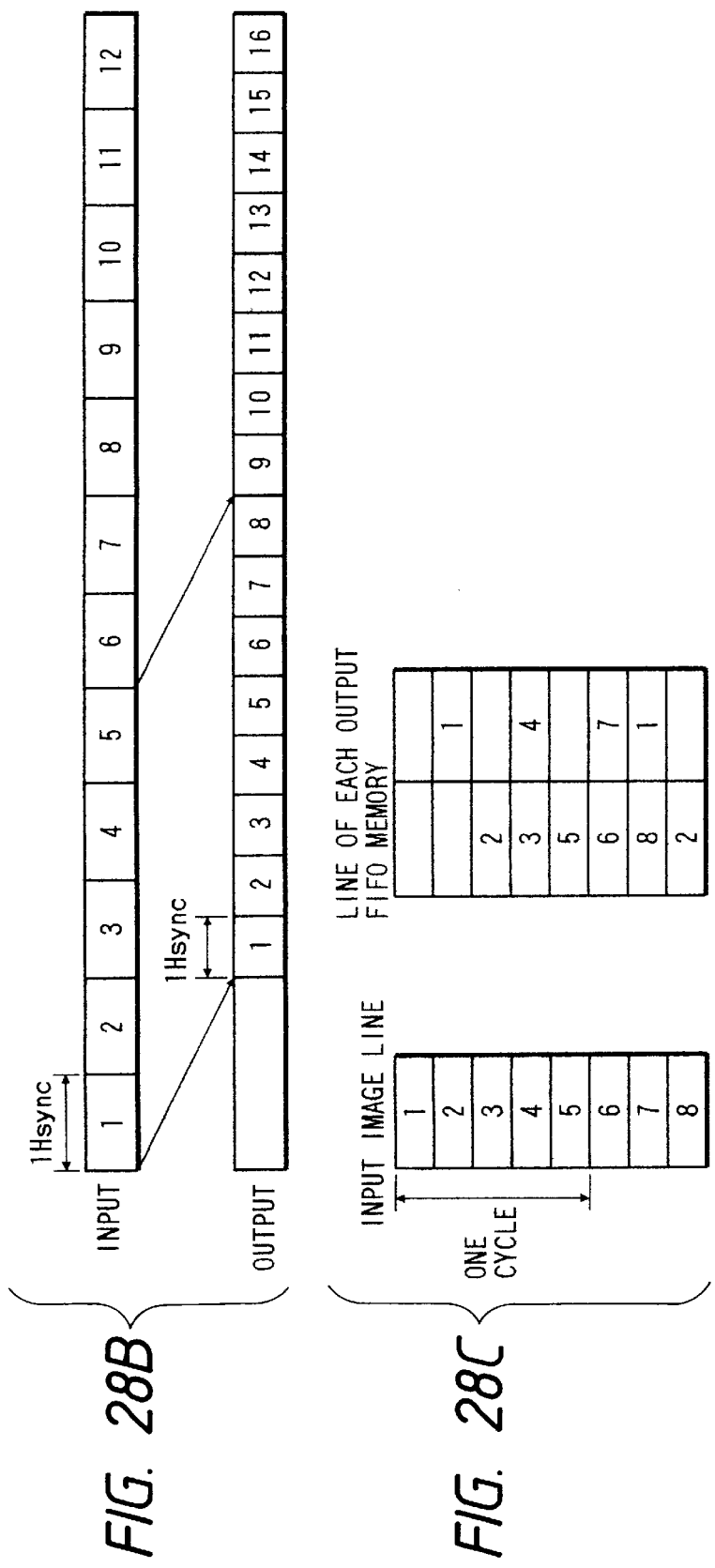

FIGS. 28A to 28C schematically show the vertical interpolation for the VESA standard with 800 dots in the horizontal direction and 600 lines in the vertical direction. In this case the input image signal is sampled with 1280 points in the effective display period of 800 dots for expansion to 1280 points in the horizontal direction. In the vertical direction, 600 lines are increased to 960 lines for attaining a similar aspect ratio, by the vertical interpolation in the interpolating unit 105. Consequently, in the dot matrix display 15, the display is executed with an effective display area of 1280 dots in the horizontal direction and 960 lines in the vertical direction.

In the interpolation, the image data are entered with the timing shown in FIG. 28B. In this case, a horizontal line has a duration of 20.800 $\mu S$, in which effective data are contained within 16.000 $\mu S$. In this vertical interpolation, there have to be prepared 8 output lines from 5 input lines. Consequently, according to the equation in FIG. 28A, the output period is determined as 13.000 $\mu s$. Also the output cycle is determined from the relationship of the duration of the effective data. In this example, 49.231 MHz is determined from 78.048 MHz. The relationship between the input timing and the output timing is such that the output is started after the input of 2 lines and that 8 output lines have to be output during the input of 5 lines.

FIG. 28C shows the relationship between the input lines and the output FIFO memories 406d. When the input line of a cycle number at the left is entered, the lines of the cycle line numbers shown at the right are entered in the output FIFO memories.

FIGS. 29A to 29C schematically show the vertical interpolation for the VESA standard with 1024 dots in the horizontal direction and 768 lines in the vertical direction. In this case the input image signal is sampled with 1280 points in the effective display period of 1024 dots for expansion to 1280 points in the horizontal direction. In the vertical direction, 768 lines are increased to 960 lines for attaining a similar aspect ratio, by the vertical interpolation in the interpolating unit 105. Consequently, in the dot matrix display 15, the display is executed with an effective display area of 1280 dots in the horizontal direction and 960 lines in the vertical direction.

In the interpolation, the image data are entered with the timing shown in FIG. 29B. In this case a horizontal line has a duration of 17.707 $\mu S$, in which effective data are contained within 13.653 $\mu S$. In this vertical interpolation, there have to be prepared 5 output lines from 4 input lines. Consequently, according to the equation in FIG. 29A, the output period is determined as 14.1656 $\mu S$. Also the output cycle is determined from the relationship of the duration of the effective data. In this example, 45.2 MHz is determined from 63.2 MHz. The relationship between the input timing and the output timing is such that the output is started after the input of 2 lines and that 5 output lines have to be released during the input of 4 lines.

FIG. 29C shows the relationship between the input lines and the output FIFO memories 406d. When the input line of a cycle number at the left is entered, the lines of the cycle line numbers shown at the right are entered in the output FIFO memories.

FIGS. 30A to 30C schematically show the vertical interpolation for the Apple McCintosh series mode 1, with 1024 dots in the horizontal direction and 768 lines in the vertical direction. In this case the input image signal is sampled with 1280 points in the effective display period of 1024 dots for expansion to 1280 points in the horizontal direction. In the vertical direction, 768 lines are increased to 960 lines for attaining a similar aspect ratio, by the vertical interpolation in the interpolating unit 105. Consequently, in the dot matrix display 15, the display is executed with an effective display area of 1280 dots in the horizontal direction and 960 lines in the vertical direction.

In the interpolation, the image data are entered with the timing shown in FIG. 30B. In this case a horizontal line has a duration of 16.6 $\mu$S, in which effective data are contained within 12.8 $\mu$S. In this vertical interpolation, there have to be prepared 5 output lines from 4 input lines. Consequently, according to the equation in FIG. 30A, the output period is determined as 13.28 $\mu$S. Also the output cycle is determined from the relationship of the duration of the effective data. In this example, 48.2 MHz is determined from 67.5 MHz. The relationship between the input timing and the output timing is such that the output is started after the input of 2 lines and that 5 output lines have to be released during the input of 4 lines.

FIG. 30C shows the relationship between the input lines and the output FIFO memories 406d. When the input line of a cycle number at the left is entered, the lines of the cycle line numbers shown at the right are entered in the output FIFO memories.

In the interpolating process explained in the foregoing, in case of 800 dots in the horizontal direction and 600 lines in the vertical direction explained in FIGS. 25A to 28C, the output of the interpolated line may be started with the start of the input of the third line so that the data may be outputted before the input of the data to be used for interpolation. For this reason, the output of the line data after interpolation is started after a predetermined time from the input of the data of the third line.

Again referring to FIGS. 1A and 1B, a TV (television) signal process unit 12 is composed of a TV tuner 121, a decoder 122, an OSD switch circuit 123, an interlace/non-interlace conversion circuit 124 and a horizontal interpolation process circuit 125.

A TV tuner 121 receives a modulated TV signal s106, and effects detection and amplification to release a composite analog image signal s109 such as of NTSC, PAL or SECAM and a voice signal s115.

A color decoder 122 applies, to the composite image signals s109 from the TV tuner 121 or an external input signal s107, A/D conversion, color difference signal demodulation and matrix conversion to the RGB signal thereby generating an interlaced digital RGB signal s110 and a control signal cs108.

Also there can be entered an S signal (YC separated image signal) 108. The color decoder 122 applies thereon the A/D conversion and matrix conversion to the RGB signal, thereby similarly generating the signals s110 and cs108.

An OSD switch circuit 123 selects either the interlaced RGB image signal s110 from the decoder 122 or the signal s118 from an OS control circuit 193 to be explained later.

An interlace/non-interlace (field/frame) conversion circuit effects interlace/non-interlace (field/frame) conversion on the interlaced RGB image signal from the switch 123. More specifically, the 50 (60) Hz non-interlaced (field) signal is converted into 50 (60) Hz non-interlaced (frame) RGB image signal s112.

A horizontal interpolation process circuit 125 effects interpolation on the non-interlaced RGB image signal s112 to the horizontal resolving power of the display unit 15, thereby outputting an RGB image signals s113. The above-mentioned interpolation is to double the resolving power in the horizontal direction, by reading each data twice.

A switch 13 for selecting the PC/WS process unit 11 or the TV signal process unit 12 selects, under the control of the control signal cs112 from the system control unit 191, either the image data s105 and the synchronization signal cs107 from the PC/WS process unit 11 or the image data s113 and the synchronization signal cs110 from the TV signal process unit 12, thereby releasing image data s114 and a synchronization signal cs111.

A digital signal process unit 14 effects various processes and controls for displaying the digital image data from the switch 13 on the dot matrix panel 15.

In the following there will be given a detailed explanation, with reference to FIG. 31, on the processes in the digital signal process unit 14.

An input video signal s113 such as of NTSC or an input computer signal s105, entered through a switch 132, are subjected, in a gradation adjusting circuit 501, to a $\gamma$ correction processing and gradation adjustment processing.

The above-mentioned $\gamma$ correction will be explained with reference to FIG. 32, which shows the relationship between the input and output data in case of $\gamma=2.2$, with input and output in 8 bits. For example an input data a provides an output data a in case of $\gamma=1.0$, but provides an output data b (<a) in case of $\gamma=2.2$, thereby providing a higher contrast.

Figure 33:
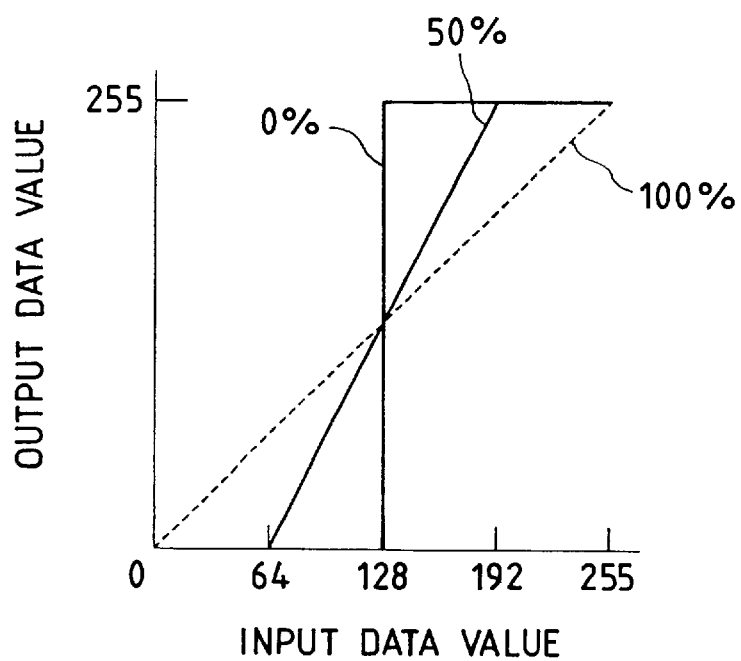
FIG. 33 is a view showing the configuration of the halftone process circuit in FIG. 31.

In the following there will be explained the gradation adjusting process with reference to FIG. 33.

Figure 32:
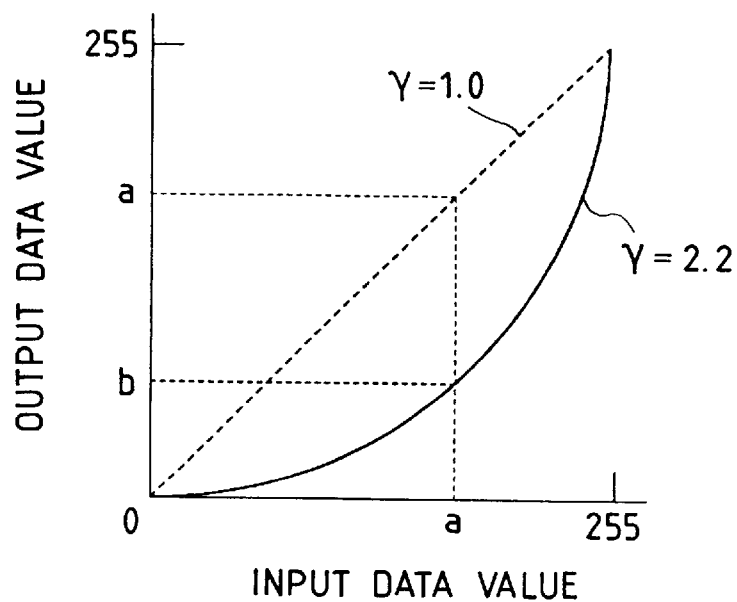
FIG. 32 is a view showing the configuration of the γ, gradation correcting circuit in FIG. 31.

In the absence of the gradation adjustment, the output is linearly correlated with the input as shown by a line of 100% in FIG. 32. However, with a gradation adjustment of 50%, the output to the input data of levels 0 to 64 and 192 to 255 are respectively fixed to 0 and 255, and in response to the intermediate input data, the output varies with a doubled rate as shown in FIG. 33.

The image contrast can be made higher as the value of halftone adjustment (percentage) is lowered. The values of $\gamma$ correction and gradation adjustment can be determined by the manipulation of the key input unit 192, and the contrast conversion circuit 501 is controlled by the system control circuit 191 according to these values.

Data s501, subjected to the $\gamma$ correction and gradation adjustment, is subjected, in a halftone process circuit 502, to a halftone process such as by error diffusion (ED) method or by dither method.

A movement detection circuit 504 latches the display data, before the halftone processing, then detects a line showing a change exceeding a predetermined amount, and transfers the result of detection to the system control circuit 191. The system control circuit 191 sends, among the frame display data stored in a memory 503, only the display data of a line where the movement is detected to the display control circuit 505 together with the line address data.

Figure 31:
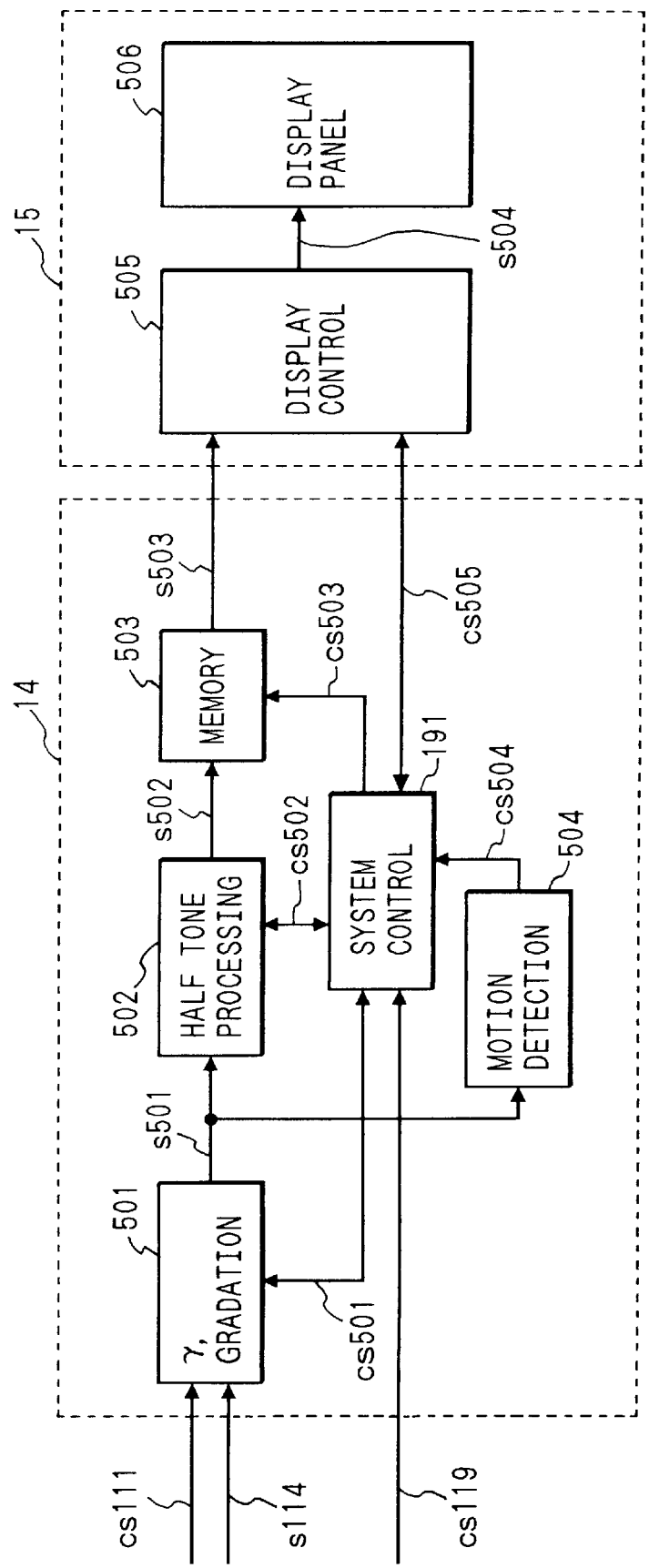
FIG. 31 is a view showing the configuration of the digital signal processing unit and the display unit in FIGS. 1A and 1B.

A display unit 15, utilizing so-called dot matrix display for example composed of a liquid crystal display device, is composed of a display control circuit 505 and a display panel 506 utilizing the dot matrix display as shown in FIG. 31, and is adapted to display the image signal processed in the digital signal process unit 14. This embodiment employs a ferroelectric LCD (FLCD) for the dot matrix display.

Referring to FIG. 31, the image signal s503 from the signal process unit 14 is supplied to the display control circuit 505 as explained in the foregoing, and an image corresponding to the entered image signal is displayed in a vertical position, designated by the line address data on the panel 506.

A sound process block 17 is composed of a delay adjustment circuit 171, a sound quality adjust and amplifying circuit 172 and loudspeakers 173.

A delay adjustment circuit 171 adjusts the delay in time between the image display in the display unit 15 and the sound released from the speaker 173.

In the display unit 15, depending on the temperature of the use of the apparatus, there may be result a slight delay in time in the image display, between the upper left corner and the lower right corner of the display frame. For this reason, for example in the TV signal involving the moving image and the sound, there may result an aberration in time between the image display which is affected by the temperature and the sound which is not affected by the temperature.

In order to avoid such drawback, the temperature information of the display unit 15 is fed back to the system control circuit 191 through the system control bus cs119 and is used for controlling the delay time of the delay adjustment circuit 171 through a control signal cs120, thereby delaying the sound input signal 115 or s115a to generate a delayed sound signal s116 so as to synchronize the image display and the sound. More specifically, the sound is not delayed in the absence of delay in the image display, but is delayed in the presence of delay in the image display.

The sound delay time is obtained from a correlation table, indicating the correlation between the temperature of the display unit 15 and the delay time in the image display, stored in advance in the memory 194. Such delay adjustment allows to synchronize the sound with the image display, regardless of the temperature of the display unit 15.

A sound quality adjusting and amplifying circuit 172 receives the sound signal s116 after the delay adjustment. This circuit has functions of sound quality adjustment, stereo/mono switching, left and right balance control, surround adjustment etc., and effects the sound quality control according to the taste of the user, under the control of the system control circuit 191. Thereafter the signal is amplified to a level for driving the speakers 173.

A power supply unit 18 generates power supply outputs cs181 to the TV signal process unit 12, cs182 to the computer signal process unit 11, cs183 to the digital signal process unit 14 and cs184 to other units.

The power supply unit 18 is controlled by a control signal cs121 from the system control unit 191 and controls the power supply to the TV signal process unit 12, the computer signal process unit 11, and the digital signal process unit 14 mentioned above.

In the following there will be explained, with reference to FIGS. 34 to 38, the OSD (on-screen display) operation for displaying necessary information on the display unit 15 for facilitating various adjustments by the operator.

In response to an OSD request for example by a key input by the operator, the system control circuit 191 provides an OSD control circuit 193 with information including the OSD start position (horizontal/vertical), display pattern, font size, display color, presence/absence of blinking, space between the characters etc., thereby providing the OSD as exemplified in FIGS. 34 to 37.

FIGS. 34 and 35 show examples of menu OSD in the process of selecting the items of adjustment, in case language selection is selected as the setting item. FIG. 34 shows an example in which the background of characters is not blank, wherein the selected "LANGUAGE" item can be distinguished by a different background color or a blinking background. FIG. 35 shows an example in which the background is blank. In this case the background of the selected item alone is colored.

FIG. 36 shows an example of OSD in case the LANGUAGE is selected in the menu display shown in FIGS. 34 and 35. In this case the ENGLISH or the JAPANESE is alternately selected by the actuation of the UP or DOWN key.

FIG. 37 shows an example of OSD in case the BRIGHTNESS is selected in the menu. In this case the adjustment value is stepwise varied by the UP and DOWN keys, and, in case the adjustment is possible in 255 levels and the OSD is given in 10 levels, the OSD level is increased or decreased for every change of the adjustment by about 10 levels.

In the following there will be explained the OSD of the font size, with reference to FIG. 38. In the display of the composite video signal s106 such as of NTSC or PAL or the YC-separated video signal s108, the OSD data s118 is enlarged in a doubled size in the vertical direction, in the circuit 124 for conversion from the field data to the frame data. The data is then enlarged into a doubled size in the horizontal direction by the interpolation circuit 125. Finally, at the display on the display unit 15, the data of a line is displayed twice in the vertical direction, for further doubled enlargement in the vertical direction, so that the data is enlarged in total 2 times in the horizontal direction and 4 times in the vertical direction. For this reason, the OSD employs a font which is doubled in size in the horizontal direction, whereby the font on the display unit 15 is displayed in 4 times in the horizontal and vertical directions.

On the other hand, in the display of the computer input signal s101, the OSD data s118 is read 4 times repeatedly at the switching with the input signal s101 in the switch 106, in order to achieve readout with a clock speed same as that for the signal s101. For this reason, the OSD data is enlarged 4 times in the horizontal direction. Consequently, the OSD employs a font which is 4 times in size in the vertical direction, whereby the font on the display unit 15 is displayed in 4 times in the horizontal and vertical directions as in the foregoing case.

FIG. 39 is a list of the items of OSD in the display of the video and computer signals. In the present embodiment, there are given different OSD's for these signals.

Consequently, in this embodiment, the OSD is given with the different font sizes, different read-out clock speeds and different display contents for the displays of the video signal and the computer signal.

The OSD control circuit 193 shifts the switch 123 for the video signal such as of NTSC and the switch 106 for the computer signal, thereby selecting the OSD data s118 or the image data s110, s104.

A switch 132, controlled by the system control circuit 191 according to the key input by the operator, selects the video input signal s113 such as of NTSC or the computer input signal s105, for supply to the digital signal process unit 14.

The key input process by the operator will be explained with reference to flow charts in FIGS. 40A to 40C and an example of user keys shown in FIG. 41.

Figures 40, 40A:
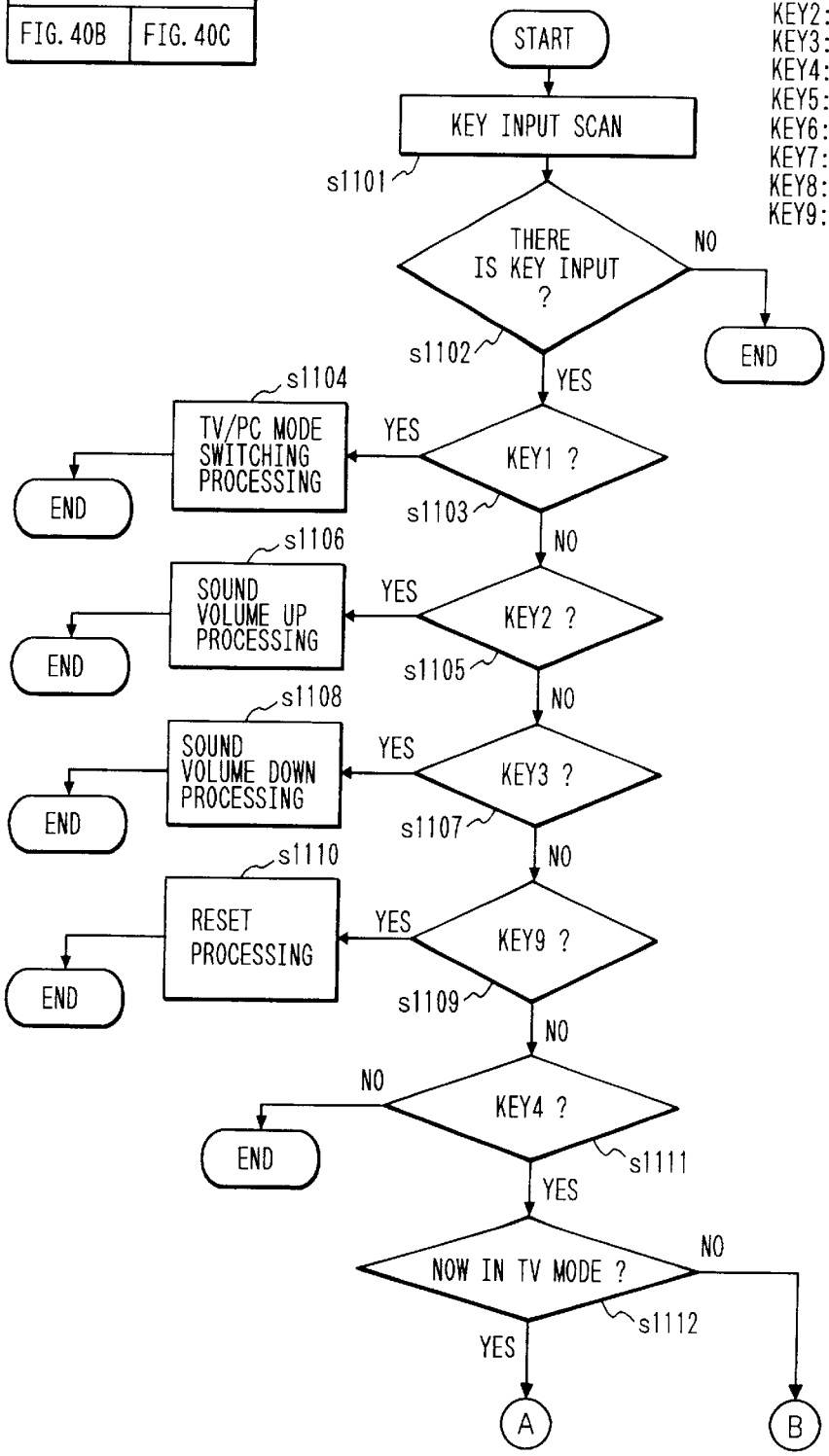
FIG. 40, composed of FIGS. 40A, 40B and 40C, is a flow chart showing the OSD display operation in an embodiment of the present invention.
Figure 40B:
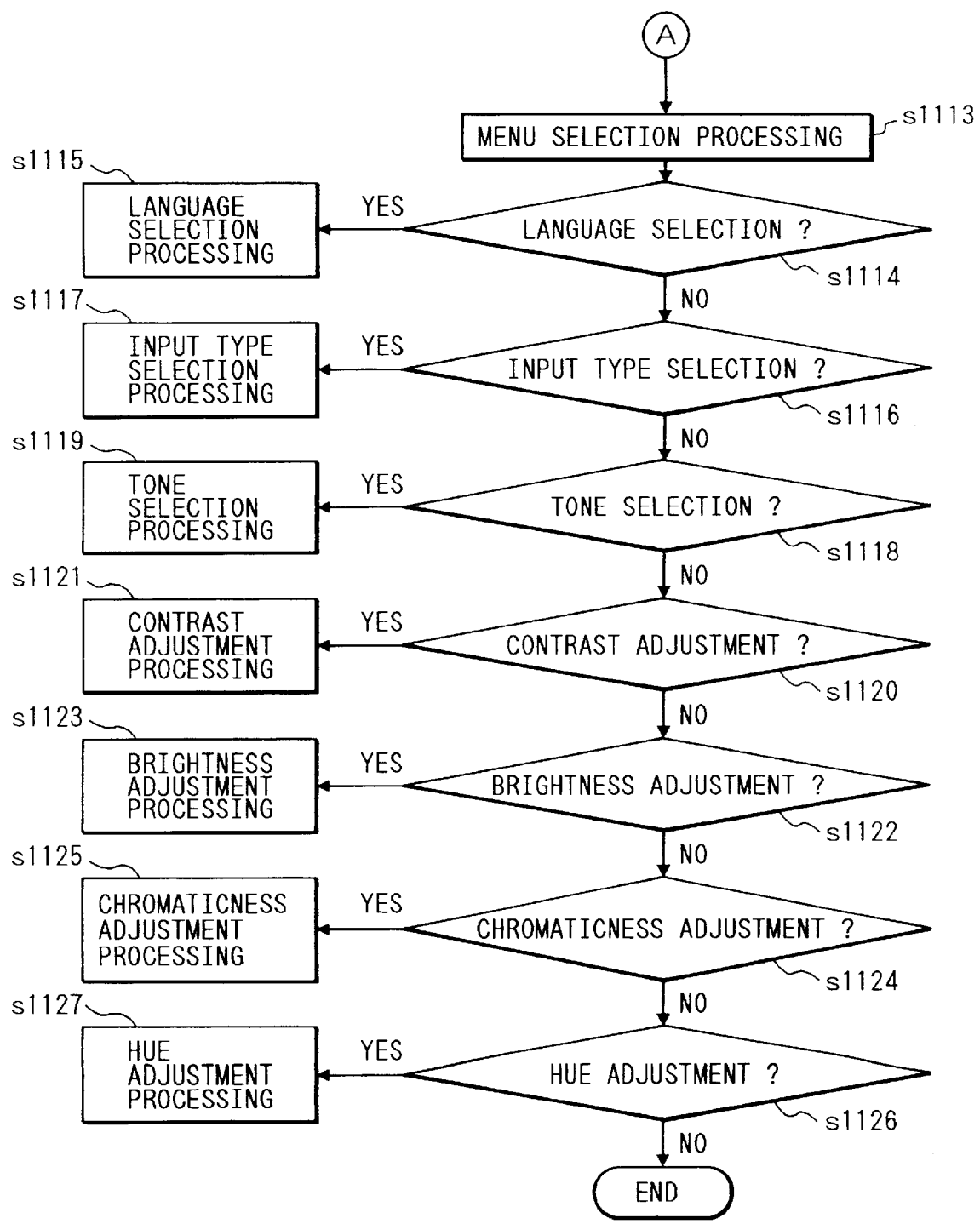
Figure 40C:
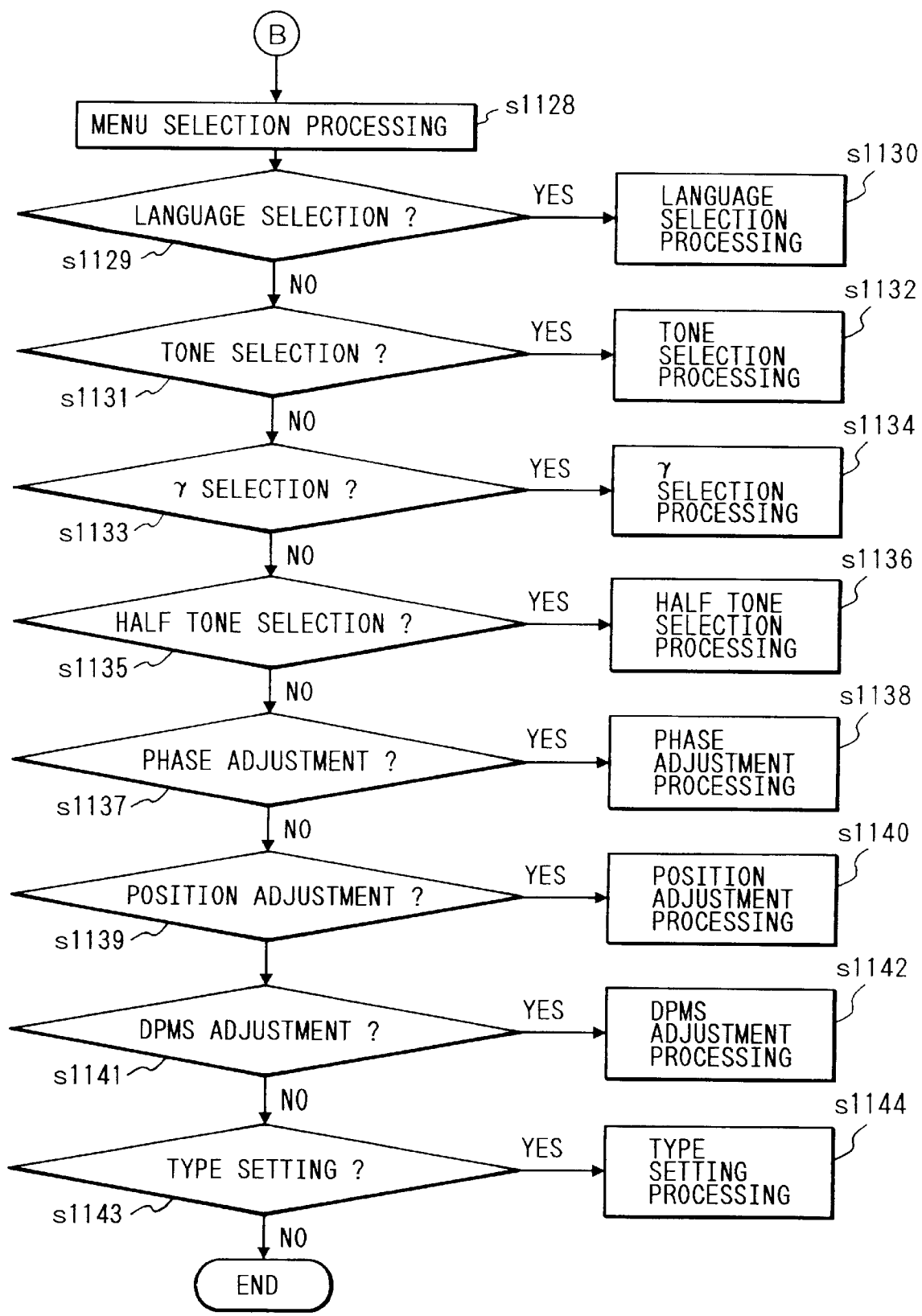

Referring to FIGS. 40A to 40C, in a step S1101, the system control circuit 191 effects a key scanning operation on a key matrix circuit 192. A step S1102 discriminates whether the key scanning operation has detected a key input, and, if absent, the key input process is immediately terminated. If present, a step S1103 discriminates whether the detected key input is the TV/PC switch key shown in FIGS. 40A to 40C, and, if so, a step S1104 effects a TV/PC mode switching process, which consists of:

1. switching control of the switch 13;
2. setting of the TV/PC switching information in the interpolation unit 105; and
3. OSD of the TV/PC switching information.

After the TV/PC mode switching process, the key input process is terminated. Then a step S1105 discriminates whether the detected key input is a sound volume increasing key shown in FIG. 41, and, if so, a step S1106 effects a sound volume increasing process, which consists of:

1. setting of the sound volume increase in the sound process 172; and
2. OSD of the revised sound volume.

After the sound volume increasing process, the key input process is terminated. A step S1107 discriminates whether the detected key input is a sound volume decreasing key shown in FIG. 41, and, if so, a step S1108 effects a sound volume decreasing process, which consists of:

1. setting of the sound volume decrease in the sound process 172; and
2. OSD of the revised sound volume.

After the sound volume decreasing process, the key input process is terminated. A step S1109 discriminates whether a clear key and a set key shown in FIG. 41 are depressed simultaneously at least for a predetermined time, and, if depressed, a reset process is identified and a step S1110 effects a reset process, which consists of:

1. reading the initial set values at the shipping from the factory, from the memory 194, and setting these values in a decoder 122;
2. reading the initial set values at the shipping from the factory, from the memory 194, and setting these values in the sound process circuit 172;
3. reading the initial set values at the shipping from the factory, from the memory 194, and setting these values in the clock generator 104; and
4. reading the initial set values at the shipping from the factory, from the memory 194, and setting these values in the interpolation circuit 105.

After the reset process, the key input process is terminated. A step S1111 discriminates whether the detected key input is a menu key, and, if so, the sequence proceeds to a step S1112, but, if the detected key input is any other key that is the set key, UP key, DOWN key or clear key, the key input process is terminated immediately without any further operation. The step S1112 discriminates whether the TV mode or the PC mode is currently selected, and the sequence respectively proceeds to a step S1113 or S1128.

The step S1113 effects a process of selection of the set items by the operator under the observation of the menu. In the following the process of the step S1113 or S1128 will be explained with reference to a flow chart in FIG. 42.

Figure 42:
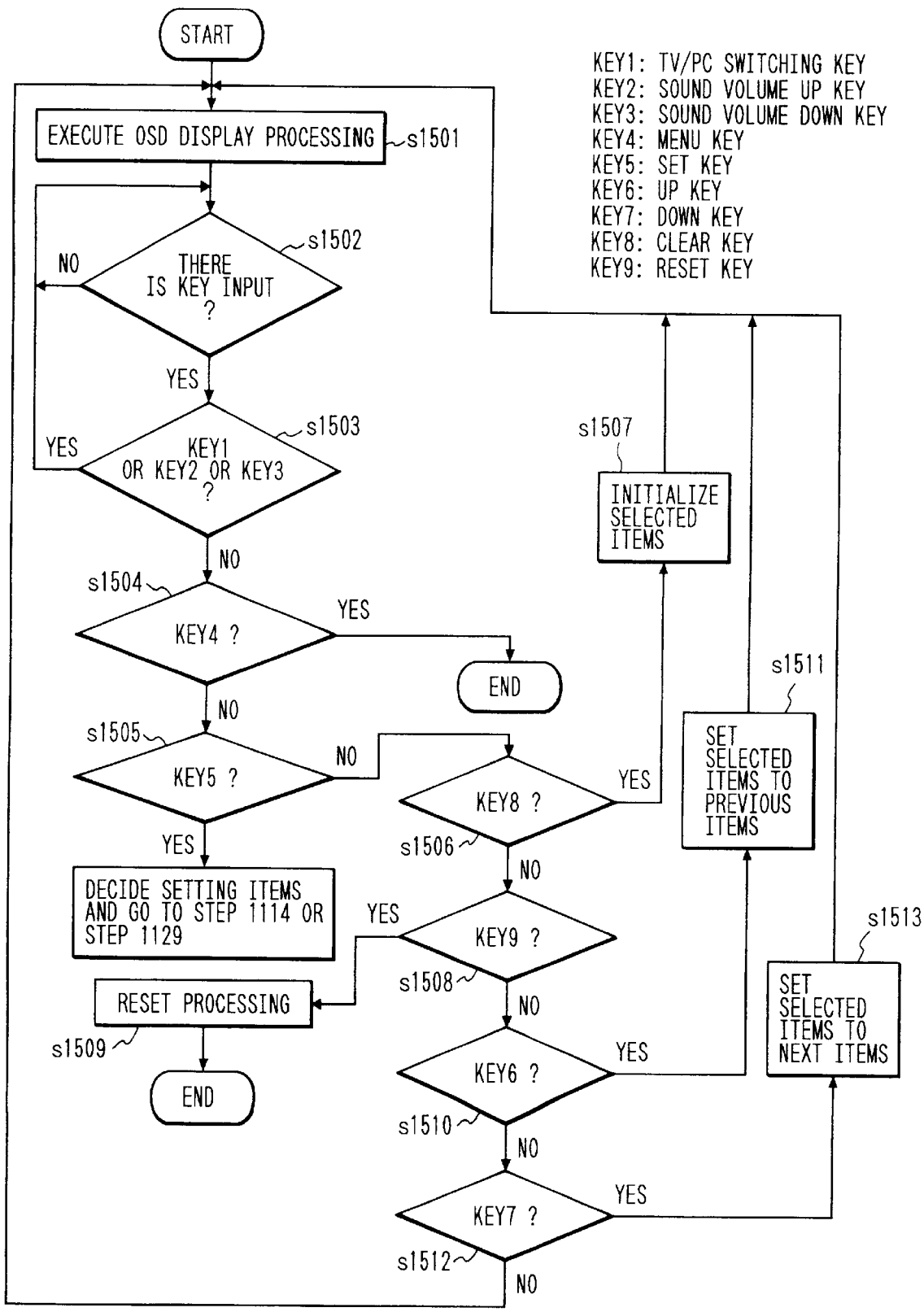
FIGS. 42 and 43 are flow charts showing the OSD display operation in an embodiment of the present invention.

Referring to FIG. 42, a step S1501 effects OSD in a state in which the previously selected item is selected, and a step S1502 waits until a key input from the operator. A step S1503 discriminates whether the key input is any of the TV/PC switch key, sound volume UP key or sound volume DOWN key, and, if so, the sequence returns to the step S1502 without any operation. A step S1504 discriminates whether the key input is the menu key, and, if so, the process is terminated, but, if not, the sequence proceeds to a step S1505.

The step S1505 discriminates whether the key input is the set key, and, if so, the set item is fixed and the sequence proceeds to a step S1114 or S1129. A step S1506 discriminates whether the key input is the clear key, and, if so, a step S1507 shifts the selected item to the initial value and the sequence returns to the step S1501, but, if not, the sequence proceeds to a step S1508. The step S1508 discriminates whether the clear key and the set key are depressed simultaneously at least for a predetermined time, and, if depressed, a resetting request is identified and a step S1509 effects the resetting process to terminate the sequence, but, if not, the sequence proceeds to a step S1510.

The step S1510 discriminates whether the UP key has been actuated by the operator, and, if actuated, a step S1511 shifts the selected item to the preceding item and the sequence returns to the step S1501, but, if not, the sequence proceeds to a step S1512. The step S1512 discriminates whether the key input is the DOWN key, and, if so, a step S1513 shifts the selected item to the succeeding item and the sequence returns to the step S1501. If none of the foregoing keys is actuated, the sequence returns to the step S1501 without any operation.

Figure 41:
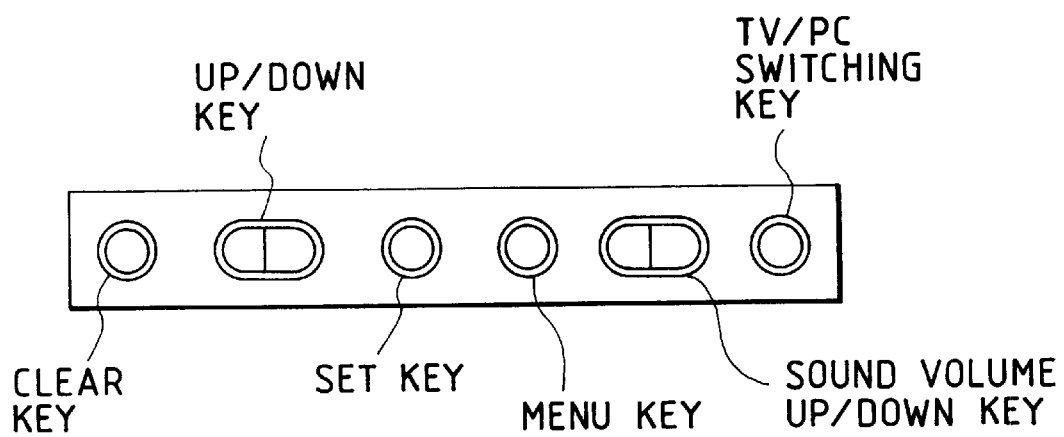
FIG. 41 is a view showing the key input unit in FIGS. 1A and 1B.

Consequently the key input process is terminated only in case the step S1504 identifies the input of the menu key or the step S1508 identifies the resetting request, and the process of the step S1113 or S1128 shown in FIG. 41 is terminated only in case the step S1505 identifies the input of the set key.

After the menu selecting process, a step S1114 discriminates whether the adjustment item, selected in the step S1113 is the language selection, and, if so, a step S1115 effects a language selection process. A step S1116 discriminates whether the selected process is the input selection, and, if so, a step S1117 effects an input selection process (for selecting the input of composite signal or YC-separated signal).

A step S1118 discriminates whether the selected process is the sound quality selection, and, if so, a step S1119 effects a sound quality selection process. A step S1120 discriminates whether the selected process is the contrast adjustment, and, if so, a step S1121 effects a contrast adjustment process. A step S1122 discriminates whether the selected process is the brightness adjustment, and, if so, a step S1123 effects a brightness adjustment process.

A step S1124 discriminates whether the selected process is the saturation adjustment, and, if so, a step S1125 effects a saturation adjustment process. A step S1126 discriminates whether the selected process is the hue adjustment, and, if so, a step S1127 effects a hue adjustment process. If any other process is selected, the sequence is immediately terminated.

In the following there will be explained the language selection process in the step S1115, with reference to FIG. 43.

Figure 43:
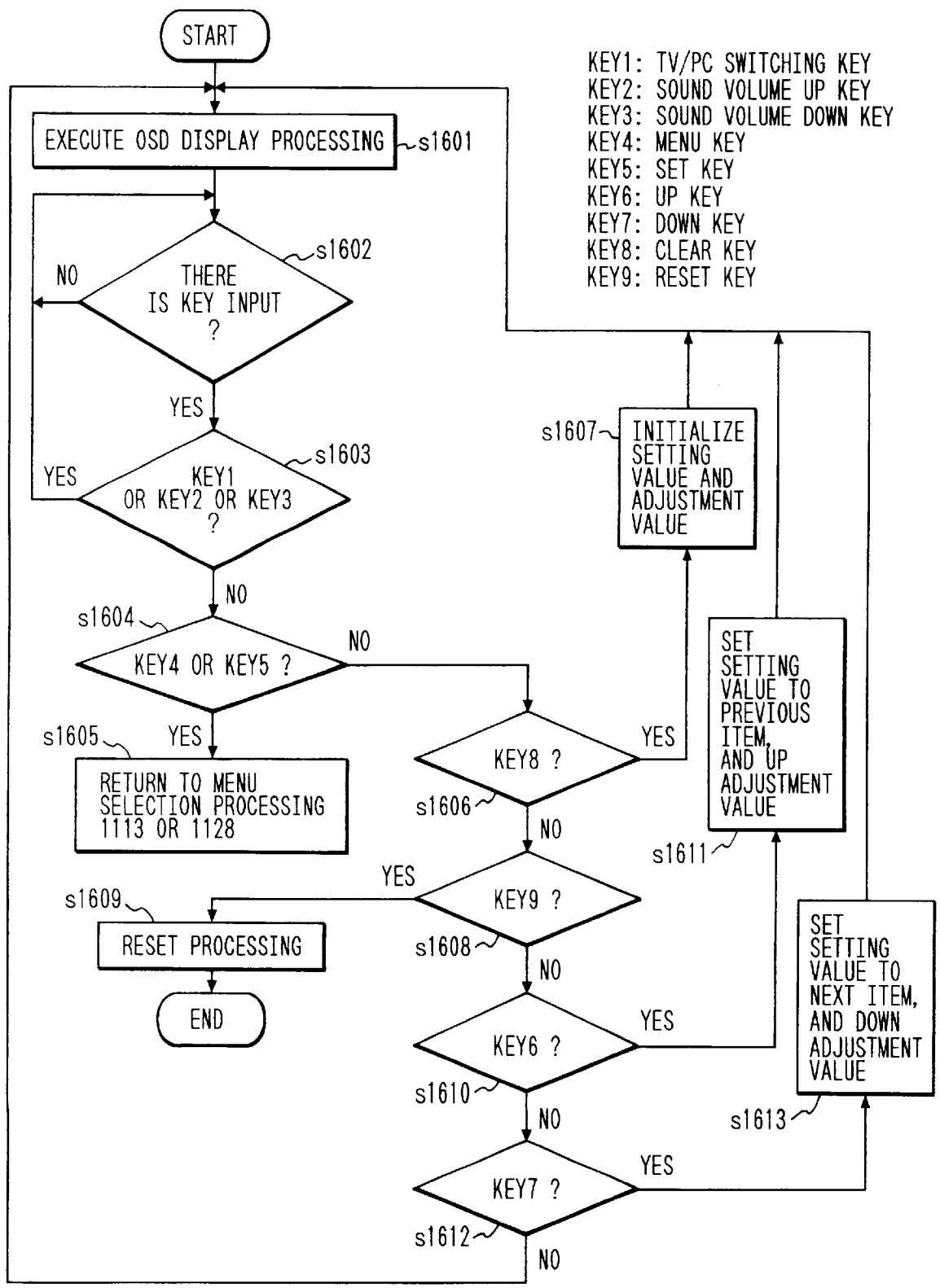

Referring to FIG. 43, a step S1601 effects OSD of the language selecting image frame, and a step S1602 waits until a key input from the operator. A step S1603 discriminates whether the key input is any of the TV/PC switch key, sound volume increase key or sound volume decrease key, and, if so, the sequence returns to the step S1602, but, if not, the sequence proceeds to a step S1604. The step S1604 discriminates whether the key input is the menu key or the set key, and, if so, the sequence returns to the menu selection in the step S1113, but, if not, the sequence proceeds to a step S1606.

The step S1606 discriminates whether the key input is the clear key, and, if so, a step S1607 shifts the selected item to the initial value and the sequence returns to the step S1601, but, if not, the sequence proceeds to a step S1608. The step S1608 discriminates whether the clear key and the set key are depressed simultaneously at least for a predetermined time, and, if depressed, a resetting request is identified and a step S1609 effects the resetting process to terminate the language selection process and the key input process, but, if not, the sequence proceeds to a step S1610.

The step S1610 discriminates whether the UP key has been actuated by the operator, and, if a actuated, a step S1611 shifts the selected item to the preceding item or increases the set value, but, if not, the sequence proceeds to a step S1612. The step S1612 discriminates whether the key input is the DOWN key, and, if so, a step S1613 shifts the selected item to the succeeding item or decreases the set value. If none of the foregoing keys is actuated, the sequence returns to the step S1601 without any operation. A similar process is effected for the input type selection in the step S1117, the sound quality selection in the step S1119, the contrast adjustment in the step S1121, the brightness adjustment in the step S1123, the saturation adjustment in the step S1125 and the hue adjustment in the S1127.

A step S1128 effects selection of the process for selecting the set item through the menu image frame in the PC mode, in a similar manner as in the step S1113. The step S1129 discriminates whether the selected process is the language selection, and, if so, a step S1130 effects a language selection process, but, if not, the sequence proceeds to a step S1131. The step S1131 discriminates whether the selected process is the sound quality selection, and, if so, a step S1132 effects a sound quality selection process, but, if not, the sequence proceeds to a step S1133.

The step S1133 discriminates whether the selected process is the γ selection, and, if so, a step S1134 effects a γ selection process, but, if not, the sequence proceeds to a step S1135. The step S1135 discriminates whether the selected process is the gradation selection, and, if so, a step S1136 effects a gradation selection process, but, if not, the sequence proceeds to a step S1137. The step S1137 discriminates whether the selected process is the phase adjustment, and, if so, a step S1138 effects a phase adjustment process, but, if not, the sequence proceeds to a step S1139.

The step S1139 discriminates whether the selected process is the position adjustment, and, if so, a step S1140 effects a display position adjustment process, but, if not, the sequence proceeds to a step S1141. The step S1141 discriminates whether the selected process is the DPMS adjustment, and, if so, a step S1142 effects a DPMS adjustment process, but, if not, the sequence proceeds to a step S1143. The step S1143 discriminates whether the selected process is the apparatus type setting, and, if so, a step S1144 effects an apparatus type setting process. If any other process is selected, the key input process is immediately terminated. The discriminations, OSD, and other controls mentioned above are executed by the system control circuit 191.

In the present embodiment, as explained in the foregoing, the change in the state of the input video signal is detected by the locked/unlocked state of the input video signal and the generated clock signal, so that the change can be easily detected even in the presence of a change in the synchronization signals of the input video signal, and the clock signal generation can be controlled according to such change.

It is therefore rendered possible to generate the clock signal in response to any change in the state of the input video signal, and to display the image corresponding to any input video signal.

Also it is rendered possible to stably generate the clock signals corresponding to the input video signal, as the state of the synchronization signals thereof is detected and the display mode is identified to control the clock generating operation according to the result of such detection.

Furthermore, even in case the input video signal does not match the video signals contained in the display mode table provided in the apparatus, there are effected controls such as the change in the phase comparing edge and the inhibition of the phase comparing operation according to the state of the measured HD and VD signals, thereby generating clock signals matching, as far as possible, the input video signal.

Consequently, even if the input video signal cannot be found in the above-mentioned table, the image of the input video signal can be satisfactorily displayed.

Furthermore, if the PLL circuit can be brought into the locked state even with such control of the clock generator, the situation can be informed to the operator by the OSD display.

Furthermore, in the present embodiment, in the interpolation for converting the input video signal into a resolving power matching that of the display unit, the interpolating coefficients are approximated by exponents of 2 and the interpolating calculation is executed by the addition and subtraction of such exponents.

Consequently, in case of effecting the interpolation after conversion of the video signal into digital signals of plural bits per pixel, such interpolating calculation can be achieved only by the bit shifting, addition and subtraction.

For this reason, the magnitude of circuitry can be made smaller in comparison with the case of multiplication of the data of plural bits, and a high-speed operation is made possible also in case such calculation is conducted by a software.

Furthermore, the present embodiment can discriminate the display mode in more detailedly, since measurement is made not only on the effective display period of the input video signal but also on the status of the horizontal synchronization signal during the vertical blanking period.

Many widely different embodiment of the present invention may be constructed without departing from the spirit and scope of the present invention. It should be understood that the present invention is not limited to the specified embodiments described in the specification, except as defined in the appended claims.

What is claimed is:

1. A display apparatus for displaying an image of an input image signal, utilizing a clock signal which is phase synchronized with said input image signal, comprising:

clock generating means including a phase comparator for comparing the phase of the synchronization signal in said input image signal with that of said clock signal and adapted for generating a clock signal which is phase synchronized with said input image signal;

display means for displaying the image represented by said input image signal, utilizing the clock signal generated by said clock generating means, with said display means having a plurality of display modes;

detection means for detecting the display mode of said display means corresponding to a state of said input image signal; and control means for controlling the comparing operation of said phase comparator according to the display mode detected by said detection means.

2. An apparatus according to claim 1, wherein said display means includes a sampling circuit for sampling said input image signal according to said clock signal, and a display circuit for displaying the image relating to said sampled image signal.

3. An apparatus according to claim 1, wherein said control means is adapted to control the timing of the phase comparing operation of said phase comparator, according to the output of said detection means.

4. An apparatus according to claim 1, wherein said control means is adapted to change the state of the synchronization signal entered into said phase comparator, according to the output of said detection means.

5. An apparatus according to claim 1, wherein said synchronization signal is composed of a rectangular wave.

6. An apparatus according to claim 1, wherein said phase comparator is capable of effecting said comparing operation at the timing of upshift and downshift of said synchronization signal, and said control means is adapted to control the timing of said comparing operation according to the output of said detection means.

7. An apparatus according to claim 1, wherein said control means includes a polarity inverting circuit for inverting the polarity of said synchronization signal, and said polarity inverting circuit is adapted to control the polarity of said synchronization signal according to the output of said detection means.

8. An apparatus according to claim 1, further comprising input means for entering image signals of plural kinds, mutually different in the state of the synchronization signal.

9. An apparatus according to claim 1, wherein said control means includes a memory for storing mode data, indicating the states of the synchronization signal of the image signals of plural kinds, and is adapted to compare the result of detection of said detection means with the states of the image signals of plural kinds indicated by said mode data and to control the comparing operation of said phase comparator based on the result of said comparison.

10. An apparatus according to claim 1, wherein said display means includes a ferroelectric liquid crystal display.

11. A display apparatus for displaying an image of an input image signal, utilizing a clock signal which is phase synchronized with said input image signal, comprising:
    clock generating means including a PLL circuit and adapted for generating a clock signal which is phase synchronized with said input image signal, said clock generating means generating a control signal indicating whether said PLL circuit is in a locked state;
    display means for displaying the image represented by said input image signal, utilizing said clock signal generated by said clock generating means, with said display means having a plurality of display modes; and
    detection means for detecting the display mode of said display means corresponding to a state of said input image signal according to the control signal generated by said clock generating means.

12. An apparatus according to claim 11, further comprising control means for controlling the generating operation of said clock generating means according to the output of said detection means.

13. An apparatus according to claim 12, further comprising input means for entering image signals of plural kinds mutually different in the state of the synchronization signal, wherein said detection means is adapted to detect whether the synchronization signal in said input image signal has changed, according to said locked state signal.

14. An apparatus according to claim 13, wherein said control means is adapted to discriminate the kind of the synchronization signal in said input image signal and to set the operating parameters of said clock generating means according to the kind of said synchronization signal.

15. An apparatus according to claim 12, wherein said control means is adapted to control the phase comparing operation of said PLL circuit according to said locked state signal.

16. An apparatus according to claim 12, wherein said control means is adapted to control the timing of the phase comparing operation of said PLL circuit according to said locked state signal.

17. An apparatus according to claim 12, wherein said control means is adapted to change the state of the synchronization signal entered into said PLL circuit, according to said locked state signal.

18. An apparatus according to claim 11, wherein said display means includes a sampling circuit for sampling said input image signal according to said clock signal, and a display circuit for displaying the image relating to said sampled image signal.

19. An apparatus according to claim 11, further comprising input means for entering image signals of plural kinds mutually different in the state of the synchronization signal, wherein said detection means is adapted to detect the kind of said input image signal according to the control signal released by said clock generating means.

20. A display apparatus for displaying an image of an input image signal, utilizing a clock signal which is phase synchronized with said input image signal, comprising:
    clock generating means including a PLL circuit and adapted for generating a clock signal which is phase synchronized with said input image signal, said clock generating means generating a control signal indicating whether said PLL circuit is in a locked state, with said clock generating means having a plurality of operation modes;
    display means for displaying the image represented by said input image signal, utilizing said clock signal generated by said clock generating means, with said display means having a plurality of display modes;
    detection means for detecting the display mode of said display means corresponding to a state of said input image signal; and
    mode setting means for setting the operating mode of said clock generating means according to the control signal generated by said clock generating means and the display mode detected by said detection means.

21. An apparatus according to claim 20, wherein said mode setting means is adapted to set the operating parameters of said PLL circuit according to said control signal and the output of said detection means.

22. An apparatus according to claim 21, wherein said mode setting means is adapted to set the operating parameters of said PLL circuit so as to generate a clock signal matching the state of said input image signal detected by said detection means.

23. A signal processing apparatus comprising:
    input means for entering a video signal containing vertical synchronization signals and horizontal synchronization signals, with horizontal synchronization periods of said horizontal synchronization signals varying within one vertical synchronization period;
    synchronization signal detecting means for detecting, utilizing said input video signal, the horizontal synchronization periods of said input video signals and the timing of change of the horizontal synchronization periods in one vertical synchronization period;

clock generating means for generating a clock signal which is phase synchronized with said horizontal synchronization signals; and control means for controlling a generating operation of said clock generating means according to a detection result of said synchronization signal detecting means.

24. An apparatus according to claim 23, further comprising display means for displaying the image relating to said input video signal utilizing said clock signal.

25. A display control apparatus for controlling a display device, comprising:

input means for inputting an image signal;

mode setting means for detecting a state of said input image signal and for setting a display mode of the display device between a plurality of display modes according to the detection result;

clock generating means for generating a clock signal which is phase synchronized with said input image signal;

control means for controlling a clock generating operation of said clock generating means according to the display mode set by said mode setting means;

processing means for processing said input image signal according to the clock signal and supplying the processed image signal to said display device, said display device displaying an image represented by said image signal supplied from said processing means.

26. An apparatus according to claim 25, wherein said plurality of display modes have different solutions.

27. An apparatus according to claim 25, wherein said processing means comprises converting means for sampling the input image signal according to the clock signal and converting the sampled image signal into a digital image signal.

28. An apparatus according to claim 25, wherein said processing means comprises interpolation means for interpolating the input image signal according to the display mode set by said mode setting means.

29. A display control apparatus for controlling a display device, comprising:

detection means for detecting a state of an input video signal;

mode setting means for setting a display mode of said display device between n different display modes corresponding to different states of the input video signal on the basis of the detection results of said detection means, said mode setting means setting the display mode of said display device to be a predetermined display mode when the state of the input video signal detected by said detection means corresponds to a display mode other than the n different display modes; and processing means for processing the input video signal according to the display mode set by said mode setting means and for supplying the processed video signal to the display device, the display device displaying an image represented by the video signal supplied from said processing means.

30. An apparatus according to claim 29, wherein said mode setting means comprises storing means for storing n different states of the input video signal corresponding to the n different display modes.

31. An apparatus according to claim 29, wherein the n different display modes have different solutions.

32. An apparatus according to claim 29, wherein said processing means comprises clock generating means for generating a clock signal phase synchronized with the input video signal, said clock generating means generating the clock signal according to the display mode set by said mode setting means.

33. An apparatus according to claim 29, wherein said processing means comprises interpolation means for interpolating the input video signal according to the display mode set by said mode setting means.

34. An apparatus according to claim 1, wherein said plurality of display modes have different solutions.

35. An apparatus according to claim 11, wherein said plurality of display modes have different solutions.

36. An apparatus according to claim 20, wherein said plurality of display modes have different solutions.

* * * * *

UNITED STATES PATENT AND TRADEMARK OFFICE
CERTIFICATE OF CORRECTION

PATENT NO. : 5,926,174

DATED : July 20, 1999

INVENTOR(S): YOSHIKAZU SHIBAMIYA, ET AL.    Page 1 of 2

It is certified that error appears in the above-identified patent and that said Letters Patent is hereby corrected as shown below:

On the title page, item
[56] REFERENCES CITED:

U.S. PATENT DOCUMENTS, "Stecker et al." should read --Steckler et al.--.

COLUMN 1:

Line 9, "phased" should read --phase--.

COLUMN 6:

Line 45, "At" should read --As--.

COLUMN 23:

Line 21, "be" should be deleted.

COLUMN 27:

Line 11, "a" should be deleted.

COLUMN 29:

Line 64, "locked state" should read --control--.

UNITED STATES PATENT AND TRADEMARK OFFICE
CERTIFICATE OF CORRECTION

PATENT NO. : 5,926,174

DATED : July 20, 1999

INVENTOR(S): YOSHIKAZU SHIBAMIYA, ET AL.

It is certified that error appears in the above-identified patent and that said Letters Patent is hereby corrected as shown below:

<u>COLUMN 30</u>:

```
Line 5, "locked state" should read --control--.
Line 10, "locked state" should read --control--.
Line 14, "locked state" should read --control--.
```

Signed and Sealed this

Twenty-seventh Day of June, 2000

Attest:

Q. TODD DICKINSON

*Attesting Officer*     *Director of Patents and Trademarks*